United States Patent [19]
Nakai et al.

[11] Patent Number: 5,946,457
[45] Date of Patent: Aug. 31, 1999

[54] IMAGE FORMING SYSTEM HAVING TRANSFER DEVICE FOR COMMUNICATING BETWEEN IMAGE FORMING APPARATUS AND IMAGE PROCESSING APPARATUS

[75] Inventors: Yasuhiro Nakai, Soraku-gun; Syoichiro Yoshiura, Tenri; Hidetomo Nishiyama, Yamatokoriyama, all of Japan

[73] Assignee: Sharp Kabushiki Kaisha, Osaka, Japan

[21] Appl. No.: 08/770,543

[22] Filed: Dec. 20, 1996

[30] Foreign Application Priority Data

Dec. 25, 1995 [JP] Japan .................................. 7-337283

[51] Int. Cl.[6] .................................................. G06K 15/02
[52] U.S. Cl. ........................................... 395/112; 395/114
[58] Field of Search ..................................... 395/112, 114

[56] References Cited

U.S. PATENT DOCUMENTS

| | | |
|---|---|---|
| 4,797,706 | 1/1989 | Sugishima et al. . |
| 5,136,399 | 8/1992 | Aoyama .................................. 358/296 |
| 5,469,532 | 11/1995 | Gerlach et al. ........................ 395/112 |
| 5,768,483 | 6/1998 | Maniwa et al. ........................ 395/114 |

FOREIGN PATENT DOCUMENTS

| | | |
|---|---|---|
| 195 18 321 A1 | 12/1995 | Germany . |
| 53-116834 | 10/1978 | Japan . |
| 2 288 508 | 10/1995 | United Kingdom . |

*Primary Examiner*—Scott Rogers
*Attorney, Agent, or Firm*—David G. Conlin; George W. Neuner

[57] ABSTRACT

In an image-forming system, when the user inputs an instruction for image processing to an input section in a digital copying machine, the control section of the digital copying machine outputs image information of a document to a host computer. The host computer carries out a predetermined image process on the inputted image information, and outputs the processed image information to the digital copying machine through a transferring device. The control section of the digital copying machine supplies the processed image information to an image-recording section, and the image-recording section forms a visual image based on the image information. With this arrangement, merely by installing necessary processing functions in the host computer, it becomes possible to eliminate the need for purchasing a new digital copying machine to replace the older one with relatively outdated functions, and also to reduce the burden on users on an economic basis.

37 Claims, 37 Drawing Sheets

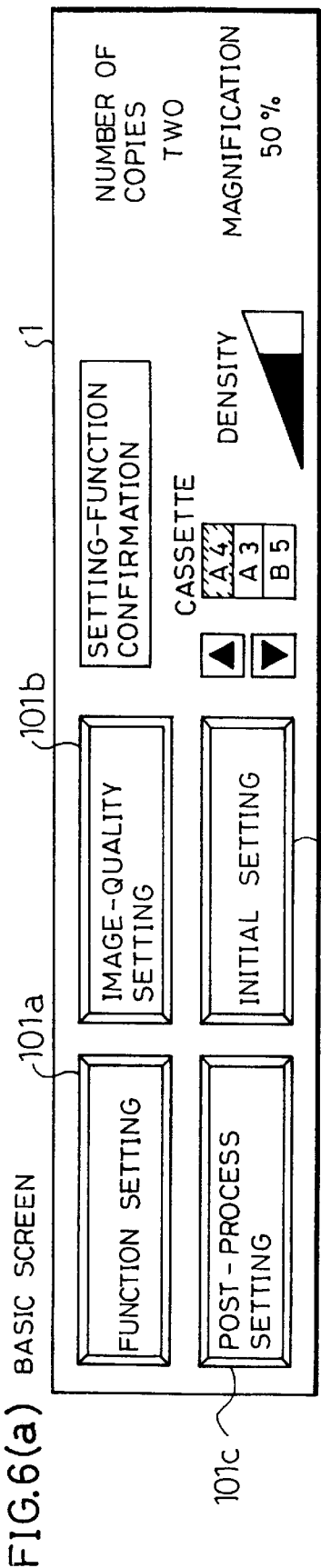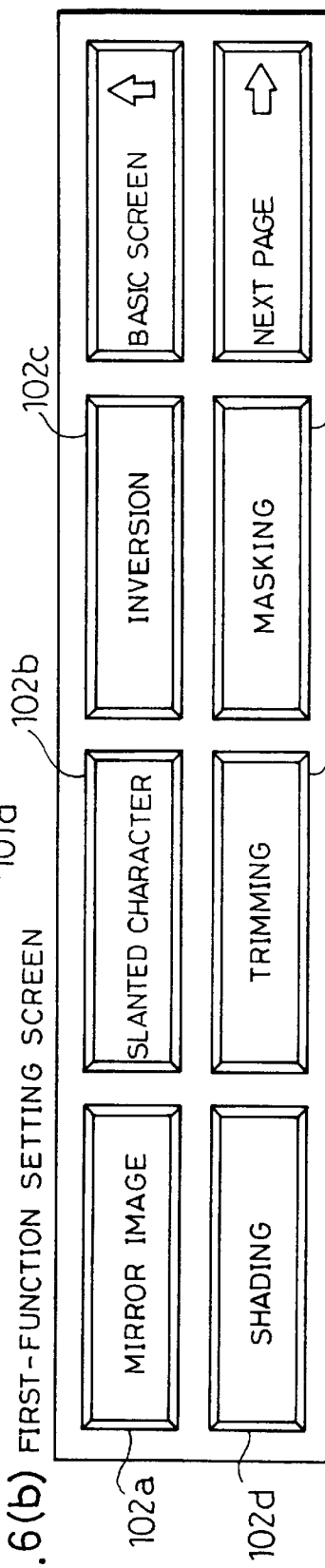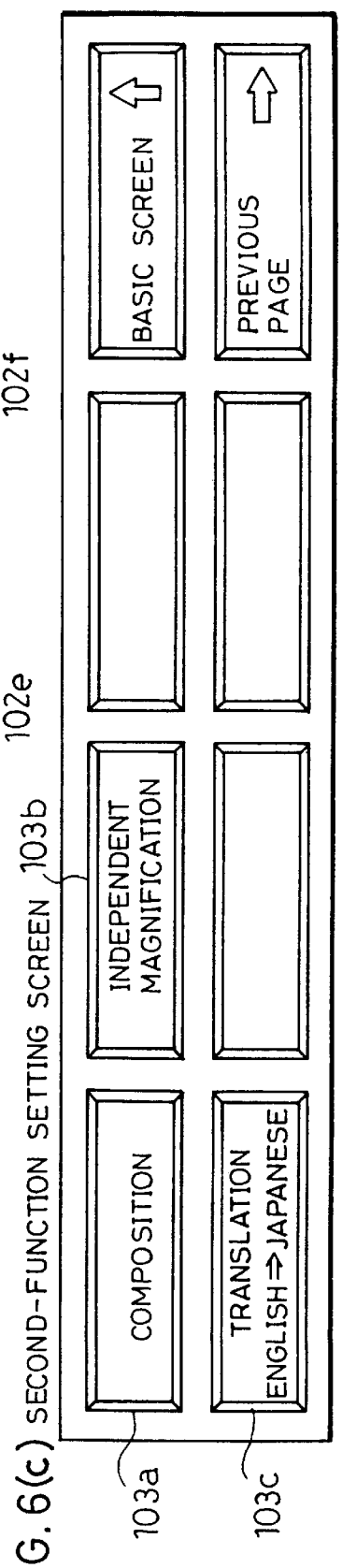

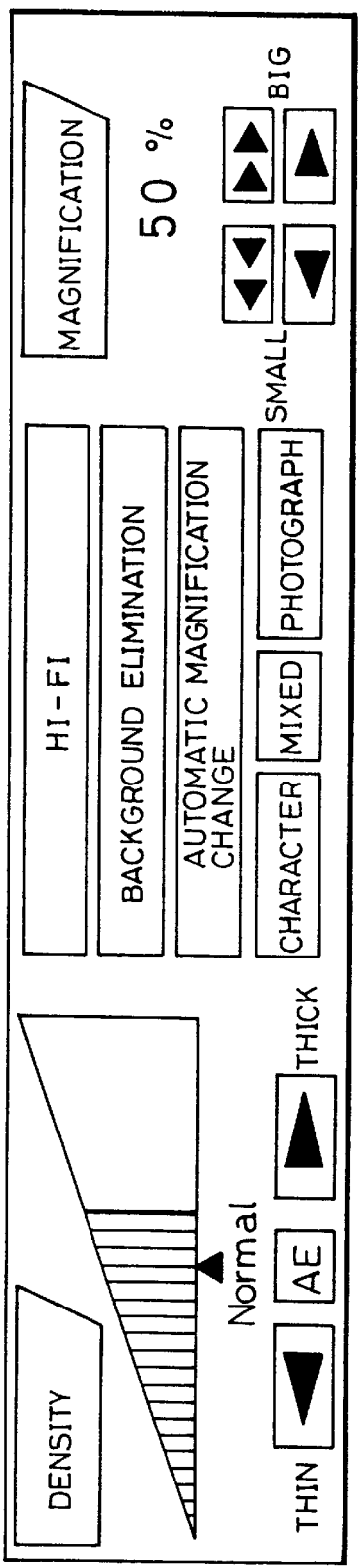
FIG.7(a) IMAGE-QUALITY SETTING SCREEN
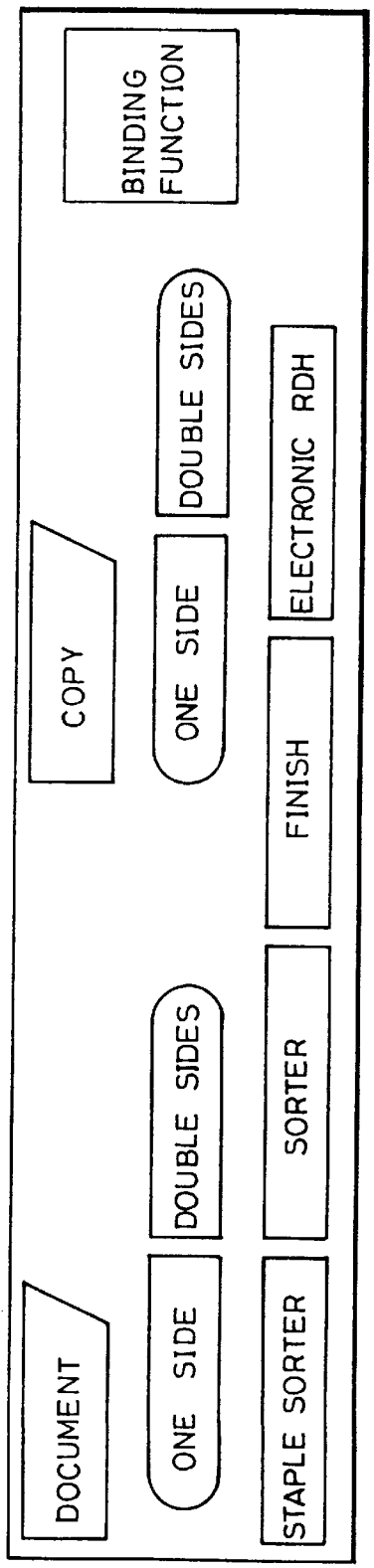
FIG.7(b) POST-PROCESS SETTING SCREEN

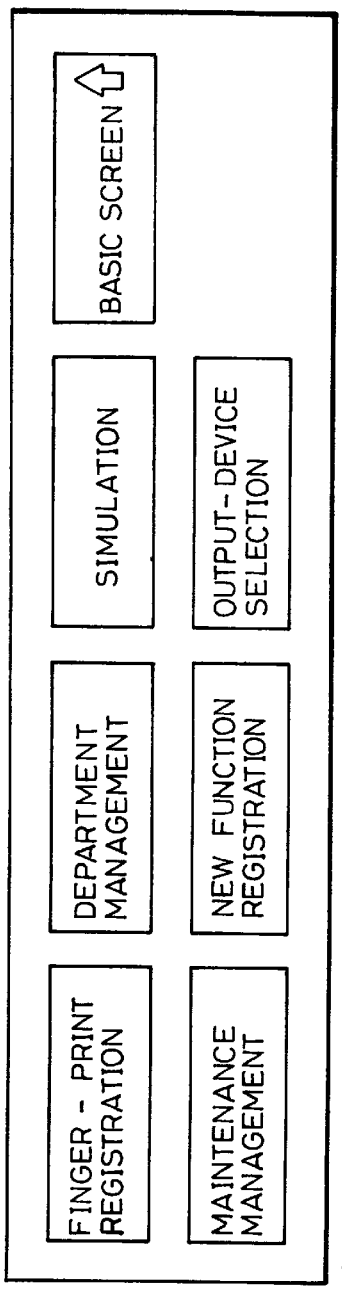
FIG.8(a) INITIAL SETTING SCREEN
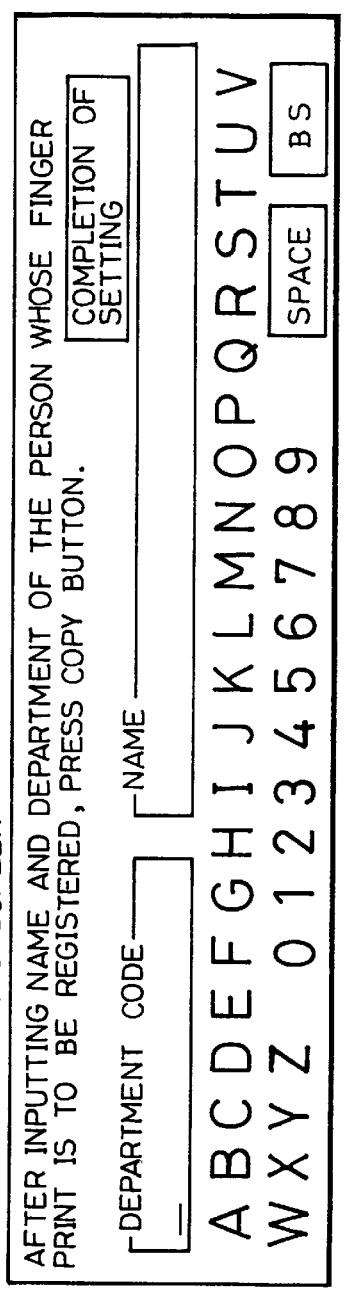
FIG.8(b) FINGER-PRINT REGISTERING SCREEN
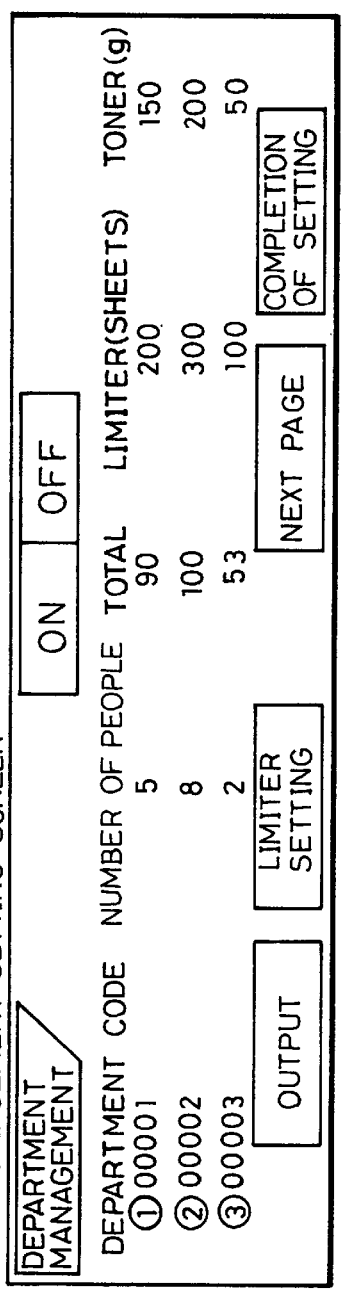
FIG.8(c) DEPARTMENT-MANAGEMENT SETTING SCREEN

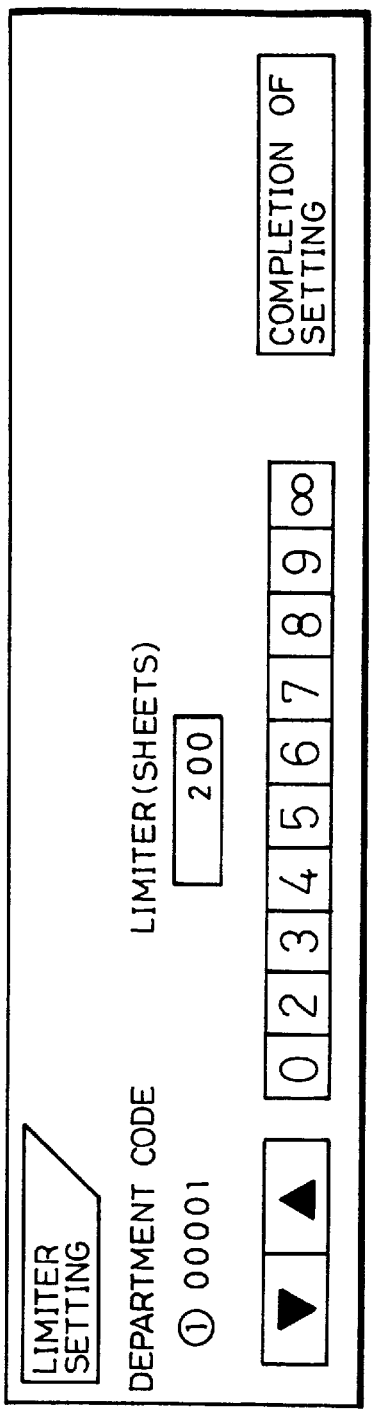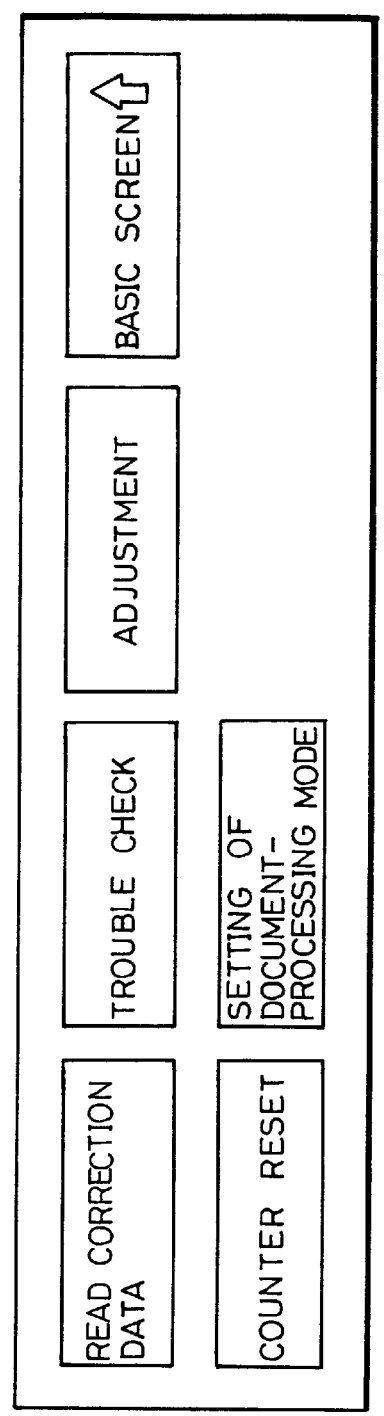
FIG. 9(a) LIMITER SETTING SCREEN
FIG. 9(b) SIMULATION SCREEN

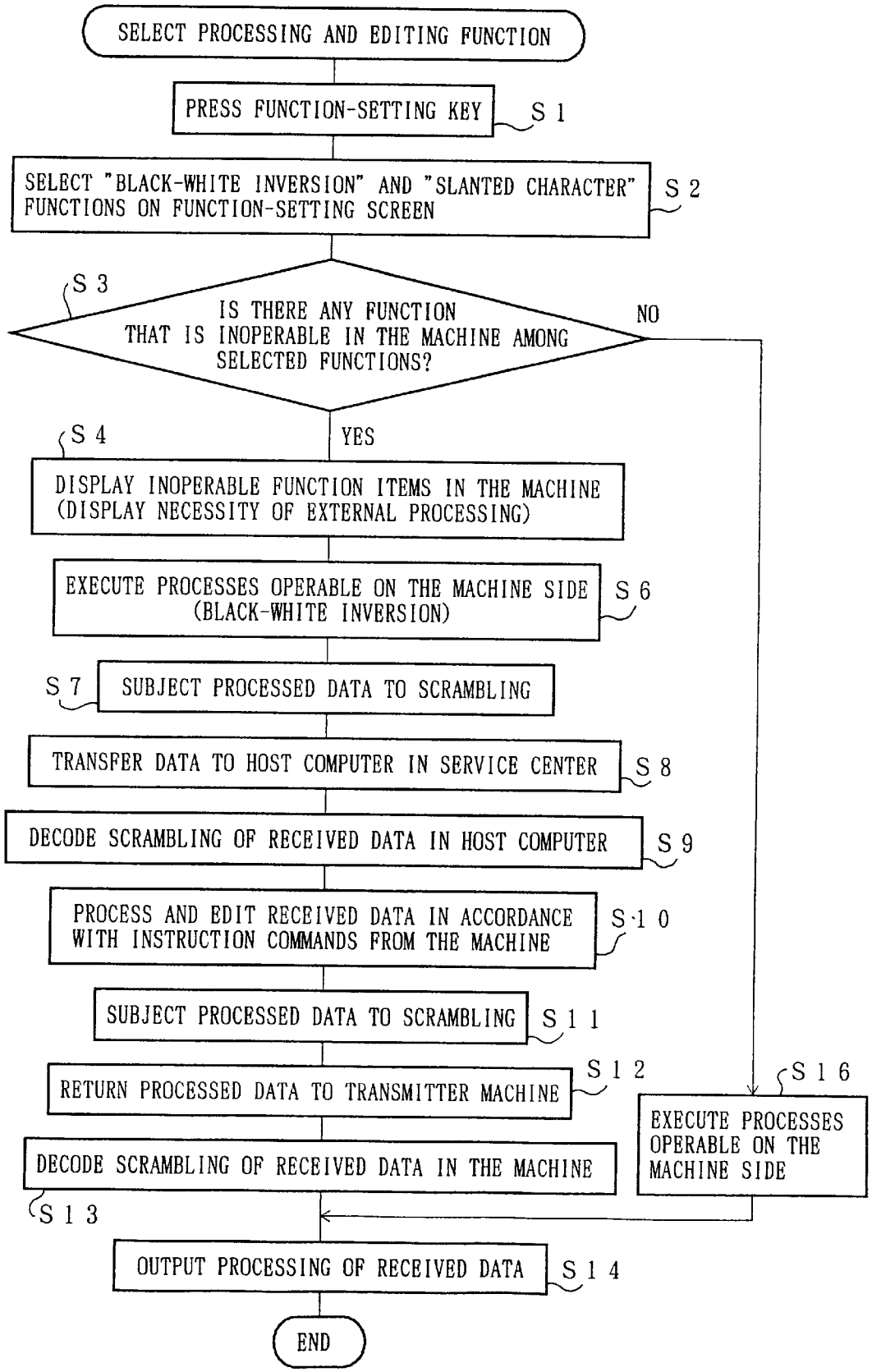

FIG. 18

(HOST ALL FUNCTIONS)

NEW-FUNCTION REGISTERING SCREEN
ADDITION OF NEW FUNCTIONS IN THE SERVICE CENTER.
FOR REGISTRAION AS ADDITIONAL FUNCTIONS, PRESS THE FUNCTION NAME,
THEREBY REVERSING THE DISPLAY. IF "OK", PRESS "START KEY".
FOR CANCELLATION, PRESS "CANCEL KEY".

NEWLY ADDED FUNCTIONS

| TRANSLATION ENGLISH ⇔ JAPANESE | DICTIONARY FUNCTION "KOJIEN" | LINE ARRANGMENT |
| TRANSLATION JAPANESE ⇔ ENGLISH | | |

→

HELP — 113c
NEWLY ADDED FUNCTIONS

UP / DOWN — 113e

START — 113a
CANCEL — 113b

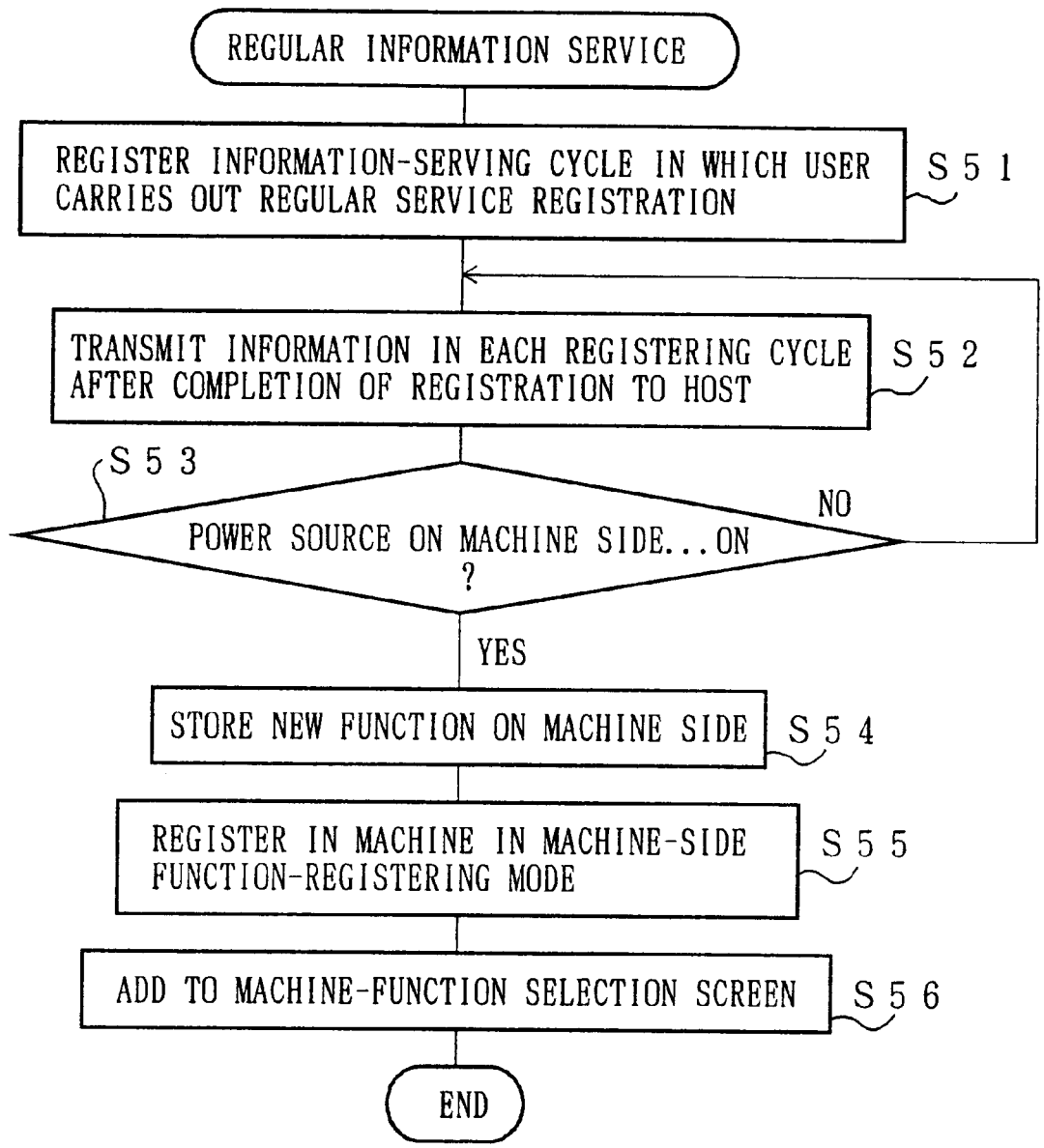

FIG. 22 (a)
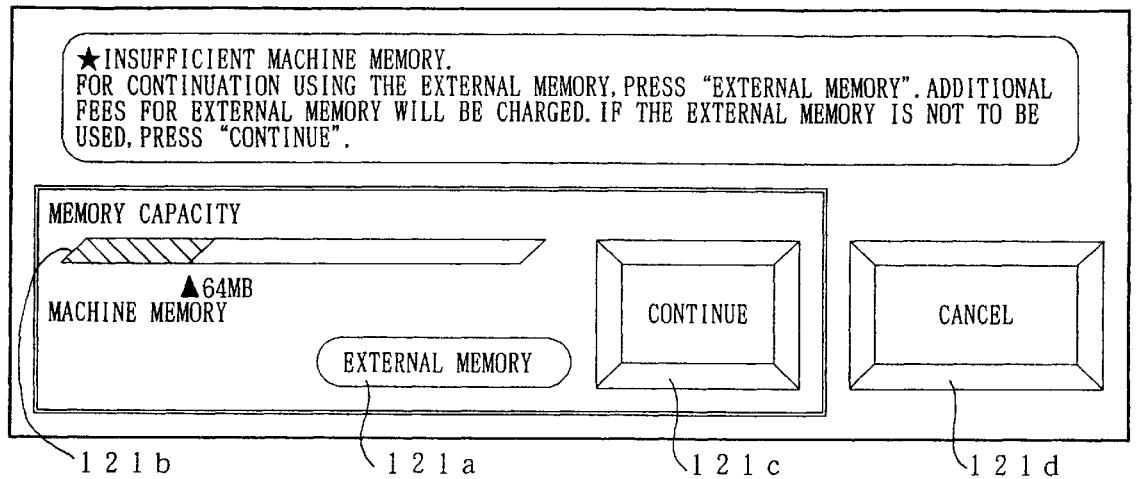
FIG. 22 (b) (EXTERNAL MEMORY SELECTION KEY)
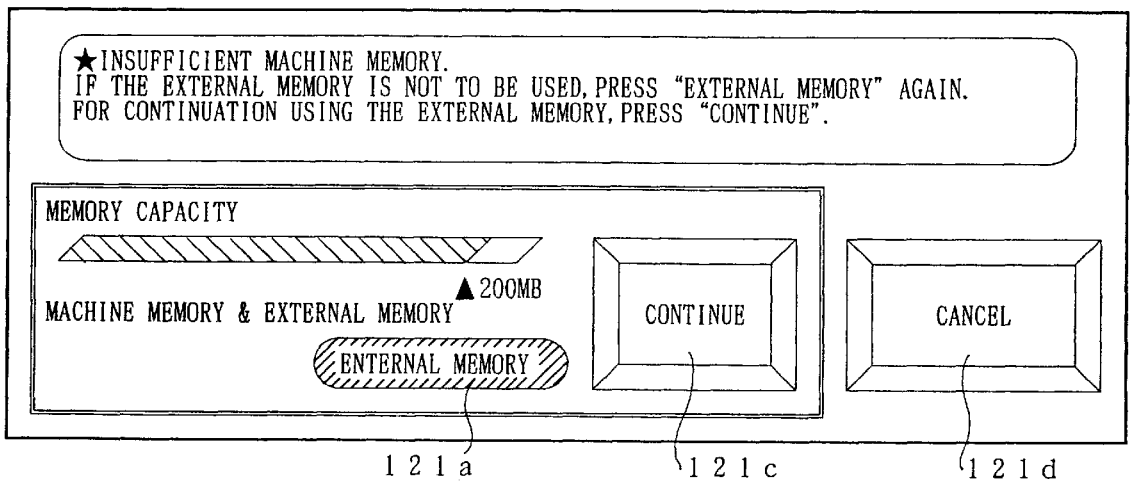
FIG. 22 (c) (CONTINUE KEY)
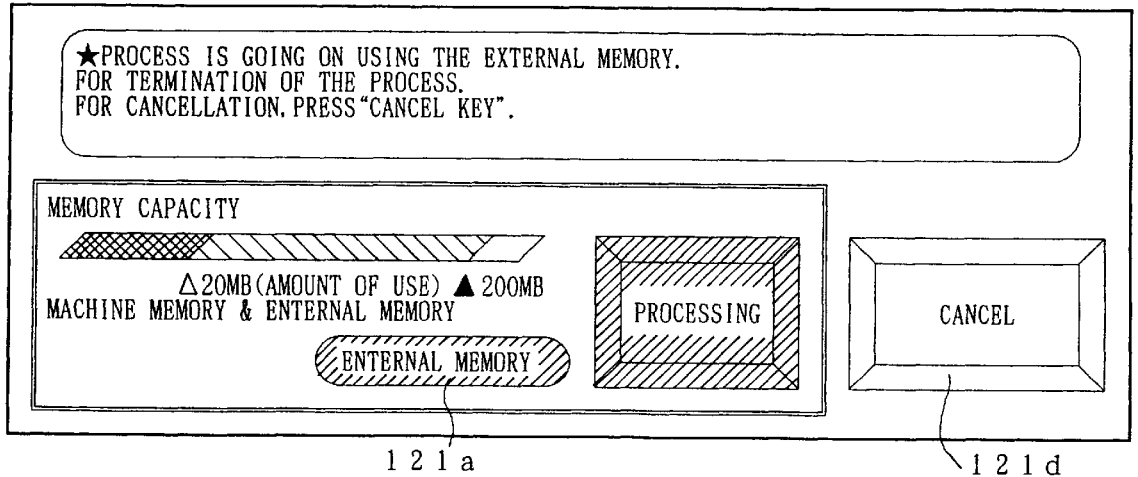

FIG. 23

AUTOMATIC SELECTION OF OPTIMAL OUTPUT DEVICE

- S91: COMPLETE PROCESS USING COMPUTER ON HOST SIDE
- S92: SELECTION RANGE OF OUTPUT MACHINE... INPUTTED?
  - YES → S93
  - NO → S94
- S93: LIMIT EXTRACTION RANGE TO SELECTED MACHINE REGISTERED BY USER
- S94: EXTRACT MACHINE SUITABLE FOR OUTPUT FROM MACHINE PERFORMANCE DATA (RESOLUTION, GRAY SCALE, MAXIMUM RECORDING SIZE)
- S95: CONFIRM STATE OF EXTRACTED MACHINE BY COMMUNICATION (JAM, MAINTENANCE, IN OPERATION, POWER-SOURCE STATE, PAPER-LOAD STATUS, TONER-REMAINING AMOUNT)
- S96: SELECT SUITABLE MACHINE FOR OUTPUT THROUGH RESULTS OF COMMUNICATION
- S97: INFORM CLIENT OF RESULTS OF SELECTION (INFORM THROUGH COMMUNICATION)
- S98: ANSWER FROM CLIENT ON SELECTION... GIVEN?
  - YES → S99
  - NO → S102
- S102: PREDETERMINED TIME ... ELAPSED?
  - YES → S103
  - NO → S98
- S103: DETERMINE MACHINE CLOSEST TO CLIENT AS RECEIVER OF OUTPUT
- S99: DETERMINE RECEIVER OF OUTPUT BASED ON SELECTION OF CLIENT
- S100: SET CONTENTS OF MACHINE SELECTED... SUITABLE FOR OUTPUT?
  - YES → S101
  - NO → S104
- S104: SET MACHINE AT SUITABLE STATE FOR OUTPUT (SELECTION OF CASSETTE, IMAGE-QUALITY MODE, COPY MODE, MAGNIFICATION)
- S101: TRANSFER STORED IMAGE DATA TO SELECTED MACHINE
- END

FIG. 25

(AUTOMATIC SELECTION KEY ON)

OUTPUT DEVICE SELECTION SCREEN
AUTOMATIC OUTPUT DEVICE SELECTION
UPON SPECIFYING OUTPUT DEVISES, CHOOSE FROM THE LIST BELOW, WHICH
WILL REVERSE THE DISPLAY(MULTIPLE SELECTION AVAILABILITY)

LIST OF OUTPUT DEVICES

| ENGINEERING SECTION PPC1 | ENGINEERING SECTION PPC2 | ENGINEERING SECTION PPC3 | ENGINEERING SECTION PPC4 |
| PLANNING SECTION PPC1 | PLANNING SECTION PPC2 | PLANNING SECTION PPC3 | |

→

HELP    UP
MAIN MACHINE PPC    DOWN

AUTOMATIC SELECTION — 131a
START — 131b

FIG. 28 (a)

```
WARNING
  ★IMPROPER DOCUMENT DATA FOR PROCESSING.
  CONFIRM "WARNING LIST". IF "NO"PRESS"RE-SCAN".
  RESULTS OF THE PROCSS ARE LISTED AGAIN.
  IF "OK", PRESS "CONTINUE"SUCCESSIVELY. OUTPUT IS CARRIED OUT.

WARNING LIST
  IMAGE QUALITY
  (PROCESS LEVEL)   OCR RECOGNITION RATE…60%     PREVIEW
  DATA SIZE                     A4:90%
  PARITY ERROR                  NON              RE-SCAN         CONTINUE
                                                 141a    141b    141
```

FIG. 28 (b)  (RE-SCAN KEY ON)

```
CHECK
  ★90% OF RECOGNITION.
  CONFIRM "WARNING LIST". IF "NO"PRESS"RE-SCAN".
  RESULTS OF THE PROCSS ARE LISTED AGAIN.
  IF "OK", PRESS "CONTINUE"SUCCESSIVELY. OUTPUT IS CARRIED OUT.

WARNING LIST
  IMAGE QUALITY
  (PROCESS LEVEL)   OCR RECOGNITION RATE…90%     PREVIEW
  DATA SIZE                     A4:100%
  PARITY ERROR                  NON              RE-SCAN         CONTINUE
                                                 141a    141b    141c
```

FIG. 28 (c) (PREVIEW ON)

```
PREVIEW (TRASLATION ENGLISH TO JAPANESE)           DISPLAY POSITION

★INTRODUCTION OF NEW PRODUCTS. ★
                                                       141d
                                                        U
        NEW-GENERATION ELECTRONIC NOTEBOOK              D
                                    · · · · ·          141e

CONFIRMATION                              →        L  R
  141h                                               141g  141f
```

THE USER'S FEE FOR THE MONTH

THE CHARGES FOR THE MONTH OF JANUARY ARE NOTED IN THE FOLLOWING: YOUR BUSINESS IS MOST APPRECIATED.

| DATE | START TIME | PROCESSES | PROCESS TIME | CHARGES |
|---|---|---|---|---|
| 95/01/07 | 10:00:00 | 2 COPIES IN ONE SET | 00:05:00 | 50 |
| 95/01/10 | 09:15:25 | CENTERING | 00:03:10 | 30 |
| 95/01/15 | 14:17:13 | ADDRESS COPY | 00:15:00 | 250 |
| 95/01/20 | 11:20:15 | SHIFTING FUNCTION | 00:07:07 | 30 |
| 95/01/20 | 13:36:54 | MULTISHOT | 00:10:16 | 200 |
| 95/01/22 | 14:53:02 | COMPOSITE FUNCTION | 00:02:24 | 200 |
| 95/01/24 | 08:34:52 | SLANTED, MIRROR IMAGE | 00:01:26 | 150 |
| 95/01/29 | 17:54:23 | TRANSLATION | 00:34:02 | 500 |
|  |  |  |  |  |
|  |  |  |  |  |

THE AMOUNT OF BILL ¥1,410

F I G. 3 0

| DATE | START TIME | PROCESSES | PROCESS TIME | CHARGES |
|---|---|---|---|---|
| 95/01/07 | 10:00:00 | 2 COPIES IN ONE SET | 00:05:00 | 50 |
| 95/01/10 | 09:15:25 | CENTERING | 00:03:10 | 30 |
| 95/01/15 | 14:17:13 | ADDRESS COPY | 00:15:00 | 250 |
| 95/01/20 | 11:20:15 | SHIFTING FUNCTION | 00:07:07 | 30 |
| 95/01/20 | 13:36:54 | MULTISHOT | 00:10:16 | 200 |
| 95/01/22 | 14:53:02 | COMPOSITE FUNCTION | 00:02:24 | 200 |
| 95/01/24 | 08:34:52 | SLANTED, MIRROR IMAGE | 00:01:26 | 150 |
| 95/01/29 | 17:54:23 | TRANSLATION | 00:34:02 | 500 |
| | | | | |
| | | | | |
| | | | | |
| | | | | |
| | | | | |

F I G. 31

| DIGITAL COPYING MACHINE A | | | | DIGITAL COPYING MACHINE B | | | | DIGITAL COPYING MACHINE C | | | |
|---|---|---|---|---|---|---|---|---|---|---|---|
| DATE | START TIME | PROCESSES | PROCESS TIME | DATE | START TIME | PROCESSES | PROCESS TIME | DATE | START TIME | PROCESSES | PROCESS TIME |
| 95/01/07 | 10:00:00 | 2 COPIES IN ONE SET | 00:05:00 | 95/01/11 | 13:54:02 | ADDRESS COPY | 00:12:54 | 95/01/09 | 09:24:30 | HIGH-QUALITY PROCESS | 00:24:35 |
| 95/01/10 | 09:15:25 | CENTERING | 00:03:10 | 95/01/12 | 09:24:55 | COMPOSITE FUNCTION | 00:02:54 | 95/01/11 | 11:28:35 | HIGH-QUALITY PROCESS | 00:34:01 |
| 95/01/15 | 14:17:13 | ADDRESS COPY | 00:15:00 | 95/01/20 | 17:12:45 | SHADING, FRAMING | 00:01:43 | 95/01/24 | 14:35:48 | TRANSLATION | 00:40:52 |
| 95/01/20 | 11:20:15 | SHIFTING FUNCTION | 00:07:07 | 95/01/23 | 18:34:52 | SLANTED, MIRROR IMAGE | 00:02:26 | 95/01/29 | 10:45:02 | ENLARGED DIVISIONAL OUTPUT | 00:07:01 |
| 95/01/20 | 13:36:54 | MULTISHOT | 00:10:16 | 95/01/25 | 11:24:02 | TRANSLATION | 00:23:54 | 95/02/04 | 16:30:11 | HIGH-QUALITY PROCESS | 00:14:12 |
| 95/01/22 | 14:53:02 | COMPOSITE FUNCTION | 00:02:24 | 95/01/28 | 14:43:40 | ENLARGED DIVISIONAL OUTPUT | 00:09:24 | 95/02/11 | 09:35:02 | TRANSLATION | 00:35:23 |
| 95/01/24 | 08:34:52 | SLANTED, MIRROR IMAGE | 00:01:26 | 95/02/04 | 10:08:24 | HIGH-QUALITY PROCESS | 00:19:24 | | | | |
| 95/01/29 | 17:54:23 | TRANSLATION | 00:34:02 | | | | | | | | |
| 95/02/02 | 10:32:45 | HIGH-QUALITY PROCESS | 00:21:14 | | | | | | | | |

| NUMBER OF USE | 8 |
|---|---|
| TOTAL TIME OF USE | 01:18:25 |
| USER'S FEE | — |

| NUMBER OF USE | 6 |
|---|---|
| TOTAL TIME OF USE | 00:53:15 |
| USER'S FEE | — |

| NUMBER OF USE | 4 |
|---|---|
| TOTAL TIME OF USE | 01:46:29 |
| USER'S FEE | — |

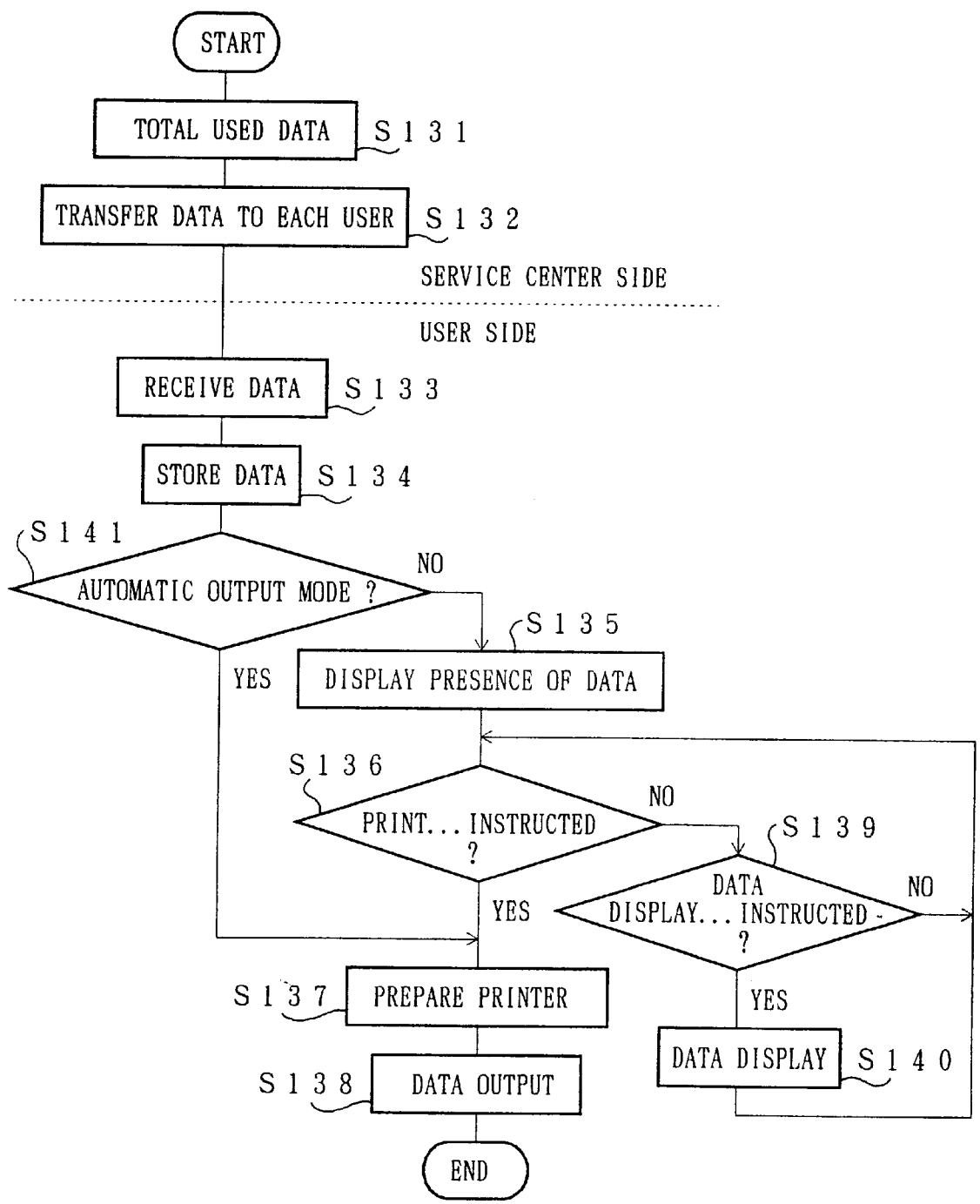

F I G. 34

| USER-SIDE MANAGING INFORMATION | | | | | | MAKER-SIDE MANAGING INFORMATION | | | |
|---|---|---|---|---|---|---|---|---|---|
| DATE | START TIME | PROCESSES | PROCESS TIME | CHARGES | | DATE | START TIME | PROCESSES | PROCESS TIME | CHARGES |
| 95/01/07 | 10:00:00 | 2 COPIES IN ONE SET | 00:05:00 | 50 | | 95/01/07 | 10:00:00 | 2 COPIES IN ONE SET | 00:05:00 | 50 |
| 95/01/10 | 09:15:25 | CENTERING | 00:03:10 | 30 | | 95/01/10 | 09:15:25 | CENTERING | 00:03:10 | 30 |
| 95/01/15 | 14:17:13 | ADDRESS COPY | 00:15:00 | 250 | | 95/01/15 | 14:17:13 | ADDRESS COPY | 00:15:00 | 250 |
| 95/01/20 | 11:20:15 | SHIFTING FUNCTION | 00:07:07 | 30 | | 95/01/20 | 11:20:15 | SHIFTING FUNCTION | 00:07:07 | 30 |
| 95/01/20 | 13:36:54 | MULTISHOT | 00:10:16 | 200 | | 95/01/20 | 13:36:54 | MULTISHOT | 00:10:16 | 200 |
| 95/01/22 | 14:53:02 | COMPOSITE FUNCTION | 00:02:24 | 200 | | 95/01/22 | 14:53:02 | COMPOSITE FUNCTION | 00:02:24 | 200 |
| 95/01/24 | 08:34:52 | SLANTED, MIRROR IMAGE | 00:01:26 | 150 | | 95/01/24 | 08:34:52 | SLANTED, MIRROR IMAGE | 00:01:26 | 150 |
| 95/01/29 | 17:54:23 | TRANSLATION | 00:34:02 | 500 | | 95/01/29 | 17:54:23 | TRANSLATION | 00:34:02 | 500 |

F I G. 35

CHARGES FOR THE MONTH OF JANUARY

| USER-SIDE MANAGING INFORMATION | | | | | MAKER-SIDE MANAGING INFORMATION | | | | |
|---|---|---|---|---|---|---|---|---|---|
| DATE | START TIME | PROCESSES | PROCESS TIME | CHARGES | DATE | START TIME | PROCESSES | PROCESS TIME | CHARGES |
| 95/01/07 | 10:00:00 | 2 COPIES IN ONE SET | 00:05:00 | 50 | 95/01/07 | 10:00:00 | 2 COPIES IN ONE SET | 00:05:00 | 50 |
| 95/01/10 | 09:15:25 | CENTERING | 00:03:10 | 30 | 95/01/10 | 09:15:25 | CENTERING | 00:03:10 | 30 |
| 95/01/15 | 14:17:13 | ADDRESS COPY | 00:15:00 | 250 | 95/01/15 | 14:17:13 | ADDRESS COPY | 00:15:00 | 250 |
| 95/01/20 | 11:20:15 | SHIFTING FUNCTION | 00:07:07 | 30 | 95/01/20 | 11:20:15 | SHIFTING FUNCTION | 00:07:07 | 30 |
| 95/01/20 | 13:36:54 | MULTISHOT | 00:10:16 | 200 | 95/01/20 | 13:36:54 | MULTISHOT | 00:10:16 | 200 |
| 95/01/22 | 14:53:02 | COMPOSITE FUNCTION | 00:02:24 | 200 | 95/01/22 | 14:53:02 | COMPOSITE FUNCTION | 00:02:24 | 200 |
| 95/01/24 | 08:34:52 | SLANTED, MIRROR IMAGE | 00:01:26 | 150 | 95/01/24 | 08:34:52 | SLANTED, MIRROR IMAGE | 00:01:26 | 150 |
| 95/01/29 | 17:54:23 | TRANSLATION | 00:34:02 | 500 | 95/01/29 | 17:54:23 | TRANSLATION | 00:34:02 | 500 |

# IMAGE FORMING SYSTEM HAVING TRANSFER DEVICE FOR COMMUNICATING BETWEEN IMAGE FORMING APPARATUS AND IMAGE PROCESSING APPARATUS

FIELD OF THE INVENTION

The present invention relates to an image-forming system that has an image-processing apparatus, such as a computer that has an image-processing function for image information, and an image-forming apparatus such as a digital copying machine for printing image information, wherein both of these apparatuses are connected by a transferring device that transfers image information between them by using telecommunication lines.

BACKGROUND OF THE INVENTION

For example, when copying an original image, digital copying machines that are presently introduced into the market as image-forming apparatuses reads the original image by using an image-reading section, subject the original image that has just been read to a specified image process by using an image-processing section, and then print the image information by using a recording section. Therefore, in the digital copying machine of this type, an image is copied onto a sheet of paper by using only the image-processing functions that are provided in the digital copying machine.

Here, in recent years, it has been proposed that a plurality of image-recording apparatuses or other apparatuses be organized into a network. For example, Japanese Laid-Open Patent Publication 116834/1978 Tokukaishou 53-116834) discloses an arrangement wherein a plurality of image-reading apparatuses and a plurality of image-recording apparatuses are connected through a control section. In such an arrangement, an original image that has been read by any of the image-reading apparatuses is printed by any of the image-recording apparatuses. This arrangement makes it possible to shorten the stand-by time of the image-reading apparatus that is caused by processes, such as an exchanging process of originals in the image-reading apparatuses.

Moreover, Japanese Laid-Open Patent Publication 198958/1986 (Tokukaishou 61-198958) discloses an image-forming system wherein a plurality of copying machines, each having an image-reading section and an image-recording section, are connected to a control device. In this image-forming system, an image signal that is to be recorded is supplied to the copying machines in a distributed manner in accordance with a document copying mode that has been set, and copying operations are carried out by the copying machines in parallel with one another.

However, the conventional image-forming systems have the following problems.

For example, various image-processing functions in the digital copying machine are dependent upon software. Here, with the recent remarkable developments of the software, the image-processing functions have been highly improved in a very short period, and new copying machines having additional unprecedented functions have been newly introduced into the market. Consequently, for example, even when a digital copying machine having desired image-processing functions is purchased, the digital copying machine, which has the highest image-processing functions at the time of the purchase, will soon become outdated with relatively low functions in a short period.

In this case, it is impossible for the purchased digital copying machine to obtain functions higher than those originally provided in the digital copying machine. In the case when higher functions or newer functions are required, it is inevitable that a new copying machine has to be purchased to replace the older one. This tends to impose a big burden on users on an economic basis, and also to present an inherent problem for makers that try to provide consumers with new merchandise.

SUMMARY OF THE INVENTION

The objective of the present invention is to provide an image-forming system which eliminates the need for the replacement of an image-forming apparatus that has become outdated with relatively low functions, and consequently reduces the economic burden imposed on the user.

In order to achieve the above-mentioned objective, an image-forming system of the present invention, which has at least one image-forming apparatus and one image-processing apparatus as well as a transfer device that allows both of the apparatuses to communicate with each other so as to transfer information between them, is characterized in that: the image-forming apparatus is provided with an image-recording section for forming a visible image based on image information, an input section for inputting an instruction with respect to image processing, and a control section that outputs the image information to the image-processing apparatus in accordance with the instruction from the input section for carrying out the image processing in the image-processing apparatus, as well as supplying the image-recording section with the image information that has been processed in the image-processing apparatus. This apparatus is further characterized in that the image-processing apparatus subjects the image information that has been inputted through the transfer device to a predetermined image processing and outputs the resulting image information to the image-forming apparatus through the transfer device.

In this arrangement, when an instruction with respect to an image processing is inputted from the user to the input section in the image-forming apparatus, the control section outputs to the image-processing apparatus image information of an original that has been read by, for example, the image-reading section provided in the image-forming apparatus. The image information is inputted to the image-processing apparatus through the transfer device. The image-processing apparatus subjects the inputted image information to a predetermined image processing, and outputs the processed image information to the image-forming apparatus through the transfer device. When the processed image information has been inputted to the image-forming apparatus, the control section of the image-forming apparatus supplies the image-recording section with the image information. The image-recording section forms a visible image in accordance with the image information.

As described above, the present image-forming system is capable of requesting the image-processing apparatus for an image processing; therefore, in the case when a number of image-forming apparatuses are connected to an image-processing apparatus through the transfer device, it is not necessary for each of the image-forming apparatuses to have a predetermined image-processing function individually. Thus, even if an image-processing function that is more improved or newer than that provided in the respective image forming apparatuses has been developed and the function is required, merely providing the image-processing apparatus with the improved image-processing function is all that is required, and the purchase of a new image-forming apparatus is not necessary. Consequently, it becomes possible to reduce the economic burden that is to be imposed on the user for the image-forming apparatuses.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory view that shows a basic screen of a liquid crystal display on the operation panel; FIG. 6(b) is an explanatory view that shows a first-function setting screen of the liquid crystal display thereon; and FIG. 6(c) is an explanatory view that shows a second-function setting screen of the liquid crystal display thereon.

FIG. 7(a) is an explanatory view that shows a picture-quality setting screen of the liquid crystal display on the operation panel; and FIG. 7(b) is an explanatory view that shows a post-process-setting screen of the liquid crystal display thereon.

FIG. 8(a) is an explanatory view that shows an initial setting screen of the liquid crystal display on the operation panel; FIG. 8(b) is an explanatory view that shows a finger-print registering screen of the liquid crystal display thereon; and FIG. 8(c) is a section-management setting screen of the liquid crystal display thereon.

FIG. 9(a) is an explanatory view that shows a limiter setting screen of the liquid crystal display on the operation panel; and FIG. 9(b) is an explanatory view that shows a simulation screen of the liquid crystal display thereon.

FIG. 13 is a flow chart that shows another example of the operation of the image-forming system shown in FIG. 1.

FIG. 17 is an explanatory drawing that shows a display state on the liquid crystal display when the help key, shown in FIG. 16, is turned ON.

FIG. 18 is an explanatory drawing that shows a display state on the liquid crystal display when the host-all-function display key, shown in FIG. 16, is turned ON.

FIG. 19 is a flow chart that shows the operation of regular information service that the host computer in a service center offers to an apparatus on an office side.

FIG. 22(a) is an explanatory drawing that shows a display state on the liquid crystal display when the memory of the digital copying machine has become a full state in the operation shown in FIG. 21; FIG. 22(b) is an explanatory view that shows a display state on the liquid crystal display when the external-memory selection key, shown in FIG. 22(a), is turned ON; and FIG. 22(c) is an explanatory view that shows a display state on the liquid crystal display when the continuation key, shown in FIG. 22(b), is turned ON.

FIG. 23 is a flow chart that shows the operation of an image-forming system in still another embodiment of the present invention.

FIG. 25 is an explanatory drawing that shows a display state on the liquid crystal display when the automatic-selection-mode setting key, shown in FIG. 24, is turned ON.

FIG. 28(a) is an explanatory drawing that shows a display state on a liquid crystal display which corresponds to the operation at S121 shown in FIG. 27; FIG. 28(b) is an explanatory drawing that shows a display state on the liquid crystal display when the re-scan key, shown in FIG. 28(a), is turned ON; and FIG. 28(c) is an explanatory drawing that shows a display state on the liquid crystal display when the pre-view key, shown in FIG. 28(a) is turned ON.

FIG. 29 is an explanatory drawing that shows an example of a bill that is transmitted from the host computer to a digital copying machine in an image-forming system in still another embodiment of the present invention.

FIG. 30 is an explanatory drawing that shows a display state on a liquid crystal display in the digital copying machine with respect to the status of use that is filled in the bill of FIG. 29.

FIG. 31 is an explanatory drawing that shows a managed state of information on the current status of use in the host computer with regard to the respective digital copying machines.

FIG. 33 is a flow chart that shows operations in the case when the digital copying machine automatically prints and outputs the information that it has received from the host computer, during the operations shown in FIG. 32.

FIG. 34 is an explanatory drawing that shows operations of the digital copying machine wherein information that has been stored in the digital copying machine and the information that has been transmitted from the host computer are composed and displayed in the image-forming system that carries out the operations of FIG. 33.

FIG. 35 is an explanatory drawing that shows a state wherein the display information, shown in FIG. 34, is printed and outputted.

DESCRIPTION OF THE EMBODIMENT

[EMBODIMENT 1]

Referring to FIGS. 1 through 20, the following description will discuss one embodiment of the present invention.

The present image-forming system has an arrangement in which a digital copying machine, which functions as an image-forming apparatus, and an image-processing apparatus are connected to each other by a transfer device that functions as a means for making communications using digital image information.

Figure 2:
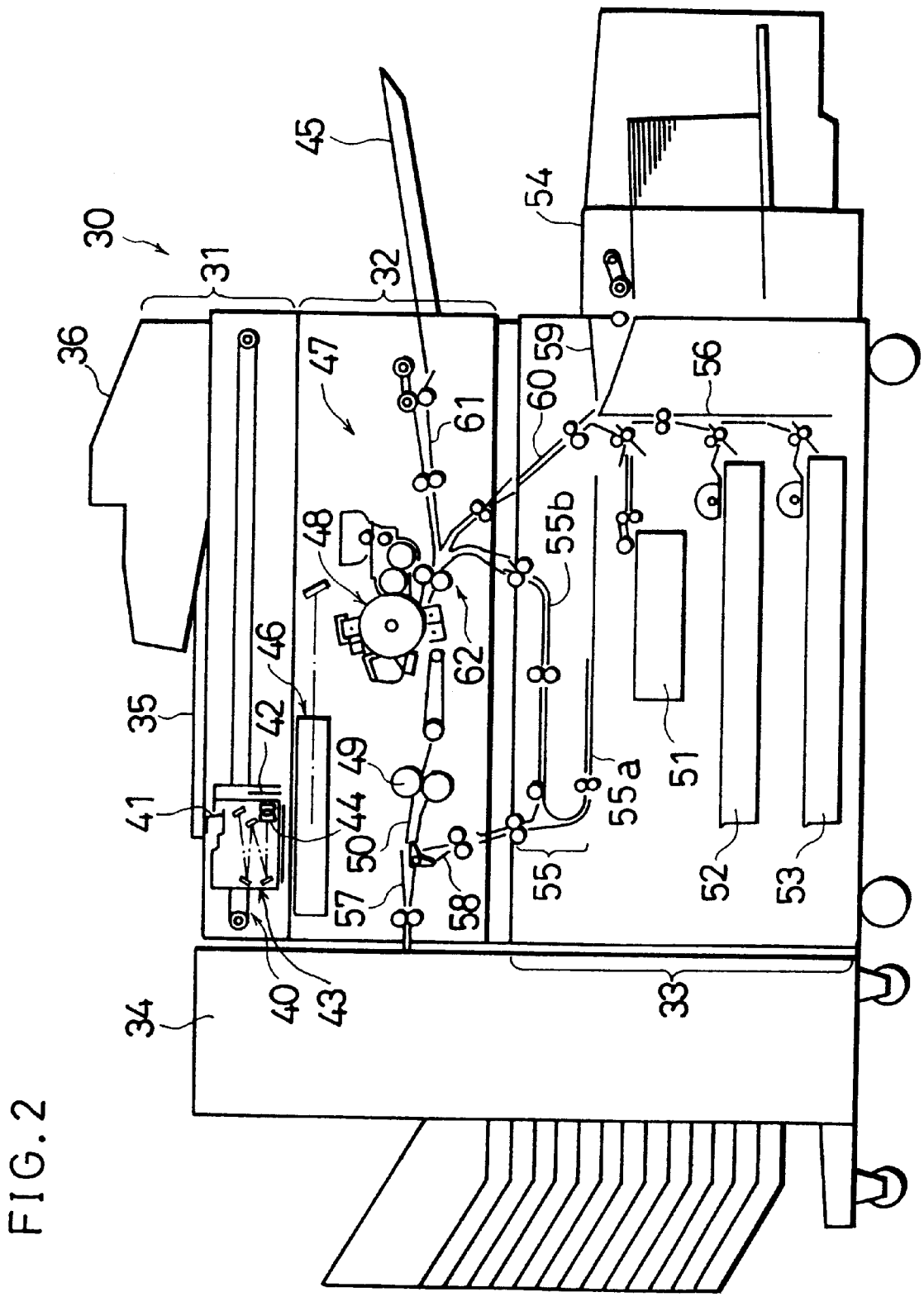
FIG. 2 is a longitudinal sectional view of a digital copying machine that is provided in the image-forming system.

FIG. 2 is a cross-sectional view showing the entire structure of a digital copying machine 30 which is one example of the above-mentioned digital copying machine. In FIG. 2, the digital copying machine 30 is constituted by a scanner section 31, a laser printer section 32 that functions as an image-recording section, a multi-stage paper-feed unit 33 and a post-processing device 34 including a sorter.

The scanner section 31 is provided with a document platen 35 made of transparent glass, a recirculating automatic document feeder 36 (hereinafter, referred to as RADF) for automatically supplying and feeding documents onto the document platen 35 and a scanner unit 40 that functions as a document-image reading unit for scanning and reading an image of a document that has placed on the document platen 35. The document image that has been read by the scanner section 31 is sent as image information, that is, as image data, to an image-processing section, which will be described later, and predetermined image processing is carried out on the image data.

The multi-stage paper-feed unit 33 has the first cassette 51, the second cassette 52, the third cassette 53 and the fourth cassette 54 that can be added upon selection.

Stacks of paper are housed in the respective stages of the cassettes 51 through 54 in the multi-stage paper-feed unit 33. When the user selects a cassette that contains paper of a desired size, sheets of paper are fed one by one from the stack of paper in the cassette, and successively transported toward the laser printer section 32.

The RADF 36 is a device that automatically feeds a plurality of documents that have been set on a predetermined document tray all together one by one onto the document platen 35 of the scanner section 31. The RADF 36 is provided with a transport path for one-sided documents, transport paths for double-sided documents, a transport-path switching mechanism and other mechanisms so that one side or double sides of a document can be scanned by the scanner unit 40 in accordance with selection made by the user.

The scanner unit 40 is provided with a lamp reflector assembly 41, a CCD (Charge Coupled Device) 42, a plurality of reflection mirrors 43 and a lens 44. The lamp reflector assembly 41 irradiates with light the surface of a document placed on the document platen 35 so as to scan it. The CCD 42 is an element that converts an image of reflected light from the document into an electric image signal. The reflection mirrors 43 directs the image of reflected light from the document to the CCD 42, and the lens 44 converges the image of reflected light from the document onto the CCD 42 as an image thereon. While successively placing documents onto the document platen 35, the scanner section 31 allows the scanner unit 40 to move along the lower surface of the document platen 35 and scans the document image so as to convert it into image data, through cooperative operations between the RADF 36 and the scanner unit 40.

Figure 3:
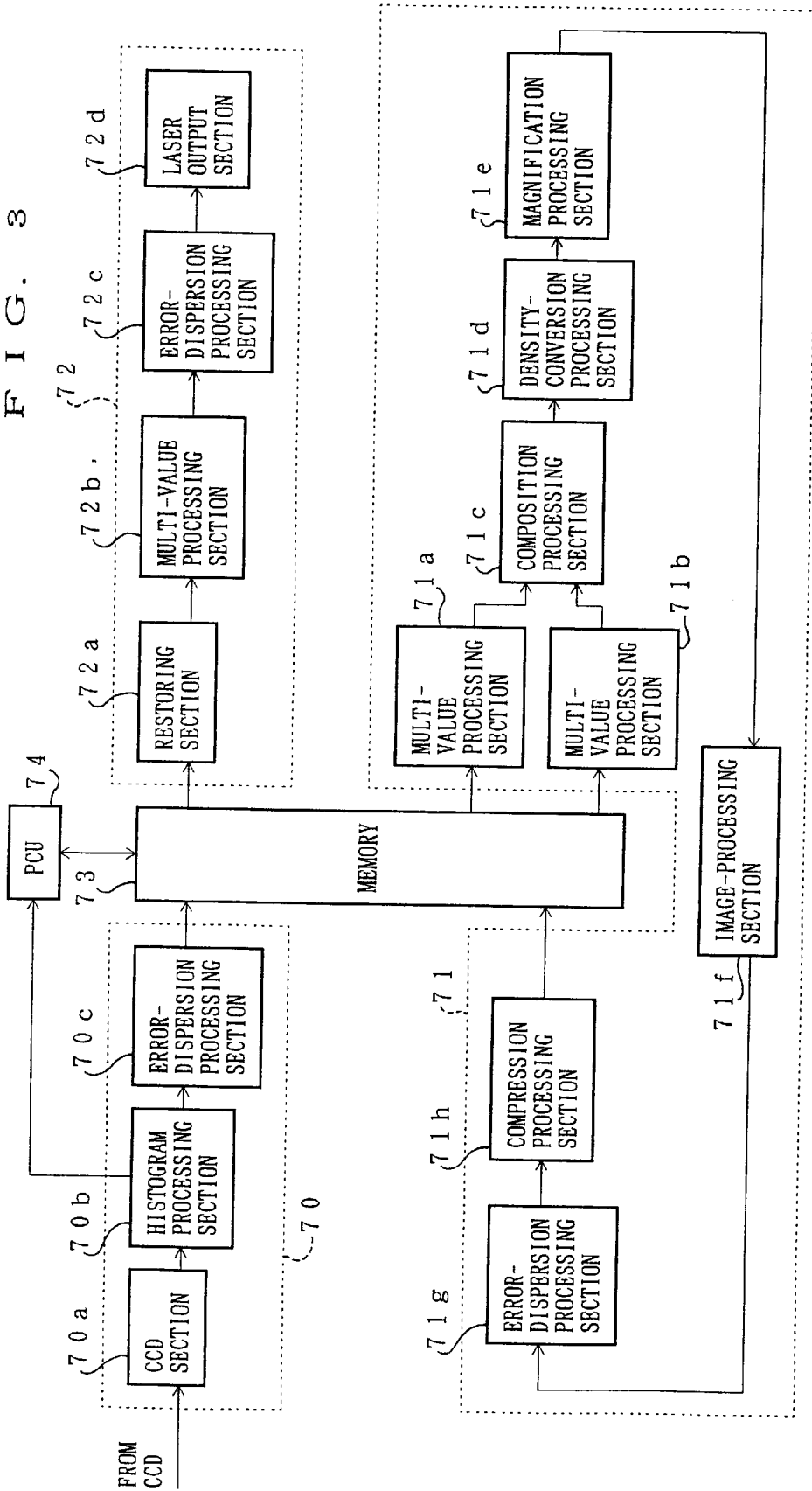
FIG. 3 is a block diagram that shows an image-processing section that is installed in the digital copying machine.

The image data, thus obtained from the scanner section 31, is sent to an image-processing section which will be described later, and after it has been subjected to various processes, the resulting data is temporarily stored in a memory 73 of the image-processing section that is shown in FIG. 3.

Thereafter, the image data is supplied to the laser printer section 32 in accordance with an instruction for output, and recorded onto a sheet of paper as an image.

The laser printer section 32 is provided with a manual paper tray 45, a laser-writing unit 46, and an electrophotographic process section 47 for forming images. The laser-writing unit 46 has a semiconductor laser for releasing a laser light beam in response to the image data from the memory 73, a polygon mirror for deflecting the laser light beam with a constant angular velocity, an f-θ lens for correcting the laser light beam that has been subjected to the deflection with a constant angular velocity so that it is subjected to a constant-velocity deflection on the photoconductor drum 48 in the electrophotographic process section 47, and other parts.

In the same manner as conventional arrangements, the electrophotographic process section 47 is provided with the photoconductor drum 48, and devices, such as a charger, a developing device, a transfer device, a separating device, a cleaning device, a static eliminating device and a fixing device 49, all of which are disposed around the photoconductor drum 48. A transport path 50 is placed on the downstream side of the fixing device 49 in a transporting direction of a sheet of paper on which an image has been formed. The transport path 50 is separated into a transport path 57 that connects to the post-processing device 34 and a transport path 58 that connects to the multi-stage paper-feed unit 33.

The multi-stage paper-feed unit 33 is provided with a double-side unit 55 and a common transport path 56. The double-side unit 55 has a reversing transport path 55a and a double-side/composite transport path 55b whose paper-feeding opening is connected to the paper-feeding and -sending opening of the reversing transport path 55a. The reversing transport path 55a is used for reversing the face and the bottom of a sheet of paper. The double-side/composite transport path 55b is used for directing sheets of paper that are transported through the transport path 58 into the electrophotographic process section 47.

The common transport path 56 is used for transporting sheets of paper that have been sent from any of the first cassette 51, the second cassette 52 and the third cassette 53 to the electrophotographic process section 47. The common transport path 56 is combined with the transport path 59 that comes from the fourth cassette 54 on the way to the electrophotographic process section 47, and connected to the transport path 60. The transport path 60, which joins the double-side/composite transport path 55b and a transport path 61 connecting to the manual paper tray 45 at their joining point 62, is directed to an image-forming position that is located between the photoconductor drum 48 and transfer device of the electrophotographic process section 47. The joining point 62 of these three transport paths are placed at a position close to the electrophotographic process section 47.

In the laser printer section 32, the image data, which has been read from the memory 73, is released as a laser light beam from the laser writing unit 46, and formed as an electrostatic latent image on the surface of the photoconductor drum 48 in the electrophotographic process section 47. The electrostatic latent image is visualized as a toner image, and the toner image is electrostatically transferred onto a sheet of paper that has been transported from the multi-stage paper-feed unit 33, and then is fixed on the sheet of paper by the fixing device 49. The sheet of paper on which the image has been formed in this manner is sent from the fixing device 49 to the post-processing device 34 through the transport paths 50 and 57, or again to the electrophotographic process section 47 through the transport paths 50 and 58 and the double-side unit 55.

The following description will discuss the image-processing section that is installed in the digital copying machine 30. The image-processing section carries out image processing on the image data of the document that has been obtained from the scanner section 31. As illustrated in FIG. 3, the image-processing section is provided with an image-data input section 70, an image-data processing section 71, an image-data output section 72, a memory 73 that functions as a memory section and a print control unit 74 (hereinafter, referred to as PCU) that functions as a control section.

The PCU 74, which controls the entire operations of the digital copying machine 30, is constituted by a CPU (Central Processing Unit). The memory 73, which stores image data, is constituted by a RAM (Random Access Memory), a hard disk and other parts.

The image-data input section 70 has a CCD section 70a, a histogram processing section 70b and an error-dispersion processing section 70c. The image-data input section 70 converts image data of a document that has been read by the CCD 42 into binary coded data, and processes the image data by using the error-dispersion method while representing the data as binary digital quantity in the histogram, thereby temporarily storing the resulting data in the memory 73.

In the CCD section 70a, analog signals, which correspond to pixel densities of the image data, are analog-to-digital converted, and then subjected to an MTF correction and a black-and-white correction, or a gamma correction, and the resulting signals are released to the histogram processing section 70b as digital signals with 256 gray scales (8 bit).

In the histogram processing section 70b, the digital signals released from the CCD section 70a are added individually for the respective pixel densities of 256 gray scales; thus, density information (histogram data) is obtained. The histogram data is sent to the error-dispersion processing section 70c as pixel data, and also sent to the PCU 74, if necessary.

In the error-dispersion processing section 70c, the digital signals of 8 bits/pixel, released from the CCD section 70a, are converted into one bit (binary coded) by the error-dispersion method which is one type of pseudo intermediate processing, that is, by the method for reflecting the error of binary coded digits to the binary coding decision between the adjacent pixels; thus, re-distributing operations for exactly reproducing the densities of local regions of a document are carried out.

The image-data processing section 71 is provided with a multi-value processing sections 71a and 71b, a composite processing section 71c, a density-conversion processing section 71d, a magnification processing section 71e, an image-processing section 71f, an error-dispersion processing section 71g and a compression processing section 71h. The image-data processing section 71 serves as a processing section for converting the inputted image data into image date that is desired by the user. Various processes are carried out in this section until final output image data has been stored in the memory 73. Additionally, the above-mentioned processing sections, contained in the image-data processing section 71, are used on demand, and are not necessarily used.

In the multi-value processing sections 71a and 71b, the image data that has been binary coded in the error-dispersion processing section 70c is again converted into data with 256 gray scales. In the composite processing section 71c, logical operations, that is, OR, AND or exclusive-OR operation, are selectively carried out for each pixel. The data used in this operation is pixel data stored in the memory 73 and bit data from a pattern generator (PG).

In the density-conversion processing section 71d, the relationship of the output density to the input density is properly set with respect to the data with 256 gray scales based upon a predetermined gray-scale conversion table. In the magnification processing section 71e, pixel data (density value) on a target pixel that is to be obtained after a specified change in magnification is found by carrying out an interpolating process based on the inputted known data in accordance with a specified magnification. Thereafter, in accordance with the pixel data, the change in magnification is carried out in the sub-scanning direction, and then is carried out in the scanning direction.

In the image-processing section 71f, various image processes are carried out on the inputted pixel data. Further, information extraction with respect to data rows, such as feature extraction, is carried out. In the error-dispersion processing section 71g, the same process as that carried out in the error-dispersion processing section 70c in the image-data input section 70 is carried out. In the compression processing section 71h, the binary data is compressed by a coding process that is referred to as "run length". Here, with respect to the compression of image data, the compression is operated in the last processing loop at the time when the final output image data has been complete.

The image-data output section 72 is provided with a restoring section 72a, a multi-value processing section 72b, an error-dispersion processing section 72c and a laser output section 72d. The image-data output section 72 restores the image data that has been stored in the memory 73 in a compressed state so as to again convert it to the original data with 256 gray scales, carries out an error dispersion process for quaternary data that provides smoother intermediate gray-scale expressions than binary data, and then transmits the resulting data to the laser output section 72d.

In the restoring section 72a, the image data that has been compressed by the compression processing section 71h is restored. The multi-value processing section 72b carries out the same process as that carried out in the multi-value processing sections 71a and 71b in the image-data processing section 71. The error-dispersion processing section 72c carries out the same process as that carried out in the error-dispersion processing section 70c in the image-data input section 70.

In the laser output section 72d, the digital pixel data is converted to a laser on/off signal in accordance with a control signal from a sequence controller which is not shown. The semiconductor laser in the laser-writing unit 46 is turned ON/OFF in response to the on/off signal, thereby allowing an electrostatic latent image to be written on the photoconductor drum 48.

Additionally, data, which is dealt in the image-data input section 70 and the image-data output section 72, is basically stored in the memory 73 in the form of binary data so as to save the capacity of the memory 73; however, the data may be processed in the form of quarterary data in order to prevent the degradation of image data.

Figure 4:
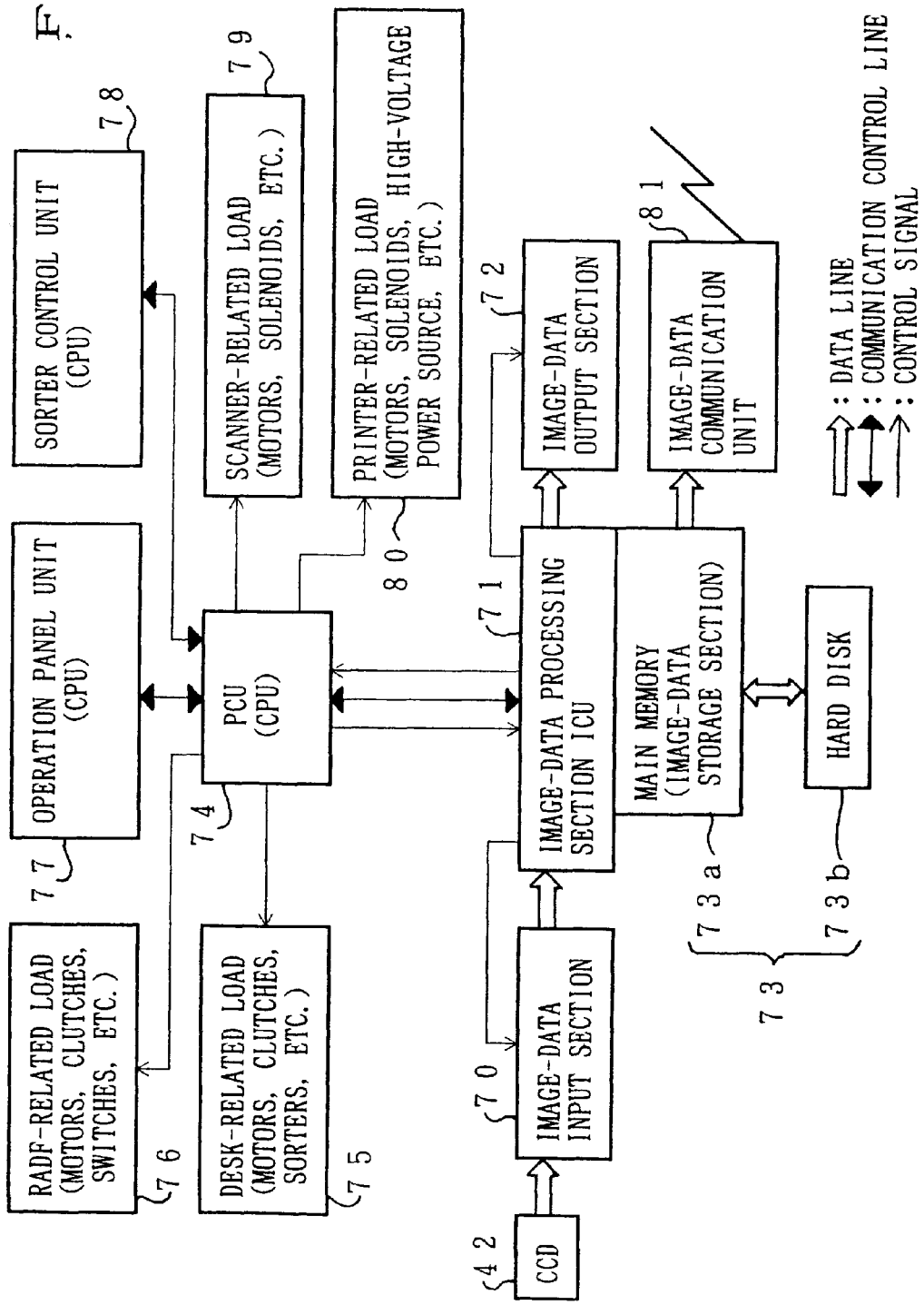
FIG. 4 is a block diagram that shows an arrangement of a control system that is installed in the digital copying machine.

The operation of the digital copying machine 30 is controlled by the PCU 74, and FIG. 4 shows the arrangement of the control system effected by the PCU 74.

In FIG. 4, the following parts and sections are connected to the PCU 74: a desk-related load 75, an RADF-related load 76, an operation panel unit 77, a sorter control unit 78, a scanner-related load 79, a printer-related load 80 and the aforementioned image-data processing section 71.

The PCU 74 supervises the above-mentioned parts by sequential control, and releases control signals to the respective parts upon controlling them. The desk-related load 75 is a load related to motors, clutches and other parts in the multi-stage paper-feed unit 33 and the sorter of the post-processing device 34 except for the digital copying machine main body. The RADF-related load 76 is a load related to motors, clutches, switches and other parts in the RADF 36. The scanner-related load 79 is a load related to motors, solenoids and other parts in the scanner unit 40. The printer-related load 80 is a load related to motors, solenoids, a high-voltage power source and other parts in the electro-photographic process section 47. The sorter control unit 78, which is provided with a CPU, controls the operation of the sorter in accordance with the control signal from the PCU 74.

The operation panel unit 77, which has a CPU, is an input section for various settings such as copying modes, instructions, etc. that are inputted by the user to the digital copying machine 30. The operation panel unit 77 transfers a control signal, for example, corresponding to a copying mode that has been set by the user through an input operation, to the PCU 74. The PCU 74 operates the digital copying machine 30 in accordance with the corresponding mode in response to the control signal. The PCU 74 also transfers to the operation panel unit 77 a control signal that indicates the operation state of the digital copying machine 30. In order to inform the user of the current operation state of the digital copying machine 30, the operation panel unit 77 displays the current state on its display section in accordance with the control signal.

Moreover, the memory 73, connected to the image-data processing section 71, is constituted by a main memory 73a and a hard disk 73b which are made of, for example, semiconductor memories. An image-data communication unit 81 is connected to the main memory 73a. The image-data communication unit 81 is installed so as to make possible information communications with other digital information apparatuses through image data, image-control signals, etc. For example, in a digital copying machine 93 shown in FIG. 11, the image-data communication unit 81 corresponds to an interface 93a, or corresponds to the interface 93a and a modem 98.

Figure 5:
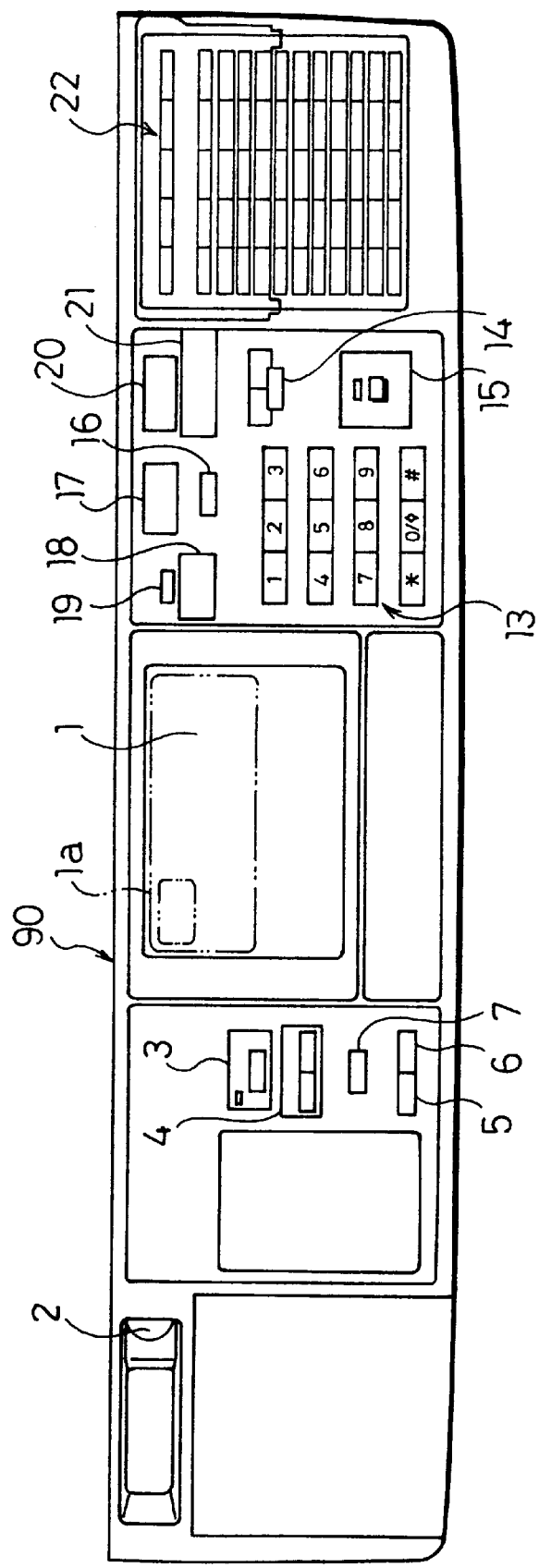
FIG. 5 is a front view of an operation panel that is attached to the digital copying machine.

The operation panel unit 77 is provided with an operation panel 90 which functions as an input section, as shown in FIG. 5. On the operation panel 90, a liquid crystal display 1, which is a display section of a tough panel system, is placed in the center thereof. A screen-switching instruction area 1a is disposed on one part of the screen of the liquid crystal display 1. The screen-switching instruction area 1a is used for inputting an instruction for switching the display screen of the liquid crystal display 1 to a screen for selecting image-editing functions. When the user directly presses this area 1a with his or her finger, various editing functions are displayed in a list on the screen of the liquid crystal display 1 so as to make it possible to select desired functions, as will be described later. In this case, when the user presses an area of a desired editing function among display areas of the various editing functions, the specified editing function is set.

Further, on the operation panel 90, a brightness adjusting dial 2, which adjusts the brightness of the screen of the liquid crystal display 1, is placed on its left-end position as shown in FIG. 5. A magnification automatic setting key 3, a zoom key 4, fixed magnification keys 5 and 6, and an equal magnification key 7 are provided between the dial 2 and the liquid crystal display 1. The magnification automatic setting key 3 is used for setting the mode for automatically selecting the copy magnification, and the zoom key 4 is used for setting the copy magnification at a rate of 1 percentage point. The fixed magnification keys 5 and 6 are used for selecting a fixed magnification, and the equal magnification key 7 is used for returning the copy magnification to the reference magnification (equal magnification).

On the right-hand position of the liquid crystal display 1 in FIG. 5, a number setting key 13, a clear key 14, a start key 15, an all cancellation key 16, an interruption key 17, an operation guide key 18, a message forwarding key 19, a memory-transmission mode key 20, a copy/facsimile mode switching key 21, and one-touch dial key 22 are disposed.

The number setting key 13 is used for setting the number of copies, and the clear key 14 is operated when the number of sheets is cleared, or when a continuous copying operation is stopped in the middle of the operation. The start key 15 is used for instructing the start of a copy process, and the all cancellation key 16 is used for cancelling all the presently set modes so as to return the machine to the reference state. The interruption key 17 is operated when upon a continuous copying process, another document is to be copied. The operation guide key 18 is operated when the user does not know how to use the digital copying machine 30, and upon pressing the key, the liquid crystal display 1 displays how to operate the digital copying machine 30. The message forwarding key 19 is used for switching the display of messages that have been displayed by the operation of the operation guide key 18 in a successive forwarding manner.

The memory-transmission mode key 20, the copy/facsimile mode switching key 21, and the one-touch dial key 22 are setting keys related to facsimile modes. The memory-transmission mode key 20 is used for instructing that the transmit document be transmitted after having been temporarily stored in the memory, and the copy/facsimile mode switching key 21 is used for switching modes of the digital copying machine 30 between the copy and facsimile. The one-tough dial key 22 is used for dialing the phone to a receiver whose telephone number has been preliminarily stored in the digital copying machine 30 by a one-touch operation.

Here, the above-mentioned arrangement of the operation panel 90 related to various kinds, layout, etc. of keys is merely given as one example, and it may be modified depending on various functions to be installed in the digital copying machine 30.

The liquid crystal display 1 is, for example, allowed to give the following displays on the screen: a basic screen as shown in FIG. 6(a), the first-function setting screen shown in FIG. 6(b), the second-function setting screen shown in FIG. 6(c), an image-quality setting screen shown in FIG. 7(a), a post-process setting screen as shown in FIG. 7(b), an initial setting screen shown in FIG. 8(a), a finger-print registration screen shown in FIG. 8(b), a department-management setting screen shown in FIG. 8(c), a limiter setting screen shown in FIG. 9(a), a simulation screen shown in FIG. 9(b), and other screens which will be described later.

The basic screen is provided with a function setting region, an image-quality setting region, a post-processsetting region, an initial setting region, an operation region for set-function confirmation and a cassette-setting region. These regions correspond to setting keys 101a through 101f. Moreover, the basic screen includes a set-cassette display, a density display, a copy-number display and a magnification display. When the above-mentioned operation region for set-function confirmation is operated, functions that have been set in the present image-forming system are displayed on the liquid crystal display 1.

The first-function setting screen is provided with regions for setting various editing functions, such as mirror image, slanted character, inversion, shading, trimming and masking. These regions correspond to setting keys 102a through 102f. Moreover, operation regions are set so as to provide transitions to the basic screen and the next screen.

The second-function setting screen is provided with regions for setting editing functions, such as composition, independent change in magnification, and translation functions. These regions correspond to setting keys 103a through 103c. Moreover, operation regions are set so as to provide transitions to the basic screen and the next screen.

The image-quality setting screen includes setting regions for setting the density, HI-FI (high-image-quality copying mode), background-elimination mode, automatic-magnification-change mode, character mode, character-photograph mixed mode, photograph mode and magnification. Further, displays are provided for density and magnification.

The post-process setting screen is provided with an input region for determining whether a document in question is one-sided or double-sided, an input region for determining whether copying in question is made on one side or on double sides, and a setting region for binding functions. Moreover, setting regions for post-process functions, such as staple sorter, sorter and finish, and a setting region for electronic RDH are placed.

The initial setting screen is provided with setting regions for various modes, such as finger-print registration, department management, simulation, maintenance management, new function registration, and output-device selection, as well as an operation region for making a transition to the basic screen.

On the finger-print registration screen, input regions for a department code and a name are placed, and the inputted department code and name are displayed.

Figure 10:
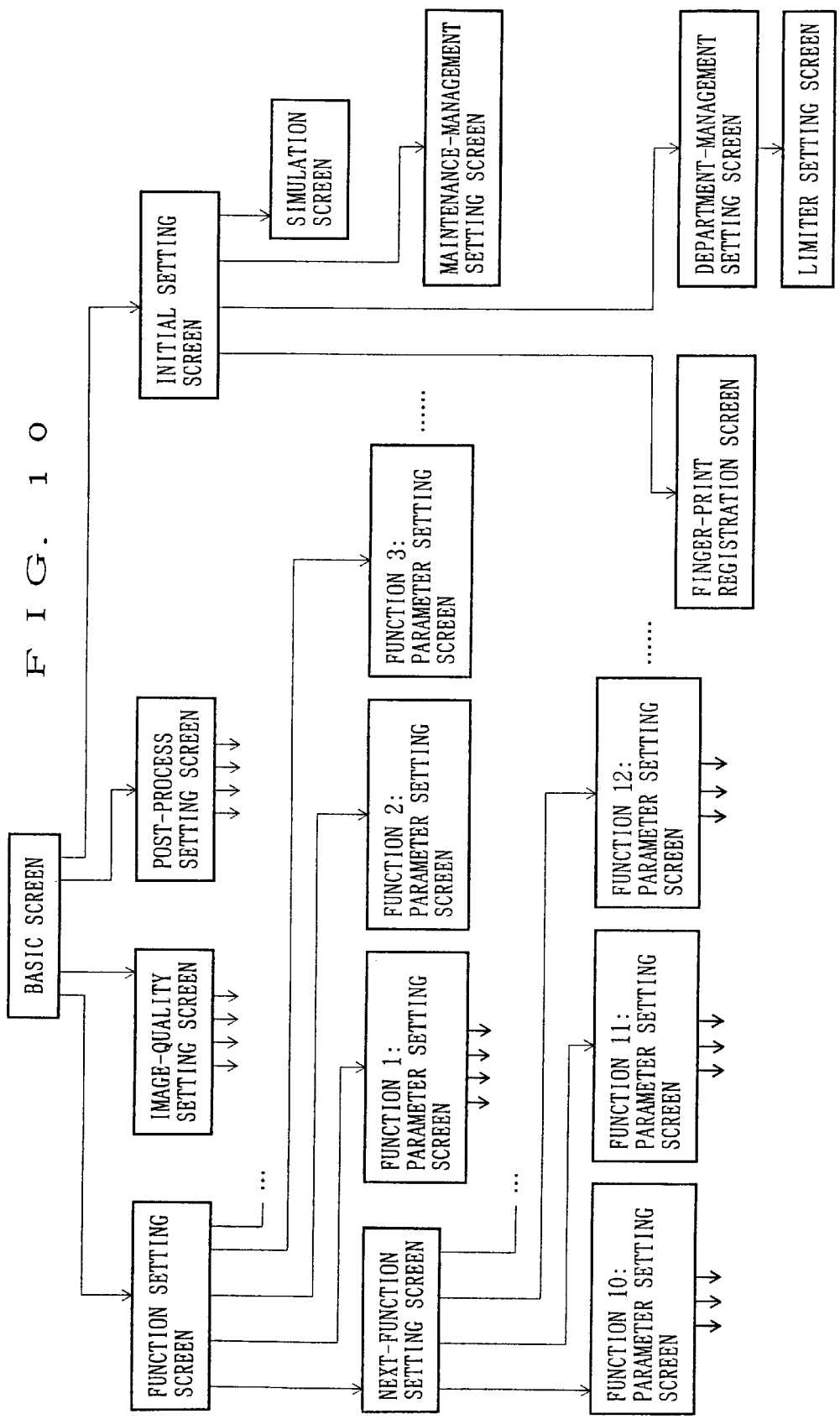
FIG. 10 is an explanatory view that shows processes in which the respective screens transfer to other screens in the liquid crystal display on the operation panel.
Figure 12A:
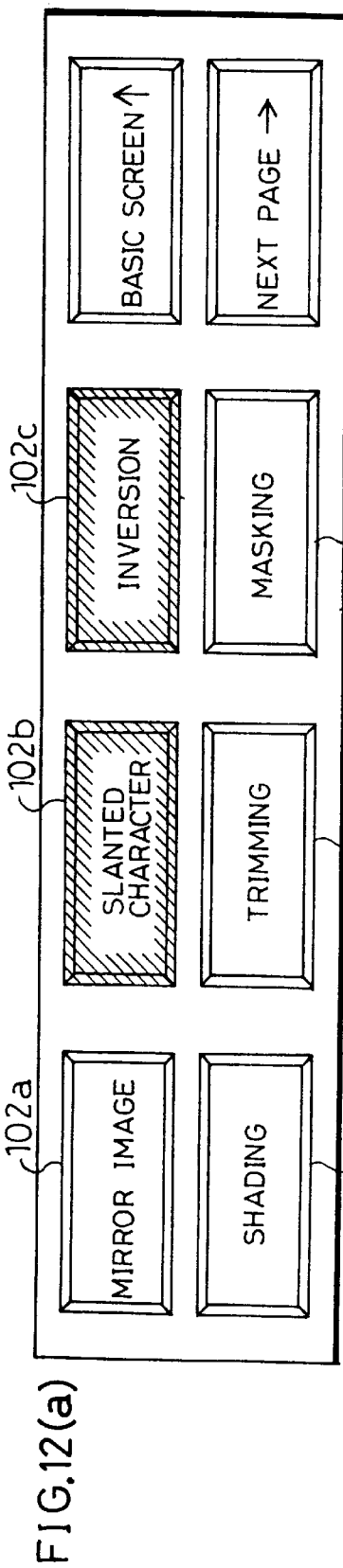
FIG. 12(a) is an explanatory drawing that shows a selected state of image-editing functions on the first-function setting screen shown in FIG. 6(b)
Figure 12B:
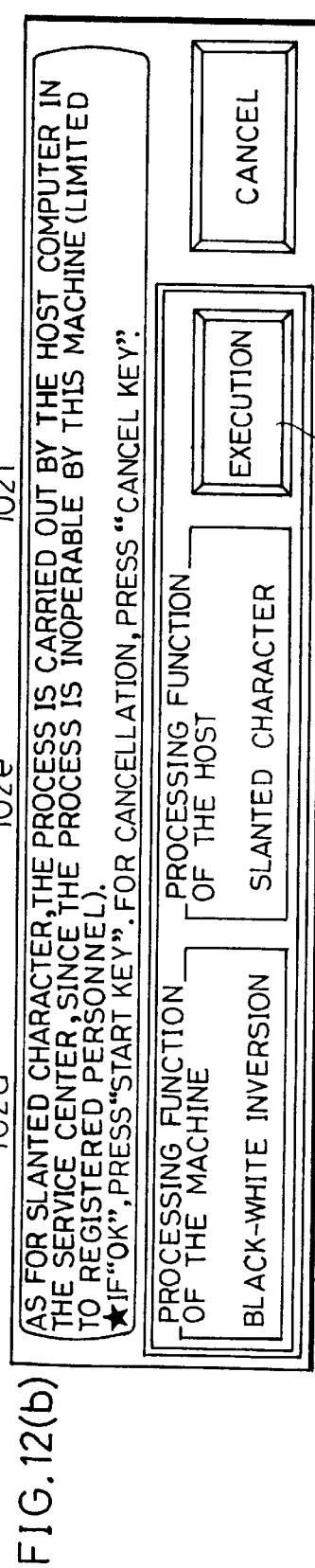
FIG. 12(b) is an explanatory drawing that shows a display state of the liquid crystal display that corresponds to an operation at S4 shown in FIG. 1.
Figure 12C:
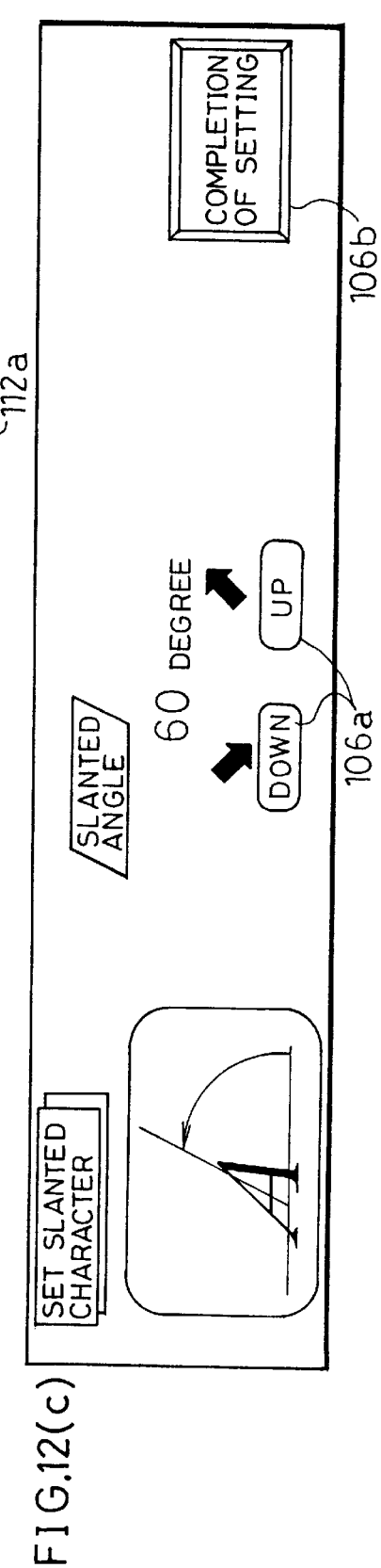
FIG. 12(c) is an explanatory view that shows an inclined-font setting screen of the liquid crystal display on the operation panel.

Transitions to the respective screens are carried out in accordance with the sequence shown in FIG. 10. In other words, in the liquid crystal display 1, the basic screen is first displayed, and on this display screen, when any of the function setting region, image-quality setting region, post-process setting region and initial setting region is pressed, the display screen is switched to the screen corresponding to the specified region. For example, if the function setting region is pressed, the screen is switched to the first-function setting screen, and if the operation region for making a transition to the next screen is pressed on this screen, the screen is switched to the second-function setting screen (NEXT-function setting screen). Here, if the operation region for making a transition to the basic screen, the screen is switched to the basic screen. Moreover, for example, in the first-function setting screen, when a slanted-character function setting region is pressed, the screen is switched to the slanted-character setting screen as shown in FIG. 12(c). This screen corresponds to, for example, function-2 parameter setting screen in FIG. 10. The slanted-character setting screen is provided with an angle input key 106a that is a setting region for a slanted angle and a setting completion key 106b that is an input region for setting completion. Further, the resulting slanted angle is displayed.

Additionally, in the first- and second-function setting screens, when a desired function setting region is pressed, the screen of the liquid crystal display 1 is switched to a corresponding parameter setting screen such as the above-mentioned slanted-character setting screen.

Here, Table 1 shows examples of image-editing functions that are provided in the present image-forming system and that can be set by the operations of the above-mentioned function setting regions. However, the image-editing functions that are set in the present image-forming system are not intended to be limited thereby. For example, other functions, such as a function for making a fair copy of hand-written characters and images, may be provided. (CONTINUED)

TABLE 1

| Image-editing functions | Outline of processing |
|---|---|
| Independent change in magnification | Sets different magnifications with respect to the longitudinal and lateral directions of a document image. |
| Sharpness | Adjusts the image quality of a copy. |
| Margin for binding | Makes a margin in a copy with a desired width. |
| Erasure of frame | Makes a copy with its frame erased. |
| Centering | Makes a copy virtually in the center of a sheet of copy paper. |
| 2 copies in one set | Copies a book. |
| Address copy | Outputs a copy image with an address incorporated therein. |
| Multi-shot | Combines and copies images of a plurality of pages to one sheet and copied. |
| Trimming | Copies only a specified portion. |
| Masking | Makes a copy with a specified portion erased. |
| Shifting function | Makes a copy with a document image shifted to a desired position. |
| Composite function | Composes and copies a plurality of document images. |
| Black-white inversion | Makes a copy with a negative/positive inversion. |
| Net process | Makes a copy with a net providing/erasing process. |
| Shading | Makes a copy with shades. |
| Framing | Makes a copy with its image framed. |
| Slanted image | Makes a copy with its image slanted. |
| Mirror image | Makes a copy with its image inverted like a mirror image. |
| Repeat copy | Copies a plurality of the same images on one sheet. |
| 2 in 1 copy | Copies a set of two documents on one sheet. |

TABLE 1-continued

| Image-editing functions | Outline of processing |
|---|---|
| Dated copy | Makes a copy with the date written therein. |
| Center mark | Copies an image with a center mark added thereto. |
| Enlarged divisional output | Copies an enlarged document onto a plurality of sheets in a divided manner. |
| Translation | Translates a document. |
| High-image-quality process | Makes a copy using a high-image-quality process. |

Figure 11:
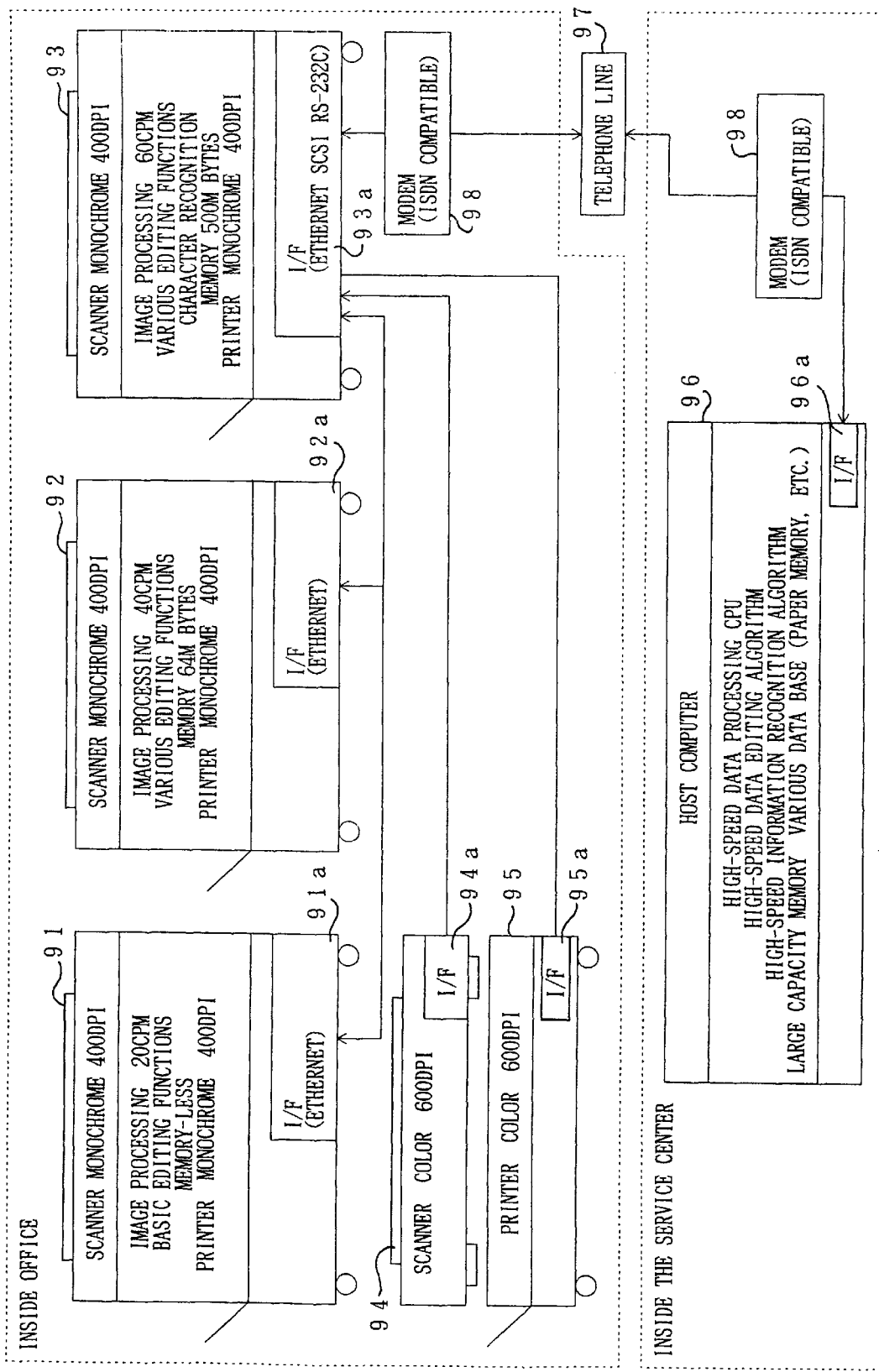
FIG. 11 is a block diagram that shows a schematic construction of the image-forming system in accordance with one embodiment of the present invention.

For example, as shown in FIG. 11, the present image-forming system is provided with digital copying machines 91 through 93 that are image-forming apparatuses installed in an office, a scanner 94 and a printer 95 that functions as an image-forming apparatus, as well as a large-size host computer 96 that is an image-forming apparatus installed in a service center located outside the office. The service center is a place where various information services including high-level image processes can be carried out.

The digital copying machine 91 is a low-function, inexpensive, memory-less one, and merely has basic editing functions. Here, "memory-less" means that although a page memory capable of storing a lot of image data is not provided, at least a line memory required for carrying out normal jobs for image data in a digital copying machine is provided. Moreover, basic editing functions are those functions, such as black-white inversion, that can be carried out without the need for a page memory. Moreover, in the digital copying machine 91, the scanner function, provided by the scanner unit 40 in FIG. 2, has a resolution of 400 DPI in the case of a monochrome process. Moreover, the copy speed is set to 20 CPM (20 sheets/minute), which is typical for low-speed models. Furthermore, in the digital copying machine 91, the printer function, provided by the laser printer section 32, is set to 400 DPI in the case of a monochrome process, and an interface (I/F) 91a is also installed.

The digital copying machine 92 has a scanner function of a resolution of 400 DPI in the case of a monochrome process, a printer function of 400 DPI in the case of a monochrome process, and a copy speed of 40 CPM, which are typical for middle-class apparatuses. Further, there are installed various editing functions, a memory of 64 M bytes (a capacity corresponding to 4 pages in A4-size with 400 DPI, 8 bits/pixel) that functions as a page memory, and an interface 92a. The memory is referred to as the main memory 73a shown in FIG. 4.

The digital copying machine 93 has a scanner function of a resolution of 400 DPI in the case of a monochrome process, a printer function of 400 DPI in the case of a monochrome process, and a high copy speed of 60 CPM. Further, there are installed various editing functions, a character-recognizing function, a coding function for bit data and a large capacity of 500 M bytes (a capacity corresponding to 100 pages in A4-size with 400 DPI, 8 bits/pixel at a compression rate of ¼) that functions as a page memory, which are regarded as high-class functions. Therefore, the digital copying machine 93 makes it possible to carry out a process for changing the order of pages of image data and also to store document data in various formats. The above-mentioned memory corresponds to a memory including the main memory 73a and the hard disk 73b shown in FIG. 4. Further, the digital copying machine 93 is provided with an interface 93a. Moreover, the digital copying machines 91 through 93 are connected by, for example, Ethernet that is a network capable of transferring image data at high speeds. Furthermore, the interface 93a is compatible with commonly-used standards such as SCSI (Small Computer System Interface) and RS-232C.

Here, the scanner 94, which can read color images, has a resolution of 600 DPI. The printer 95, which can print color images, has a recording density of 600 DPI. These scanner 94 and printer 95 are connected to the digital copying machine 93 through the respective interfaces 94a and 95a, and allowed to transmit and receive image data to and from the digital copying machine 93.

The host computer 96 is provided with a CPU for high-speed data processing, algorithms for editing high-speed data, algorithms for recognizing high-speed information, a large-capacity memory whose capacity is far greater than the memory 73 of the digital copying machine 93, various data bases for recognizing paper money, etc., and an interface 96a.

The digital copying machine 93 and the host computer 96 are connected to each other by a telephone line 97 through the respective interfaces 93a and 96a. Here, the connection between the apparatuses is not intended to be limited to the telephone line 97; any suitable communication line, such as an optical communication network, can be used for connecting them. Commonly-used modems 98 (modulation devices), such as those applicable to, for example, ISDN (Integrated Services Digital Network), are installed on the digital copying machine 93 side and the host computer 96 side. The modems 98 are devices for converting digitized electric signals into signals that are suitable for transmitting and receiving by the use of the telephone line 97. The modulation methods in the modems 98 include PM (Phase Modulation), AM (Amplitude Modulation), FM (Frequency Modulation) and other methods. The interfaces 91a through 96a, the telephone line 97 and the modems 98 constitute a transfer means.

It is possible to transmit and receive various types of data between the digital copying machines 91 through 93 and the host computer 96 through the telephone line 97. The contents of the data are, for example, control-use command codes and bit data such as density data of images. Moreover, each of the digital copying machines 91 through 93 has a FAX function for transmitting and receiving data through the telephone line 97 and a printer mode for printing document data released from a personal computer, a word processor and other devices.

Additionally, FIG. 11 shows a case wherein one office is connected to a service center; however, in an actual case, offices of a number of users that are located throughout the country may be connected thereto. Moreover, in general, digital copying machines that are installed in the respective offices have a lot of variations in their functions depending on their prices, capacities of image memory and other aspects, and various types of them are used depending on purposes for use in respective offices and degrees of demand for various functions. Therefore, with respect to the digital copying machines installed in the offices, a number of like commodities may be used without being limited to the digital copying machines 91 through 93.

Moreover, the host computer 96, which is intended to provide high image-processing functions including image-editing functions and high-speed image processing, is at least provided with functions that are commonly installed in a digital copying machine. However, those functions that are installed in inexpensive models may be omitted even if they are basic functions. In other words, predetermined functions are installed in the host computer 96 by taking into account suitable functions that are to be supplied by the service center.

Furthermore, with respect to the image-processing functions, new functions are successively developed in order to meet demands for improvements of infrastructure and improvements for business efficiencies in the information society. Therefore, with respect to the image-processing functions installed in the host computer 96, new functions are added thereto or introduced in place of those conventionally used and relatively reduced in their utility value. Here, the following table 2 shows one example of image-editing functions that are provided in the digital copying machines 91 through 93 and the host computer 96.

In the above-mentioned arrangement, the following description will discuss the basic operations of the present image-forming system. The digital copying machines 91 through 93 in the offices and the host computer 96 are capable of transmitting and receiving data between each other through the telephone line 97. Therefore, for example, a digital signal, transmitted from any of the digital copying machines 91 through 93, is modulated in the modem 98 on the digital copying machine 93 side, and transmitted to the host computer 96 side through the telephone line 97. Then, the resulting signal is demodulated by the modem 98 on the host computer 96 side, and inputted to the host computer 96. The contents of the digital signal are control-use command codes and bit data such as density data of images. Therefore, the host computer 96 analyzes the contents of the control-use command codes, and carries out image processing in accordance with image-editing functions that have been specified on the image data. The image data that have been processed by the host computer 96 is returned to the digital copying machine 93 through the reverse sequence to that upon transmission, and outputted onto a sheet of paper as image data, for example, by the digital copying machine 93.

As shown in Table 2, the digital copying machines 93, 92 and 91 have higher image-editing functions in this order, and the host computer 96 has the highest image-processing functions. Therefore, even in the case when an image-editing function which is not provided in the digital copying machines 91 through 93 in the offices is required, or in the case when a desired image-editing function is not available due to an insufficient capacity of the memory 73 on the digital copying machines 91 through 93 side, image data is transferred from the office side to the service center side and the image data, after having been processed in the service center, is returned to the office side as described above; thus, it is possible to output images that have been subjected to the desired processing onto a sheet of paper on the office side.
(CONTINUED)

TABLE 2

| Image-editing functions | Copying Machines | | | Host Comp |
| --- | --- | --- | --- | --- |
| | 91 | 92 | 93 | |
| Independent changes in magnifications | √ | √ | √ | √ |
| Sharpness | | √ | √ | √ |
| Margin for binding | √ | √ | √ | √ |
| Erasure of frame | √ | √ | √ | √ |
| Centering | | √ | √ | √ |
| 2 copies in one set | | √ | √ | √ |
| Address copy | | | √ | √ |
| Multi-shot | | √ | √ | √ |
| Trimming, Masking | | √ | √ | √ |

TABLE 2-continued

| Image-editing functions | Copying Machines | | | Host Comp |
| --- | --- | --- | --- | --- |
| | 91 | 92 | 93 | |
| Shifting function | | √ | √ | √ |
| Composite function | | | √ | √ |
| Black-White inversion, Net process | √ | √ | √ | √ |
| Shading, Framing | | | √ | √ |
| Slanted image, Mirror image | | | √ | √ |
| Repeat copy | √ | √ | √ | √ |
| 2 in 1 copy | | | √ | √ |
| Dated copy, Center mark | | | √ | √ |
| Enlarged divisional output | | | | √ |
| Translation | | | | √ |
| High-image-quality process | | | | √ |

Next, referring to the flow chart of FIG. 1, an explanation will be given in detail of the operation for carrying out image processing by using the image-processing service in the service center in the present image-forming system. Here, it is supposed that "black-white inversion" and "slanted character" are selected as kinds of image processing that are applied to a document image in the digital copying machine 91. Additionally, the function-setting screen of the liquid crystal display 1 is designed to display functions provided in the host computer 96 as well.

In this case, when the function-setting key 101a is pressed (S1) on the basic screen of the liquid crystal display 1 shown in FIG. 6(a), the screen of the liquid crystal display 1 is switched to the first-function setting screen as shown in FIG. 6(b). Next, in this state, when a slanted-character setting key 102b and an inversion setting key 102c are pressed (S2), the regions of the slanted-character setting key 102b and the inversion setting key 102c are displayed in an inverted state as shown in FIG. 12(a) on the screen of the liquid crystal display 1. These inverted displays indicate that the slanted-character setting key 102b and the inversion setting key 102c have been pressed.

Next, the PCU 74 in the digital copying machine 91 makes a judgement as to whether or not the set functions include any function that is inoperable in the digital copying machine 91 (S3). In this case, as shown in Table 2, the digital copying machine 91 does not have a "slanted-character" function although it has a "black-white inversion" function. Therefore, the result of judgement at S3 is "YES". Accordingly, the information that "slanted character" is inoperable in the digital copying machine 91 and the information that the host computer 96 should be used for processing "slanted character" are displayed on the liquid crystal display 1 (S4). Such a display screen is shown in FIG. 12(b).

Successively, when a start key 112a, placed on the above-mentioned display screen, is pressed (S5), the screen of the liquid crystal display 1 is switched to a slanted-character setting screen shown in FIG. 12(c). Then, the angle of the "slanted character" is inputted through an angle input key 106a that is placed on the display screen, and when a setting completion key 106b is pressed, "black-white inversion", which is operable in the digital copying machine 91, is carried out (S6). In this case, image data that is to be processed is, for example, data of a document image that has been read by the scanner section 31. Further, since the digital copying machine 91 does not have a page memory and only has a line memory, the image data is successively processed as image data that is read line by line. Here, the line memory is installed, for example, inside the PCU 74, and used when the PCU 74 is operated.

Next, a scramble process is carried out on the image data that has been subjected to the "black-white inversion" process (S7), and the resulting data is successively transferred to the host computer 96 in the service center (S8). In this case, a control-use command code, that is, a command code for instructing the "slanted-character" process, and image data that is to be subjected to the "slanted-character" process are inputted to the host computer 96 through the interface 91a, the line connecting the digital copying machine 91 and the digital copying machine 93, the interface 93a, the modem 98, the telephone line 97, the modem 98 and the interface 96a.

Here, the scramble process is carried out so as to prevent the image data from leaking out. In other words, in the present image-forming system, communications between the office sides and the service-center side are carried out by using, for example, a general-use net work. In this case, a number of unidentified people can freely access the network, and there is a possibility that data flowing through the network might be illegally taken by a person such as a hacker. Therefore, such leakage of image data is prevented by the scrambling process.

The host computer 96, on the other hand, unscrambles the data sent from the digital copying machine 91 (S9). Then, the host computer 96 confirms the contents of process that are requested through a command code, and carries out a "slanted-character" process on the image data that has already subjected to the "black-white" inversion process in accordance with the contents of the request (S10).

Upon completion of the processes on the image data, the host computer 96 scrambles the image data that has been subject to the processes (S11), and then returns the image data to the digital copying machine 91 from which the image data has originally transmitted, through a path that is reversed to the previous path (S12).

The digital copying machine 91 unscrambles the transmitted data (S13), and outputs the image data onto a sheet of paper as an image (S14). This operation is carried out as explained with respect to the aforementioned digital copying machine 30.

Here, if a predetermined time has elapsed at S5 before the start key 112a is pressed, only the "black-white" inversion process, which is operable in the digital copying machine 91 (S16), is carried out and the sequence proceeds to S14. Here, the time counting operation of the predetermined time is carried out by a timer that is provided in the PCU 74. Further, at S3, if no functions are inoperable by the digital copying machine 91 among the set functions, the sequence proceeds to S16.

As described above, in the present image-forming system, if an image-editing function is selected and it is not provided in the digital copying machines 91 through 93 inside the offices, the host computer 96 in the service center is called for so as to carry out the corresponding image-editing process. In other words, the digital computers 91 through 93 inside the offices are allowed to use updated, abundant image-editing functions, that is, image-processing functions, installed in the host computer 96, by merely spending inexpensive communication fees. Therefore, it is not necessary for the digital copying machines 91 through 93 inside the offices to acquire high image-editing functions and other functions, and even in the case when the functions of the digital copying machines 91 through 93 become relatively out-dated, it is not necessary to replace them with new models. Thus, it becomes possible to reduce the economic burden imposed on the user.

Figure 1:
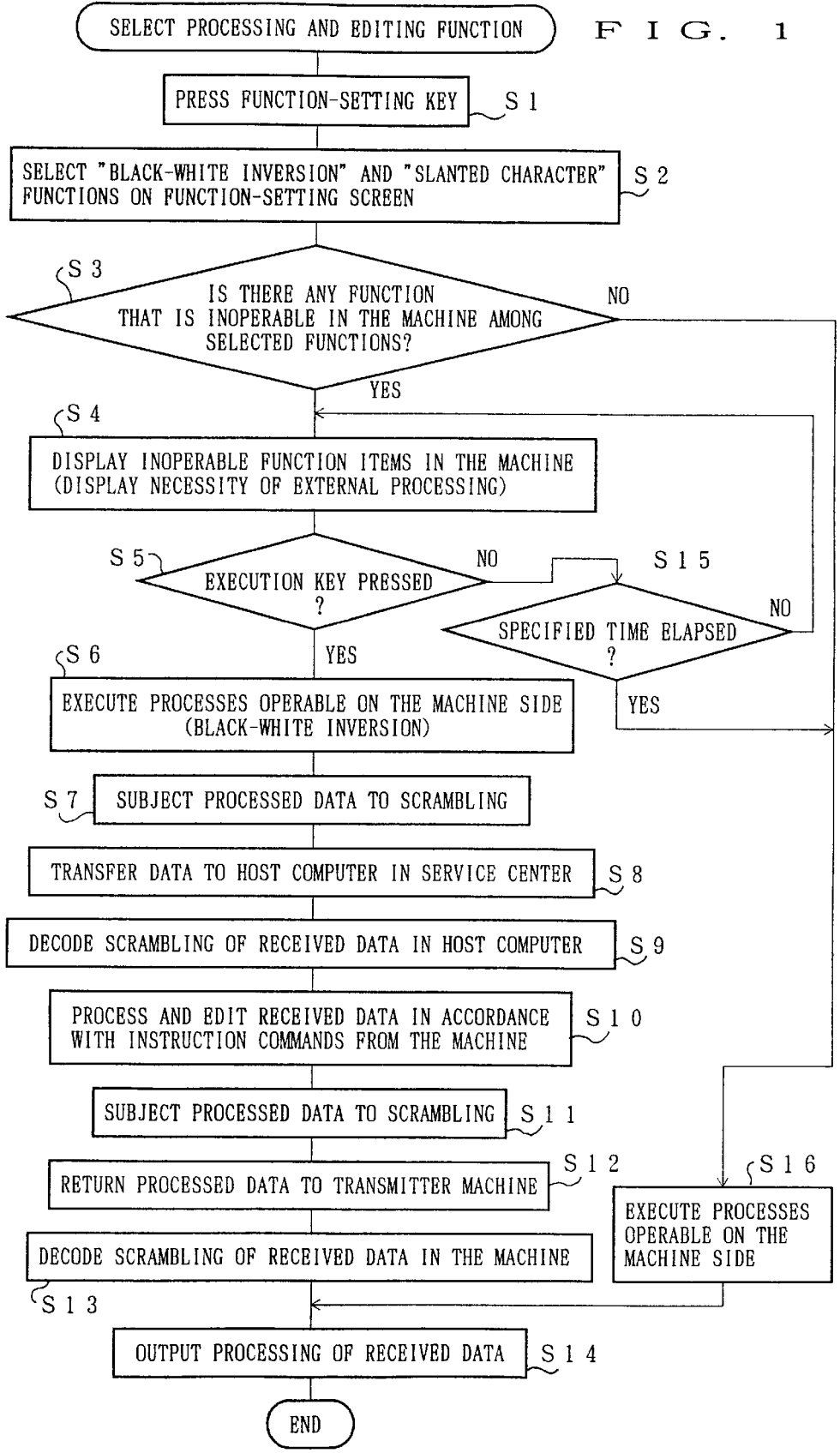
FIG. 1 is a flow chart that shows operations of an image-forming system in accordance with one embodiment of the present invention.

Additionally, in the example shown in FIG. 1, since it is assumed that the request for the process in the service center is charged and that the process in the service center is carried out based on the agreement of the user of the digital copying machine 91, the request for the process is directed to the service center upon depression of the start key 112a at S5. However, as shown in FIG. 13, instead of this arrangement, if an inoperable function is selected on the digital copying machine 91 side at S3, the request for the corresponding process may be immediately directed to the service center without the presence or absence of the depression of the start key at S5.

Figure 14:
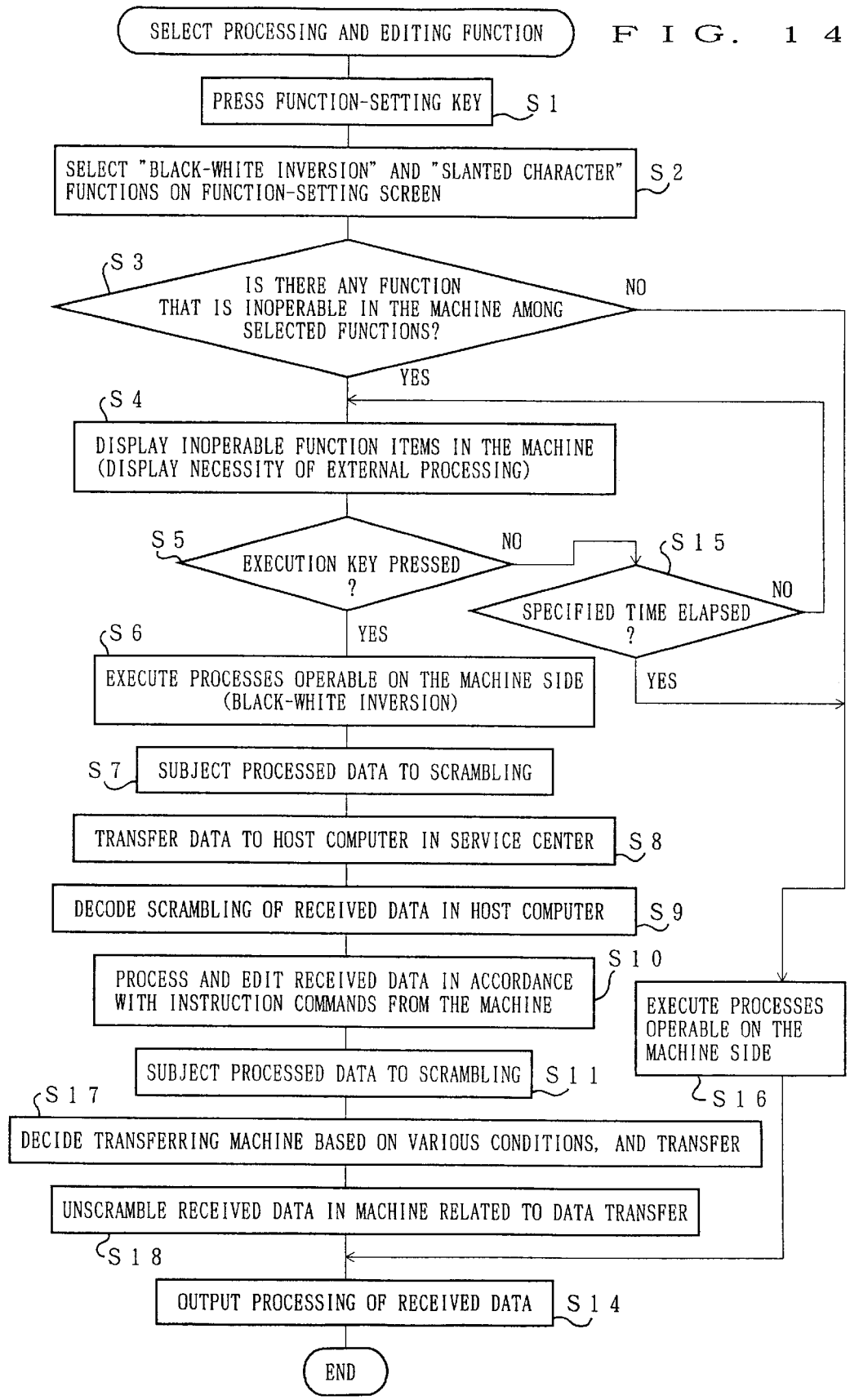
FIG. 14 is a flow chart that shows still another example of the operation of the image-forming system shown in FIG. 1.

Moreover, in the example shown in FIG. 1, at S12, the image data that has been subject to the processes in the host computer 96 is returned to the digital copying machine 91 from which the image data was originally transmitted; however, instead of this arrangement, as shown at S17 and S18 in FIG. 14, a copying machine to which the processed image data is returned may be selected in accordance with various conditions, and the image may be outputted by the selected digital copying machine or printer.

Next, referring to flow charts shown in FIGS. 15(a) and 15(b), an explanation will be given of sequences in which newly developed image-processing functions, that is, new functions, are installed in the host computer 96 and in which the new functions are registered in the machines on the office side. Here, it is supposed that the new functions are registered in the digital copying machine 93.

Figure 15A:
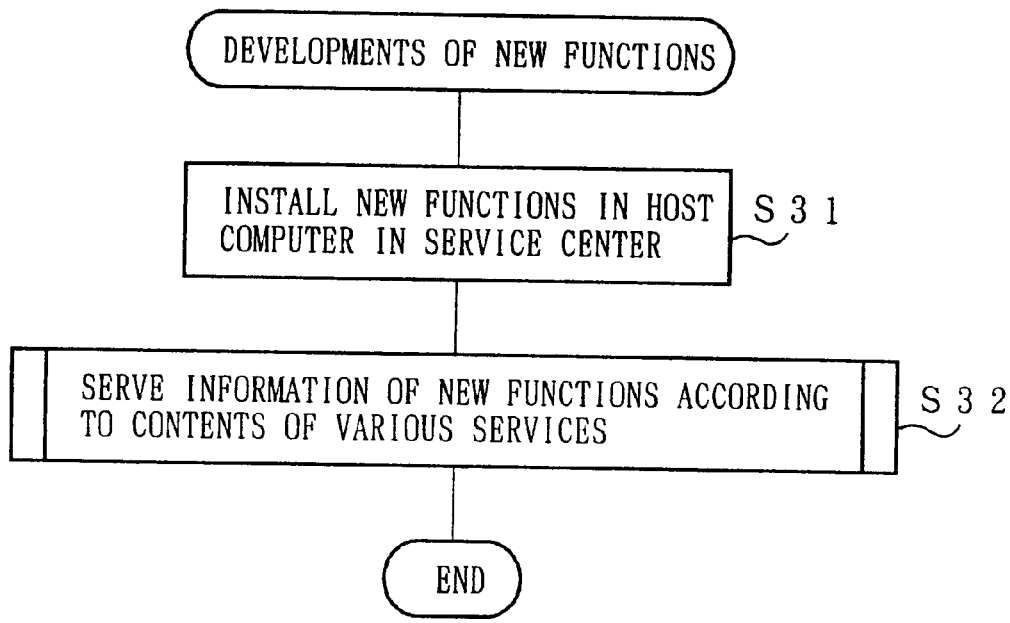
FIG. 15(a) is a flow chart that shows installing procedures of new functions to the host computer shown in FIG. 11.

As shown in FIG. 15(a), a newly developed image-processing algorithm (software) is first installed in the host computer 96 inside the service center (S31). Accordingly, the host computer 96 carries out an information service including the new function in accordance with the contents of various services that are supplied to the digital copying machine 93 (S32).

Figure 15B:
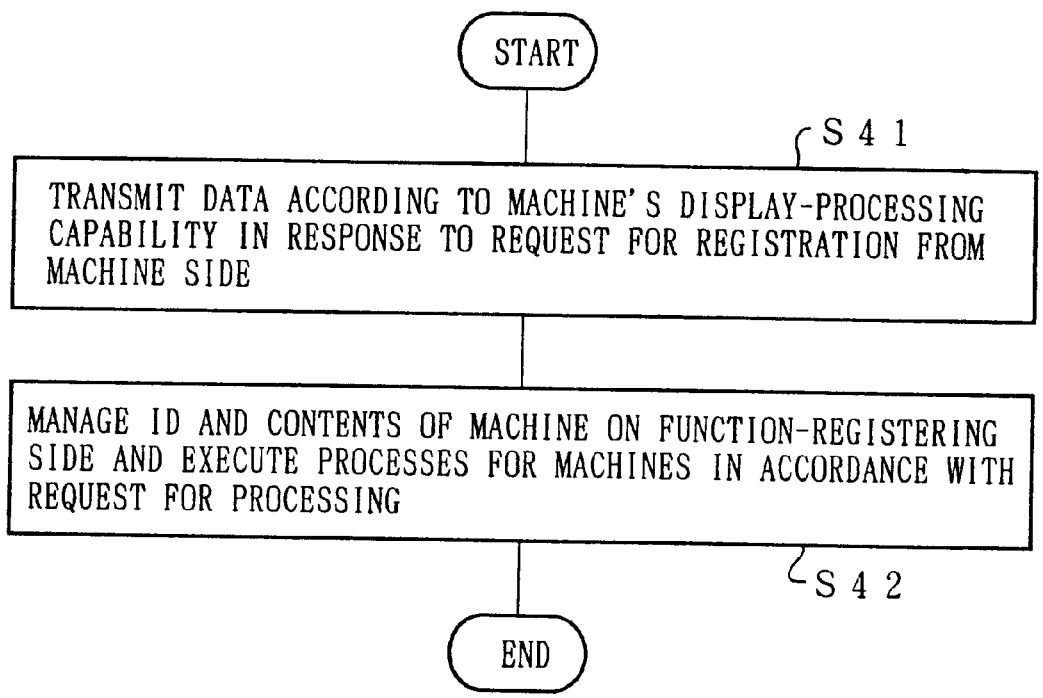
FIG. 15(b) is a flow chart that shows the operation at S32 in FIG. 15(a).

As shown in FIG. 15(b), in the operation of S32, the host computer 96 transmits data that corresponds to the display-processing capability of the digital copying machine 93 upon receipt of a request for the registration from the digital copying machine 93 (S41). Thereafter, it manages the ID (Identification Number) and contents registered with respect to image-processing functions (image-editing functions) of the digital copying machine 93, and carries out a predetermined process in accordance with a request for a process from the digital copying machine 93 (S42).

In the operation of S41, the host computer 96 first Informs the digital copying machine 93 of the contents of the new function so that the new function thus installed becomes selectable on the digital copying machine 93. In this case, the host computer 96 transmits to the digital copying machine 93 the contents of the new function (in this case, "translation: English to Japanese", "translation: Japanese to English" and "dictionary function") through the telephone line 97, with a command that indicates the new function leading the transmission. The contents of the transmitted data are determined by the contents of data retention inside the display circuit of the receiving machine, that is, the liquid crystal display 1 in the digital copying machine 93. For example, in the case when display character data is retained inside the external character ROM as font data, the display contents of the new function are indicated by transmitting the corresponding external character codes.

Figure 16:
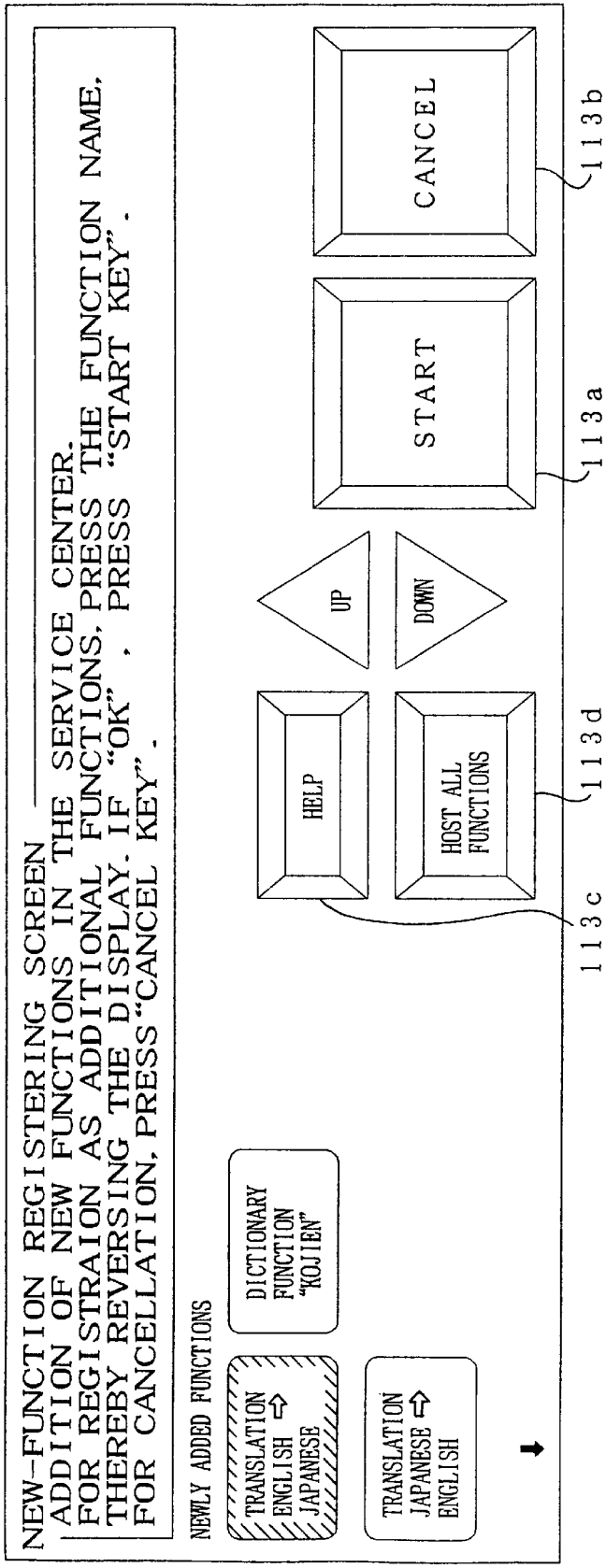
FIG. 16 is an explanatory drawing that shows a display state on the liquid crystal display of the digital copying machine that corresponds to the operation at S32 in FIG. 15(a).

Upon receipt of the data from the host computer 96, the liquid crystal display 1 of the digital copying machine 93 provides a function registration screen as shown in FIG. 16. This screen allows the user to confirm new functions. Here, even if a new function is provided, it is not uncertain whether or not the user would like to use the function. Therefore, the user selects the new function which should be registered in the digital copying machine 93 by pressing the display region of the corresponding function. Here, it is supposed that "translation: English to Japanese" is selected. The selected display region, "translation: English to Japanese", is displayed in a reversed manner as shown in FIG. 16. When the start key 113a is pressed in this state, the function "translation: English to Japanese" is registered as one of the selectable functions. The registered function is additionally displayed as a translation (English to Japanese) setting key 103c on the second function setting screen, for example, as shown in FIG. 6c. In contrast, in the above-mentioned function registration screen, the cancellation key 113b is pressed, the process is terminated, and the registration is cancelled. Additionally, the start key 113a and the cancellation key 113b are provided on any function registration screen, and the installation of keys is also properly carried out on other display screens in this manner.

Figure 17:
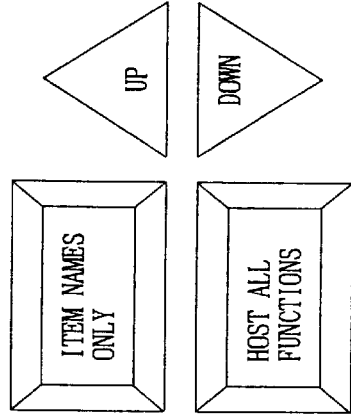
Figure 20:
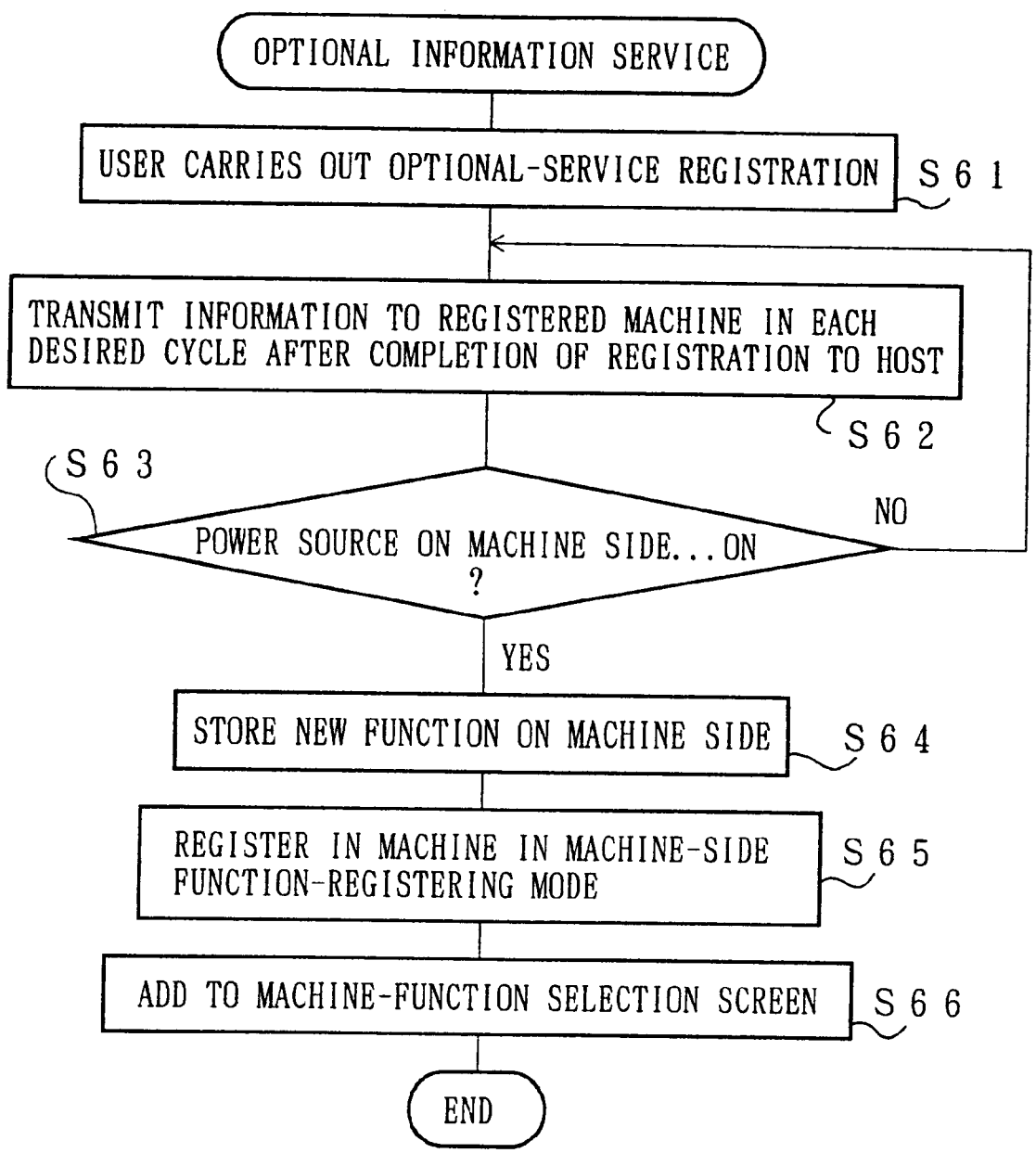
FIG. 20 is a flow chart that shows the operation of optional information service that the host computer in the service center offers to the apparatus on the office side.

Moreover, in the function registration screen of FIG. 16, if the help key 113c is pressed, the liquid crystal display 1 provides a screen as shown in FIG. 17, which displays a brief explanation of the contents of the function beside the display region of a new function. Here, in FIG. 17, the display shows a state wherein the function "translation: English to Japanese" has been selected. Furthermore, in the function registration screen of FIG. 16, when the host all function display key 113d is pressed, the liquid crystal display 1 provides a screen shown in FIG. 18, thereby displaying all the functions that are installed in the host computer 96. Here, in FIG. 16, since the display regions for various functions are limited, all the functions can not be displayed at once. Therefore, all the functions are arranged to be successively displayed by operating the scroll key 113a.

Here, the transmission of information of new functions from the host computer 96 to the respective offices is carried out regularly in a collective manner, or each time a new function is added thereto. This case is referred to as a regular information service. Further, it is possible for the office side to confirm new functions that are supplied by the service center; this is referred to as an optional information service. Next, the regular information service, which is carried out by the service center, will be explained by reference to FIG. 19, and the optional information service will be explained by reference to FIG. 20.

For the regular information services, the user first makes a registration for the regular information service to the host computer 96. Thus, an information-supplying cycle for the user is registered in the host computer 96 (S51).

Upon completion of the registration to the host computer 96 as described above, the host computer 96 transmits information of the new functions to the machines on the office side based on the respective registered cycles, while confirming the ON-state of the power of the machines on the office side (S52, S53).

Upon receipt of the information of the new functions from the host computer 96, each machine on the office side stores the information (S54), registers the new functions as described earlier (S55), and adds it to the function selection screen (S56).

Moreover, in the case of optional information service, the user registers for the optional information service to the host computer 96 (S61). Upon completion of this registration, the host computer 96 transmits the information of the new functions to the office machine based on the optional cycle, while confirming the on-state of the power of the machine on the office side (S62, S63). Thereafter, the operations at S64 through S66 are carried out in the same manner as those at S54 through S56.

Additionally, in the above explanation, the digital copying machines 91 through 93 are exemplified as machines on the user side to and from which the host computer 96 transmits and receives image data. However, since devices which have a scanner 94 and a printer 95 in a combined manner also function as digital coping machines, these devices may be used as the machines to and from which the host computer 96 transmits and receives image data in the same manner as the digital copying machines. In this case, image data obtained by a scanning process in the scanner 94 is transmitted to the host computer 96 where an image processing is carried out, and the processed image data is transferred to the printer 95 where printing is carried out. Further, since image data, inputted to the printer 95, may be subject to an image processing at the host computer 96, and then may be returned to the printer 95 so as to be printed, only the printer 95 may serve as the object for communication to the host computer 96. This is applicable to arrangements of other embodiments of the present invention.

As described above, in the present image-forming system, the image-processing functions installed in the host computer 96 can be displayed on the liquid crystal display 1 of the digital copying machine. Therefore, the user of the digital copying machine can visually confirm the image-processing functions of the host computer 96 easily on the digital copying machine to be used. Consequently, the user is allowed to easily select the image-processing functions, and the usability of the system is improved.

Moreover, in the present image-forming system, when image-processing functions of various types, installed in the host computer 96, are changed to more improved functions by, for example, addition or replacement, the user can recognize the change by the display on the liquid crystal display 1 of the digital copying machine. Therefore, the user is allowed to properly select optimal image-processing functions at present, and this also makes it possible to improve the usability of the system.

Furthermore, in the present image-forming system, in the case when the user inputs an instruction for using the host computer 96, the processing is carried out by using the host computer 96, while in the case when such an instruction is not given, the host computer 96 is not used. In this arrangement, when the processing is carried out by using the host computer 96, the user can confirm this fact.

In other words, the processing which uses the host computer 96 normally necessitates a payment of royalty for the host computer 96 or a payment of royalty for lines constituting a transfer device. Further, the processing occasionally takes a long time since image information is transmitted and received between the digital copying machine and the host computer 96. Therefore, in the case when the host computer 96 is used, it is necessary for the user to confirm this fact, and the present image-forming system allows the user to make this confirmation.

Further, in the present image-forming system, for example, as shown at S3 in FIG. 3, when the user inputs an instruction for an image processing, the digital copying machine makes a selection as to whether the digital copying machine itself or the host computer 96 carries out the image processing on the image data of a document, in accordance with the type of the specified image processing. In this case, when the instructed image-processing function is only installed in the host computer 96, the processing in the host computer is of course selected. In contrast, when the instructed image-processing function is installed in, for example, both the digital copying machine and the host computer 96, setting is made so that the processing is carried out on either side that is suitable in the current situation.

In this case, for example, it is possible to make an arrangement so that the processing on the digital copying machine side is selected unconditionally, in order to cut costs, such as royalty for lines and royalty for the host computer 96. Moreover, for example, if the instructed image processing is simple and can be carried out in a short time, the processing in the digital copying machine which has a relatively slow processing speed may be selected. In contrast, if the instructed image processing is complicated and takes a long time, the processing in the host computer 96 which has a high processing speed may be selected. Furthermore, this arrangement may be added by, for example, an arrangement for selecting any of the equipment based upon the degree of emergency of the processing. Accordingly, with the above-mentioned arrangements, the present image-forming system makes it possible to carry out a proper processing on the suitable side between the digital copying machine side and the host computer 96 side, in accordance with the instructed image processing.

[EMBODIMENT 2]

Figure 21:
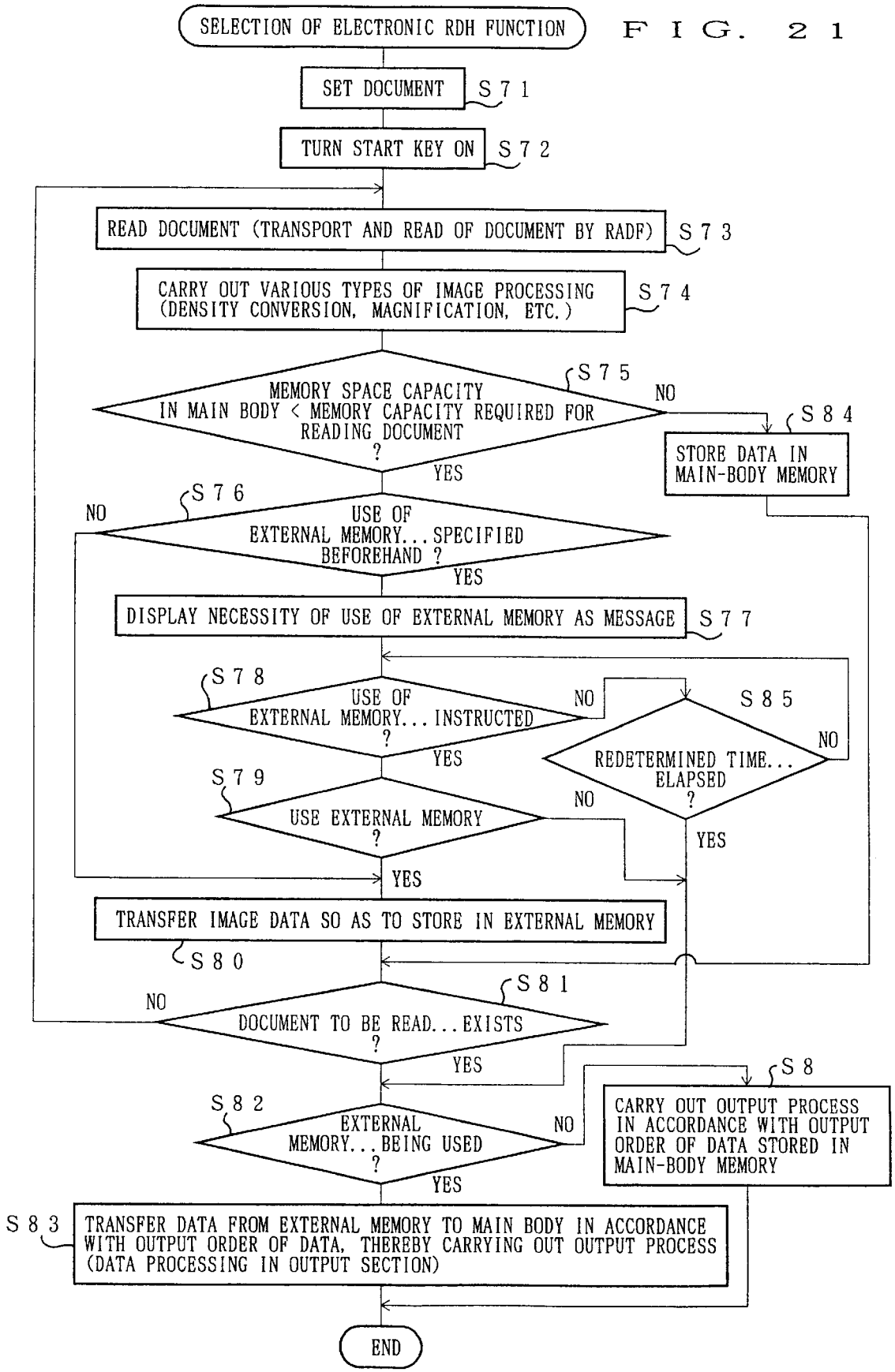
FIG. 21 is a flow chart that shows the operation of an image-forming system in another embodiment of the present invention.

Referring to FIGS. 21 and 22, the following description will discuss another embodiment of the present invention.

The present image-forming system has an arrangement as illustrated in FIG. 11. The present image-forming system is designed so that each of the digital copying machines 91 through 93 on the office side is allowed to produce copies by using a memory with a large capacity of the host computer 96. Here, the operation of the present image-forming system is explained by reference to, for example, communicating operations between the digital copying machine 92 and the host computer 96. In this case, the digital copying machine 92 is provided with an electronic RDH function. The electronic RDH is, for example, designed in this manner: image data of documents corresponding to 10 pages are all stored in a memory temporarily, and image data of the respective pages is successively called for from the memory, and then 20 copies are made by repeating these processes. The electronic RDH function becomes selectable through the operation of a function-setting key 101a, shown in FIG. 6(a). In this case, the operation of the function-setting key 101a allows an electronic RDH setting key to be displayed on the second function-setting screen, for example, as shown in FIG. 6(c).

The digital copying machine 92 has a page memory of 64 M bytes as a memory 73. Therefore, for example, supposing that image data has 256 gray scales and corresponds to A4-size documents, four sheets of documents can be successively read by the page memory. This capacity is sufficient when during a normal copying process, a document image is temporarily stored so as to produce copies. However, for example, in the case when a plurality of copies are made from document images corresponding to 10 pages by using the electronic RDH, the page memory becomes insufficient by the memory corresponding to 6 sheets. Therefore, in this case, the electronic RDH operation is carried out by using the large-capacity memory of the host computer 96. The following description will discuss the operation in this case, by reference to a flow chart of FIG. 21.

The electronic RDH function is selected in the digital copying machine 92 and documents are set on the RADF 36 shown in FIG. 2 (S71), and when the start key 15, shown in FIG. 5, is turned on (S72), the documents are successively transported by the RADF 36 so that images of the documents are read by the scanner unit 40. The resulting image data is successively accumulated in the memory 73 (S73). Further, the image data is successively subject to processes, such as a density conversion and a variable magnification based on the setting, in the image-data processing section 71 (S74). Here, when the electronic RDH setting key is pressed, the liquid crystal display 1 provides an external memory selection key 121a as shown in FIG. 22(a), and the memory capacity is displayed on a memory remaining-capacity display section 121b. However, a message display as shown in FIG. 22(a) is not provided in this case.

Thereafter, the space capacity of the memory 73 becomes less than the memory capacity required for reading the rest of the documents while the documents are being read by the scanner unit 40 (S75), and if the external memory selection key 121a has not been pressed beforehand (S76), a message requesting for the use of the external memory is displayed on the liquid crystal display 1, as shown in FIG. 22(a) (S77).

Thereafter, when the user presses the external memory selection key 121a (S78), the liquid crystal display 1 provides a message screen as shown in FIG. 22(b). Moreover, in this screen, the external memory selection key 121a has a reversed display, thereby indicating its selected state, and the memory remaining-capacity display section 121b has a capacity display that shows the addition of the large-capacity memory.

Next, when the user presses a continuation key 121c in accordance with the message shown in FIG. 22(b) (S79), the image data is transferred to the host computer 96 in order to use the large-capacity memory of the host computer 96 as an external memory (S80). At this time, the screen of the liquid crystal display 1 is shown in FIG. 22(c). Here, the image data, which is transferred at this time, is either of the two types of image data, that is, image data that is to be successively read thereafter and the image data that has been read and accumulated in the memory 73. Further, the transferring operation of the image data is carried out in the same manner as the aforementioned transmitting operation of the image data. The host computer 96 stores the received image data in its large-capacity memory.

The processes of S73 through S80 are continued as described above until the documents to be read no longer exist (S81). Thereafter, upon completion of the reading processes of all the documents, if the external memory is used (S82), the image data is transferred from the host computer 96 to the digital copying machine 92 in accordance with the order of outputs so that an image is outputted on a sheet of paper (S83). In this case, the copies are successively outputted from the last page of the documents onward. Here, with respect to reading processes of the image data from the respective memories, the data lines inside the digital copying machine 93 is used when the image data is read from the memory 73 of the digital copying machine 92, and the telephone line 97 is used when it is read from the host computer 96, in the same manner as the writing processes.

In contrast, at S75, when the space capacity of the memory 73 of the digital copying machine 92 is more than the memory capacity required for reading the rest of the documents, the storing of the image data to the memory 73 is continued (S84), and the sequence proceeds to S81.

Thereafter, through S81 and S82, the image data stored in the memory 73 is outputted on a sheet of paper in accordance with the order of outputs (S86).

Moreover, if a predetermined time has elapsed prior to the pressing of the external memory selection key 121a at S78 (S85), the sequence proceeds to S82, and at S86, the image data that has been stored in the memory 73 is outputted onto a sheet of paper in accordance with the order of outputs.

Additionally, in the above-mentioned explanation, all the page memory of the digital copying machine 92 is used to store the image data that has been read from the document images; however, part of the memory corresponding to several sheets may be always maintained for use in the control operation of the digital copying machine 92.

As described above, the present image-forming system makes it possible to process image information by using the large-capacity memory of the host computer 96. Therefore, provided that only the host computer 96 has a large capacity memory, a digital copying machine that is connected to the host computer 96 is allowed to carry out processes requiring a large-capacity memory, such as the electronic RDH process, without the need for a large-capacity memory in the digital copying machine.

Further, in the present image-forming system, if the digital copying machine has a page memory capable of storing data corresponding to several pages, the page memory and the large-capacity memory of the host computer 96 may be used in a combined manner, thereby making it possible to carry out processes requiring an even larger storage capacity.

Moreover, in the present image-forming system, if a process in question is operable by using the memory capacity of a digital copying machine, the memory in the digital copying machine is first used, prior to using the large-capacity memory of the host computer 96. Therefore, it is possible to eliminate or reduce the transferring time of image information between the host computer 96 and the digital copying machine, and consequently to improve the processing speed of image information.

Furthermore, in the case when the host computer 96 is to be used, the present image-forming system also allows the user to confirm this fact in the same manner as explained in Embodiment 1.

[EMBODIMENT 3]

Referring to FIGS. 23 through 26, the following description will discuss still another embodiment of the present invention.

In the present image-forming system, transmitting and receiving processes of image data are carried out between the office side and the service center side by using, for example, an arrangement shown in FIG. 11. For example, an image processing for image data, which is requested by a user-side machine at an office, has been carried out in the service office, and when the processed image data is transferred to the office that has requested the processing, selection is made among the user-side machines in the office to which the data is transferred. The reason for this is explained as follows: Here, in the following description, the user-side machine is exemplified by a digital copying machine. The digital copying machine corresponds to the aforementioned digital copying machine 30, and on the user side, for example, there are a plurality of digital copying machines which have different image-reproducing functions individually.

For example, even in the case when the host computer 96 has carried out a high-level image processing on image data, if the digital copying machine which has requested the processing is not capable of reproducing the processed image data as an image, or if it is not capable of reproducing the processed image data as a high-quality image that is equivalent to the high-level image processing, the time, costs and other efforts that have been required for the processing in the host computer 96 would be wasted. For example, this arrangement is effective when it is desired that a document image, such as a photograph, is outputted as a copied image that has an exact density reproducibility by using a high-quality image processing, but the digital copying machine that has requested the processing is not capable of reproducing the image with high quality.

In this case, in the present image-forming system, the host computer 96 in the service center confirms the printing function of the user-side digital copying machine in question, compares the function with the contents of the image processing that has been requested by the user, and makes a judgement as to whether or not it is suitable to allow the digital copying machine that has requested the processing to output the processed image data as an image. Thus, the results of the judgement are informed to the digital copying machine that has requested the processing. Further, if the judgement is deemed "unsuitable", and if an appropriate machine is located near the digital copying machine that has requested the processing, the host computer 96 recommends that the output of the image be carried out by the machine.

The criteria for making the judgement as to whether or not a machine is suitable for outputting the image include, for example, the recording density of image in the machine, the maximum paper size that is usable in the machine, the sizes of sheets of paper that are feedably set in the machine, and the conditions of the machine as to the recordability, such as conditions as to whether or not the machine has run out of toner, is in a jammed state, or is under a regular inspection. The above-mentioned function of the host computer 96 is that of a suitability judging device.

Figure 24:
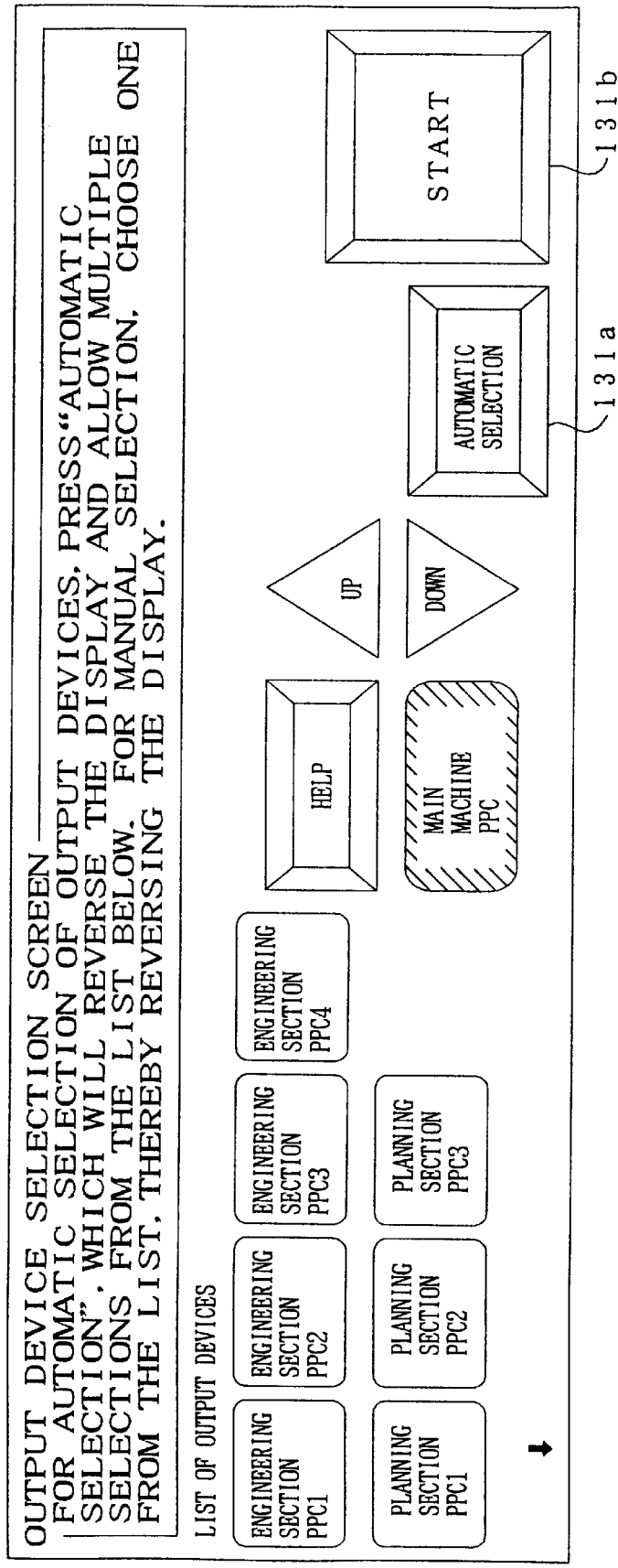
FIG. 24 is an explanatory drawing that shows a display state on a liquid crystal display during the automatic selection mode shown in FIG. 23.

Here, when each of the digital copying machines makes a request to the host computer for an image processing, its liquid crystal display 1 provides an output-device selection screen as shown in FIG. 24. In this screen, an output-device list showing the respective digital copying machines that are connected to the host computer 96 and messages are displayed, and an automatic-selection-mode setting key 131a and a start key 131b are also displayed.

The operation of the present image-forming system is carried out in an automatic selection mode as described below. Referring to the flow chart shown in FIG. 23, the operation of the present image-forming system in the automatic selection mode will be explained in detail.

The automatic selection mode is a mode in which the host computer 96 automatically selects a digital copying machine to which the image data from the host computer 96 is transmitted, and this mode is specified by pressing the automatic-selection-mode setting key 131a on the output-device selection screen shown in FIG. 24. When the key 131a is pressed, the region of the key 131a is displayed in a reversed manner as shown in FIG. 25. Further, in the screen of FIG. 25, the user can restrict the range of selection regarding the output devices. In this case, among the digital copying machines shown in the output device list, the user presses the display regions of those machines that are to be included in the range of selection. As a result of the pressing process, the display regions are shown in a reversed manner.

Here, in the case when the selection is manually made so as to decide a digital copying machine that serves as the output device, the user presses the display region of a desired digital copying machine among the digital copying machines including "current machine PPC" that are listed in the output device list. Thus, the display region of the digital machine is shown in a reversed manner, and the manual mode is set. In this case, the image data that has been processed in the host computer 96 is returned to the digital copying machine that has been specified in this manner, and outputted as an image from the digital copying machine.

In the automatic selection mode, the host computer 96 first carries out an image processing that has been requested on image data that has been transferred from a digital copying machine on the office side (S91).

Next, the host computer 96 selects a digital copying machine to which the processed image data is to be returned. In this case, if the range of selection regarding the digital copying machines has not been inputted beforehand, the sequence proceeds to S94 (S92). In contrast, if the range of selection regarding the digital copying machines has been inputted beforehand through the above-mentioned operation, the host computer 96 selects a digital copying machine to which the image data is to be returned among the digital copying machines within the range of selection (S93).

Next, the host computer 96 selects a receiving digital copying machine by taking into account the types of the image processing that has been carried out and various factors in the digital copying machines, such as the resolution, gray scales, and maximum recording size (S94). In this case, if two or more of the machines meet the conditions, those machines are listed as a result of selection.

Further, the host computer 96 confirms whether or not the digital copying machines that have been selected as described above are operable for outputting an image through communications with the digital copying machines, and excludes those machines that are not operable for outputting an image (S95). In this case, the machines that are not operable for outputting an image are, for example, those in a jammed state, under a maintenance, in an operating state, or in a power-off state, or those lacking the size of paper required for the output of the image or those having an insufficient amount of toner.

After selecting a suitable digital copying machine as described above, the host computer 96 transmits the information of the results of selection to the digital copying machine that has requested the image processing (S97). Upon receipt of the information, the digital copying machine provides a display shown in FIG. 26 on the liquid crystal display 1. In the display, the results of selection include "Current Machine PPC", "Engineering Section PPC1", "Engineering Section PPC2" and "Planning Section PPC1" as those suitable digital copying machines. Further, the display region of the digital copying machine that is closest to the digital copying machine requesting for the processing is given as a flashing display. In this case, "Current Machine PPC", which is the machine itself that requested the processing, is given as a flashing display.

Figure 26:
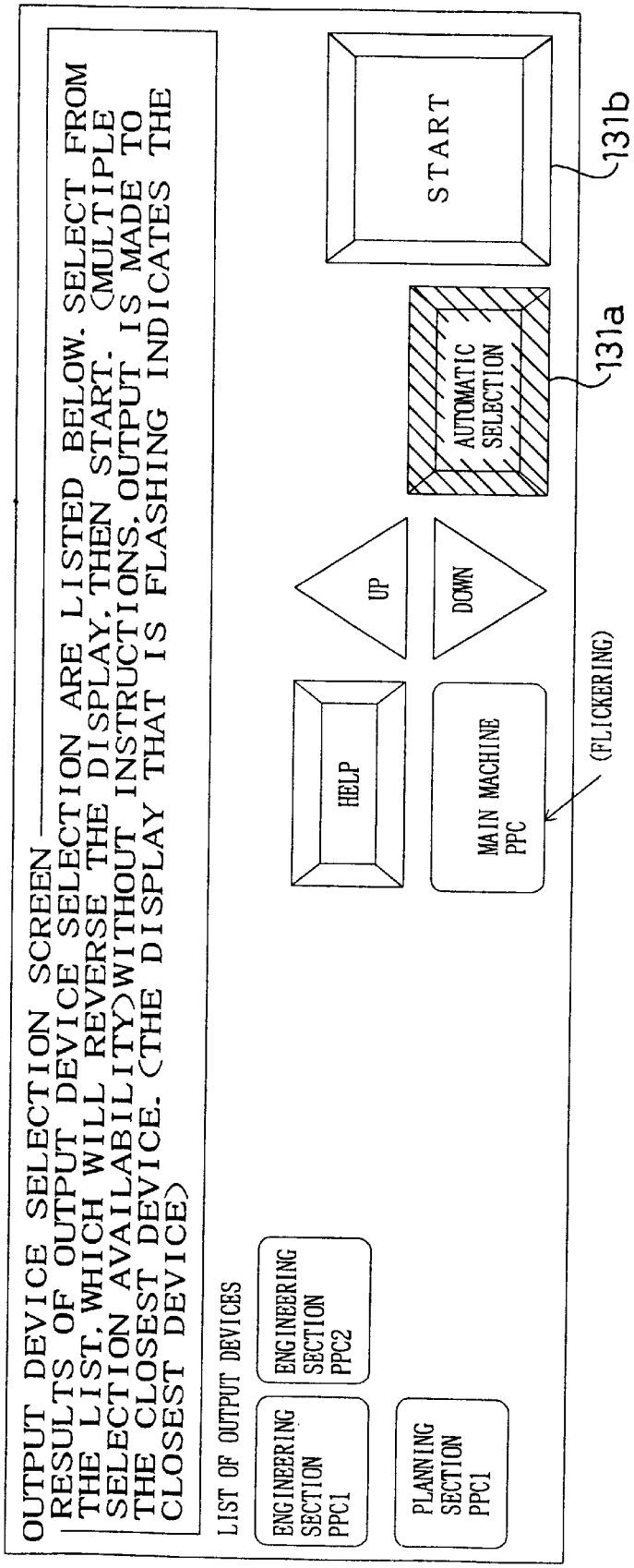
FIG. 26 is an explanatory drawing that shows a display state on the liquid crystal display which corresponds to the operation at S97 in FIG. 23.

Next, in a display screen as shown in FIG. 26, when a desired digital copying machine is selected by the user among the digital copying machines shown in the output device list (S98), the host computer 96 specifies the digital copying machine as a target machine to which the processed image data is to be transferred, that is, as a copying machine that is to output the image onto a sheet of paper (S99). Here, in the selection at S98, the user first presses the display region of a desired digital copying machine, and then presses the start key 131*b*.

Further, if the selection at S98 has not made within a predetermined time (S102), the host computer 96 specifies "Current Machine PPC", which is the closest digital copying machine to the digital copying machine requesting the processing, as a target machine to which the processed image data is to be returned (S103).

Next, the host computer 96 or the digital copying machine that has been specified as the target machine to which the processed image data is to be returned makes a judgement as to whether or not the digital copying machine in question is operable for outputting the image (S100). Here, the operable state for outputting the image is a state wherein factors, such as the cassette, image-quality mode, copying mode and the rate of magnification, have been properly set.

If the result of the judgement is "YES", the host computer 96 transfers the processed image data stored in the memory to the digital copying machine that has been specified as the target machine for the processed data (S101). In contrast, if the result of the judgement is "NO", the host computer 96 waits until the digital copying machine that has been specified as the target machine for the processed data has become operable for outputting the image (S104), and then transfers the processed image data thereto. As a result, the digital copying machine to which the image data has been transmitted is allowed to output an image onto a sheet of paper in accordance with the image data.

As described above, the present image-forming system makes a judgement as to whether or not it is suitable to process the image data that has been processed in the host computer 96 by using the digital copying machine that originally requested the processing, and the result of this judgement is displayed on the liquid crystal display 1. Therefore, for example, if the host computer 96 has carried out an image processing that exceeds the recording capability of the laser printer section 32 in the digital copying machine that has requested for the image processing, this fact can be provided as a warning to the user.

Moreover, in the present image-forming system, if the laser printer section 32 in the digital copying machine that has requested for the image processing is not suitable for outputting the image data that has been processed by the host computer 96 as a visual image, a digital copying machine, which has a laser printer section 32 that is suitable for the processing of the processed image data, is searched for, and the corresponding digital copying machine is used to process the above-mentioned processed image data. This operation makes it possible to obtain a good image in the case when it is desired to obtain a copied image that has been subject to predetermined image processing.

Moreover, with an arrangement wherein, upon selecting a suitable digital copying machine, the judgement as to the suitability for the processing of the processed image data is made based on the recording density of the laser printer 32, the user can obtain a desired image that has been reproduced with a proper recording density.

Furthermore, with an arrangement wherein the judgement as to the suitability for the processing is made based on the paper size that is required for recording the processed image data by the laser printer 32 and the largest possible paper size available in the digital copying machine, the user can obtain a desired image that is positively reproduced on a sheet of paper. In other words, even if a digital copying machine has a laser printer section 32 capable of properly reproducing the processed image data, the image will not be positively reproduced on a sheet of paper in the case when the digital copying machine fails to provide a proper size of paper that is required for outputting the processed image data thereon as a visual image. The present image-forming system solves such a problem.

Moreover, with an arrangement wherein the judgement as to the suitability for the processing is made based on the paper size that is required for recording the processed image data by the laser printer 32 and the paper sizes that are stored in the digital copying machine so as to supply them to the laser printer section 32, the user can obtain a desired image that is positively reproduced on a sheet of paper, and it becomes possible to eliminate the necessity that the digital copying machine has to wait until sheets of paper of the proper size have been supplied thereto. In other words, even in the case when a digital copying machine has an image recording section capable of properly reproducing the processed image data, the digital copying machine fails to supply a size of paper that is required for outputting the processed image data thereon as a visual image, the image has to be outputted onto a different size of paper and the image will not be positively reproduced on a proper size of paper. Furthermore, at the time when the image is outputted onto a sheet of paper, if sheets of paper of the necessary size are not stored on the digital copying machine, the output of the image cannot be carried out immediately, and the digital copying machine has to wait until the sheets of paper have been supplied by the user. The present image-forming system solves such problems.

Further, with an arrangement wherein the judgement as to the suitability for the processing is made based on whether or not a recording operation is available by the laser printer section 32 of a digital copying machine, it becomes possible to eliminate the necessity that the host computer 96 has to wait until the digital copying machine has returned to its operable state for the recording operation, and also to readily output a desired image onto a sheet of paper. In other words, even in the case when a digital copying machine has a laser printer section 32 capable of properly reproducing the processed image data, if the digital copying machine is, for example, in a paper jammed state, under a regular inspection, in a power-off state, or in other inoperable state for the recording operation, the recording operation can not be carried out immediately, and the host computer 96 has to wait until the digital copying machine has returned to its operable state for the recording operation. The present image-forming system solves such a problem.

[EMBODIMENT 4]

Figure 27:
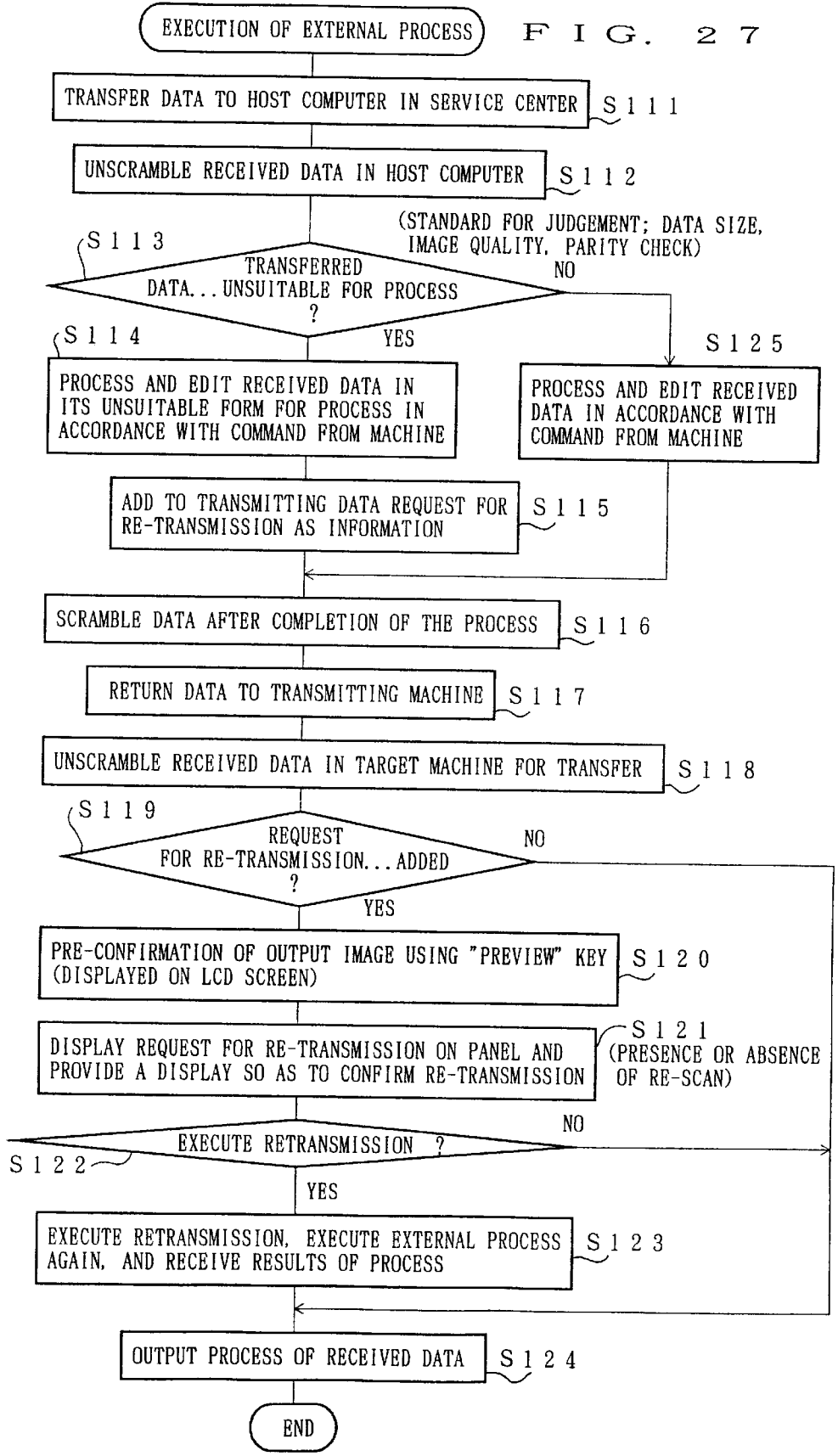
FIG. 27 is a flow chart that shows the operation of an image-forming system in still another embodiment of the present invention.

Referring to FIGS. 27 and 28, the following description will discuss still another embodiment of the present invention.

The present image-forming system carries out data transmitting and receiving operations between the office and the service center by using, for example, an arrangement of FIG. 11. The host computer 96 in the service center has a function for making a judgement as to whether or not image data of a document, which has been read by the scanner section 31 shown in FIG. 2, and is sent from a digital copying machine, is suitable for the image processing that has been requested by the digital copying machine. Then, if the judgement deemed "unsuitable", the host computer 96 requests the digital copying machine that has transmitted the image data to re-transfer the image data.

This arrangement is made so as to prevent such situations wherein: the host computer 96 cannot carry out the image processing that has been requested due to improper image data, or when the host computer 96 has to carry out wasteful processing on unusable low-quality image data. Examples of cases that cause improper image data for the image processing are, for example, given as follows: the picture quality of the actual document to be read by the scanner section 31 is improper, the resolution of the scanner section 31 that reads a document image is low, the document is dislocated while being read, and the telephone line 97, which serves as a communication line, is in bad condition and causes adverse effects such as noise on the image data. The above-mentioned function of the host computer 96 is defined as that of an image-information suitability judging section.

Next, referring to the flow chart in FIG. 27, the following description will discuss the operation of the image-forming system. Here, an explanation is given by exemplifying a case wherein upon selection of the "Translation Function", the image data is retransferred from the digital copying machine. As shown in Table 2, the "Translation Function" is not provided in digital copying machines 91 through 93 shown in FIG. 11, and the host computer 96 is requested to make the function.

In this operation, image data to be translated, which has been read by the scanner section 31, is first transferred from the digital copying machine to the host computer 96 in the service center (S111). This operation is carried out in the same manner as the case shown in FIG. 1.

The host computer 96 unscrambles the received data (S112), and makes a judgement as to whether or not the received image data is suitable for the translation process (S113).

Next, even if the judgement is deemed "unsuitable", the host computer 96 carries out the "translation" process in accordance with the request from the digital copying machine (S114). Then, the reasons for the request for retransfer of the image data are attached to the processed data as information, thereby forming return data (S115). In contrast, if the judgement is deemed "suitable" at S113, the host computer 96 carries out the "translation" process in accordance with the request from the digital copying machine, and the resulting processed image data forms return data; thus, the sequence proceeds to the operation of S116.

Next, the host computer 96 scrambles the return data (S116), and retransfers the return data to the digital copying machine that has made the request (S117).

The digital copying machine unscrambles the image data returned from the host computer 96 (S118). In this case, if the information of the request for retransfer is attached to the image data (S119), the digital copying machine receives the processed image data so as to display it on the liquid crystal display 1 (S120). Further, the digital copying machine displays the reasons for the request for retransfer on the liquid crystal display 1, as well as providing a display inquiring whether or not the retransfer will be made (S121). In contrast, if the information of the request for retransfer is not attached to the image data at S119, the digital copying machine outputs the image data onto a sheet of paper as an image at S124.

As shown in FIG. 28(a), the display on the liquid crystal display 1, which is provided at S121, gives a warning as to the unsuitability of the image data for the "translation" process. Further, the reasons for the warning are classified into picture quality (processing level), data sizes and parity errors, and displayed on a "WARNING LIST". These items serve as criteria for the user to make a judgement as to the request for retransfer. Here, in FIG. 28(a), the display of data size, 90%, means that in the image data of an A-4 size document, image data that the host computer 96 has received is insufficient by 10% due to a certain trouble. Further, a preview key 141*a*, a re-scanning key 141*b* and a continuation key 141*c* are provided in the screen shown in FIG. 28(*a*).

When the preview key 141*a* is pressed, the processed image data, that is, the result of translation, is displayed as shown in FIG. 28(*c*). This is an operation of the operation panel 90 as an information-confirming section. The preview key 141*a* is pressed when a visual confirmation of the image quality level (processing level) is desired prior to the decision as to whether or not the output is to be carried out. In the screen shown in FIG. 28(*c*), the quality of the output image can be confirmed over its entire region by scrolling the screen using a U-key 141*d*, a D-key 141*e*, an R-key 141*f* and L-key 141*g*. When, upon completion of the confirmation, the confirmation key 141*h* is pressed, the screen is returned to the one shown in FIG. 28(*a*).

Further, when the re-scanning key 141*b* is pressed (S122), the scanning of the document image is resumed by the scanner section 31 in the digital copying machine, and the resulting image data that is to be "translated" is again transmitted to the host computer 96. Thus, the host computer 96 carries out the "translation" process on the image data, and returns the processed image data to the digital copying machine that has transmitted the image data, in the same manner as the aforementioned first operation. The digital copying machine receives the returned image data, and carries out the same processes as described earlier (S123). As a result of this operation, the display shown in FIG. 28(*b*) is provided on the liquid crystal display 1. In this display screen, the data size, 100%, is given in the "WARNING LIST", thereby indicating that no problem is basically raised in outputting the processed image data. However, with respect to the process level (OCR recognition rate), a display is left as a CHECK screen since the acceptable criterion is different depending on the users.

Thereafter, the digital copying machine outputs the returned image data as a copied image (S124). In contrast, if the continuation key 141*c* is pressed at S122, the digital copying machine outputs the image data that was first returned as a copied image at S124, without retransferring the image data to the host computer 96.

As described above, when an image processing is requested by the user, the present image-forming system not only carries out the image processing in accordance with the request, but also makes a judgement as to whether or not the image data is suitable for the requested image processing, and if the judgement is deemed "unsuitable", it requests the retransfer of the image data. This makes it possible to obtain a desired image accurately and positively.

Further, the above-mentioned judgement is made based upon, for example, image quality of the image data related to the requested processing; therefore, even in the case when, for example, communication lines contained in the transferring device are in bad condition causing noise or other adverse factors to intrude into the image information, with the result that the quality of the image information is lowered, it is possible to preliminarily prevent the image-processing device from carrying out a wasteful image-processing operation on such image information. This advantage is also obtained in the case when the above-mentioned judgement is made based upon the data size, that is, the lack of data amount.

Moreover, the present image-forming system allows the user on the digital copying machine side to confirm the image data that has processed by the host computer 96. With respect to the image data that has been deemed "unsuitable" for the processing, the image data is retransmitted to the host computer 96 so as to make it subject to the resumed image processing. Therefore, even if unsuitable image data, such as low-quality image data, is used, it is possible to prevent the image-forming device from outputting it wastefully as a visual image.

Additionally, the present image-forming system is arranged so that the digital copying machine carries out the retransfer of the image data upon receipt of a key entry from the user, that is, upon receipt of a decision from the user, after the host computer 96 has made the request for retransfer. However, instead of this arrangement, another arrangement wherein, for example, the re-scanning is automatically carried out in response to the request for retransfer from the host computer 96 and the resulting image data is retransmitted to the host computer 96 may be adopted. This arrangement is obtained by omitting steps S120 and S121 from the flow chart of FIG. 27.

[EMBODIMENT 5]

Referring to FIGS. 29 through 35, the following description will discuss still another embodiment of the present invention.

The present image-forming system carries out data transmitting and receiving operations between the office side and the service center side by using, for example, an arrangement of FIG. 11. In the same manner as the aforementioned other image-forming systems, the host computer 96 in the service center carries out a corresponding processing that has been requested by a digital copying machine 91, 92 or 93 on document image data that has been read by the scanner section 31, for example, shown in FIG. 2, and transferred from the digital copying machine 91, 92 or 93.

Each time the host computer 96 is requested by any of the digital copying machines 91 through 93 to carry out an image processing, it makes a judgement as to which digital copying machine has requested the processing. Thus, it successively stores in its large memory various data, such as the date of request of image processing, start time of the image processing, contents of the image processing and processing time, for the individual digital copying machines 91 through 93. FIG. 31 shows an example of a management list of the status of use including the above-mentioned data of record.

Further, by analyzing the information stored in the large-capacity memory at a predetermined time or each predetermined cycle, the service center can manage the information, such as the fact as to what types of image processing have been requested by the respective digital copying machines 91 through 93 on the user side, and also recognize the status of use of the host computer 96 by the respective digital copying machines 91 through 93. In the case when the image processing service for the users is charged, this arrangement makes it possible to easily calculate the cost of the service. Moreover, the cost is easily charged by transmitting the bill to the user through the communication line, that is, the telephone line 97. Furthermore, since the degree of use of various image-processing functions is estimated based on the information, it is possible to confirm trends in the user's desired image-processing functions. FIG. 29 shows an example of the bill. This format may be modified to draft a list of the status of use of the service center by a given digital copying machine. In this case, the host computer 96 functions as a history-managing device.

When each of the digital copying machines 91 through 93 receives the information of the status of use from the host computer 96, it displays the information on the liquid crystal display 1, or outputs it onto a sheet of paper. The output operation of the information of the status of use may be automatically carried out upon receipt of the information, or may be carried out by the user after he or she has confirmed the display on the liquid crystal display 1 that indicates the receipt of the information. FIG. 30 shows a state wherein the information of the status of use is displayed on the liquid crystal display 1. In this display, the contents of the display can be scrolled upward and downward by using an up-key 151a and a down-key 151b. Further, the outputting operation onto a sheet of paper is carried out by pressing a print key 151c. Here, a display key 151d is used for instructing the display of information of the status of use.

In the case when the digital copying machine 91, 92 or 93 automatically outputs the information of the status of use upon receipt thereof, the outputted sheet of paper tends to be mingled into other image-bearing sheets of paper on the paper tray, with the result that it may become lost, or may be overlooked by the user. In order to prevent such a problem, the information of the status of use is preferably outputted by using a sheet of paper that is different from often-used sheets of paper. Here, the sheet of paper that is different from often-used sheets of paper means a sheet of paper, such as having the maximum size, having the maximum length or width, and that which is least possible to be used, among the sheets of paper stored in the multi-stage paper-feed unit 33, shown in FIG. 2. Among these sheets of paper, it is most preferable to use the sheet of paper having the maximum size, in order to prevent the user from overlooking it or losing it.

Figure 32:
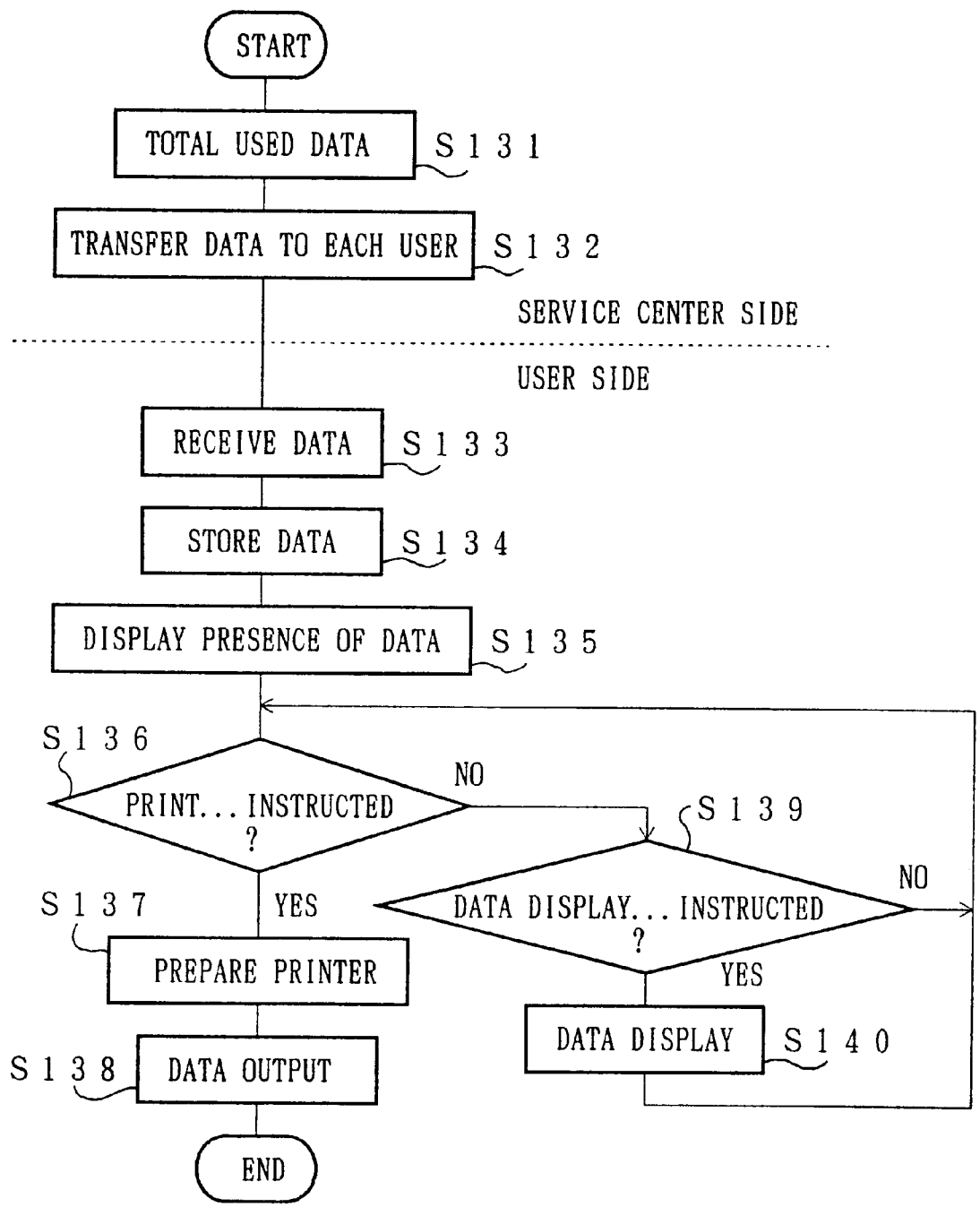
FIG. 32 is a flow chart that shows managing operations of information on the current status of use in the host computer as well as operations in a digital copying machine that has received the information.

Next, referring to the flow chart in FIG. 32, an explanation will be given of the operation of the above-mentioned image-forming system.

The host computer 96 in the service center analyzes the status of use for each of the digital copying machines 91 through 93 individually, thereby providing information of the status of use (S131), and the individual information is transferred to the corresponding digital copying machine 91, 92 or 93 (S132).

When the digital copying machine 91, 92 or 93 on the user side receives the information of the status of use (S133), it stores the information in its memory (S134), and displays a message indicating the receipt of the information of the status of use on the liquid crystal display 1 (S135).

In the digital copying machine 91, 92 or 93, when the print key 151c, shown in FIG. 30, is pressed in accordance with the display (S136), the laser printer section 32, which functions as a printer, prepares for a printing operation for the information of the status of use (S137), and upon completion of the preparation, outputs the information of the status of use onto a sheet of paper, for example, as shown in FIG. 29 (S138).

In contrast, if the display key 151d is pressed prior to the instruction for printing at S136 (S139), the information of the status of use is displayed on the liquid crystal display 1, for example, as shown in FIG. 30 (S140).

Additionally, in the case when, upon receipt of the information of the status of use from the host computer 96, the information is automatically outputted without the need for the printing instruction from the user at S136, the operation is shown in FIG. 33. More specifically, when an automatic mode is set (S141), the sequence proceeds to S137, and then the information of the status of use is printed at S138. In this case, the sheet of paper to be used is, for example, a sheet of paper having the maximum size among sheets of paper that can be supplied by the multi-stage paper-feed unit 33, as described earlier.

Further, in the present image-forming system, each time the digital copying machine 92 or 93, which has a page memory and is located on the user side, requests the host computer 96 to make processing, the information of the status of use is stored. This function is defined as that of a request-status managing section that is constituted by the memory 73 and the PCU 74. This function allows the digital copying machine 92 or 93, if managed in the same manner, to preview the amount of bill before it is charged by the service center. Further, by comparing both of the pieces of information, it is possible to confirm whether or not the information from the service center is correct.

Moreover, when the bill is transmitted from the host computer 96 through the telephone line 97, the digital copying machine 92 or 93 can confirm the contents of the bill, while comparing the contents with the status of use that has been stored in the digital copying machine 92 or 93. For this reason, the digital copying machine 92 or 93 composes the information of the status of use stored in the memory 73 and the information of the status of use transmitted from the host computer 96, displays the results on the liquid crystal display 1 as shown in FIG. 34, and printouts the results as shown in FIG. 35. This function is defined as that of a confirming section that is constituted by the memory 73 and the PCU 74.

As described above, in the present image-forming system, the information of the status of use or the outline thereof, which has been transmitted from the host computer 96 to the digital copying machine, is displayed on the liquid crystal display 1 of the digital copying machine. Therefore, the user recognizes the fact that the information of the status of use has been sent by seeing the display of the liquid crystal display 1, and also easily confirms the status of use of the host computer 96 and the user's fee.

Further, since the digital copying machine can output the information of the status of use as a printed image through the laser printer section 32, the user is also able to recognize the fact that the information of the status of use has been sent, through the outputted image. Moreover, it is possible to easily confirm the status of use of the host computer 96 and the user's fee by the outputted image, in the same manner as described above.

Furthermore, when the information of the status of use is outputted from the laser printer section 32, sheets of paper having the largest possible size available in the digital copying machine are used. In the image-forming apparatus, the sheets of paper having the largest size are normally least frequently used, and the largest size makes it possible to prevent the sheets from being mingled into other image-bearing sheets of paper on the paper tray with the result that they may become lost. Therefore, the user can easily confirm the sheets of paper whereon the information of the status of use is printed.

Further, in the present image-forming system, the bill from the host computer 96 and the status of use stored in the digital copying machine 92 and 93 are displayed as composite information by the display or image output as shown in FIG. 34, and are also outputted as an image. Thus, the user can easily confirm the coincidence of both of the pieces of information, thereby making it possible to improve the usability of the image-forming system.

Moreover, in the composite information, the corresponding image-processing items of both of the pieces of information are aligned for comparative purposes. Thus, it becomes possible to further improve the usability of the image-forming system.

[EMBODIMENT 6]

Figure 36:
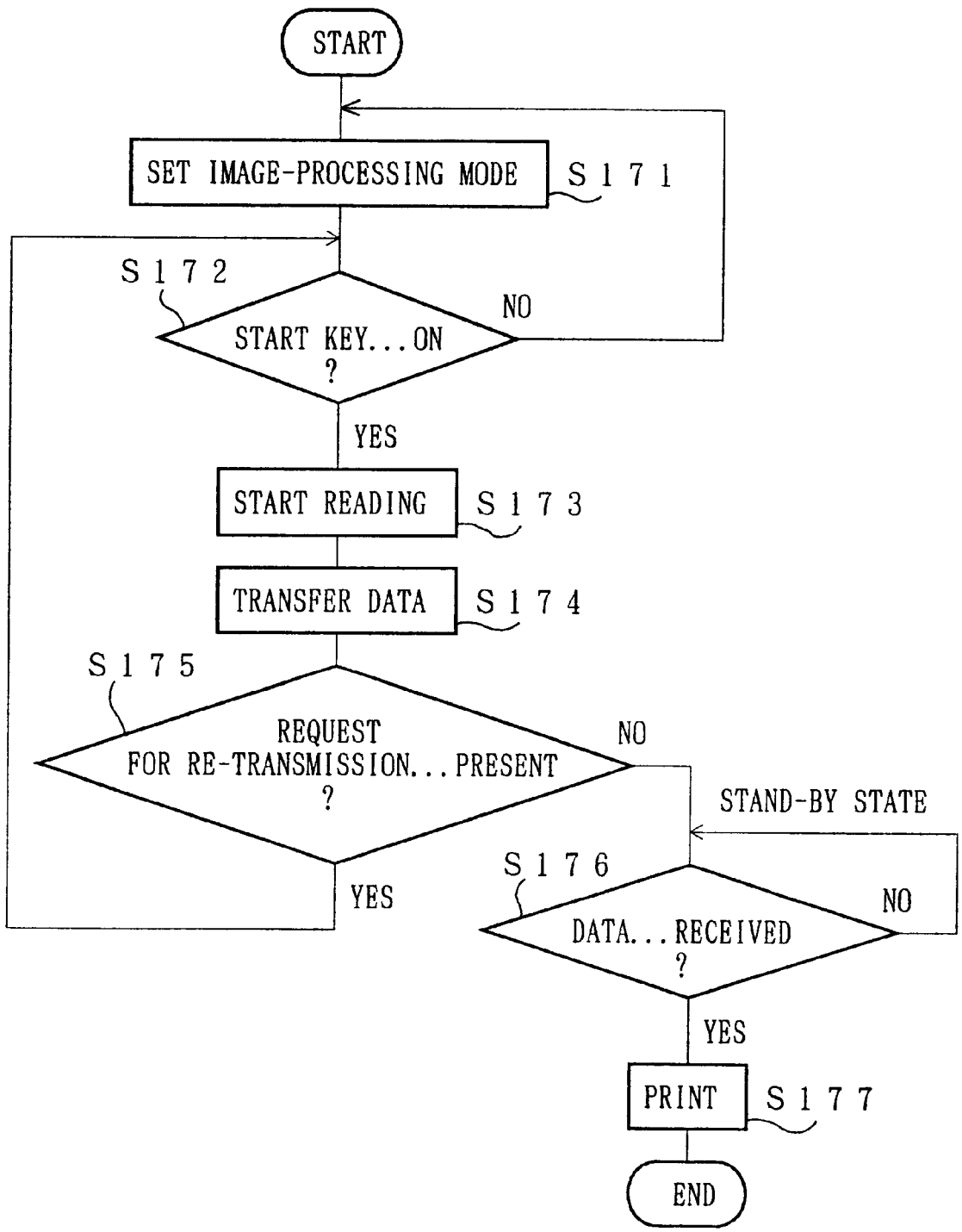
FIG. 36 is a flow chart that shows operations of a digital copying machine in an image-forming system in still another embodiment of the present invention.
Figure 37:
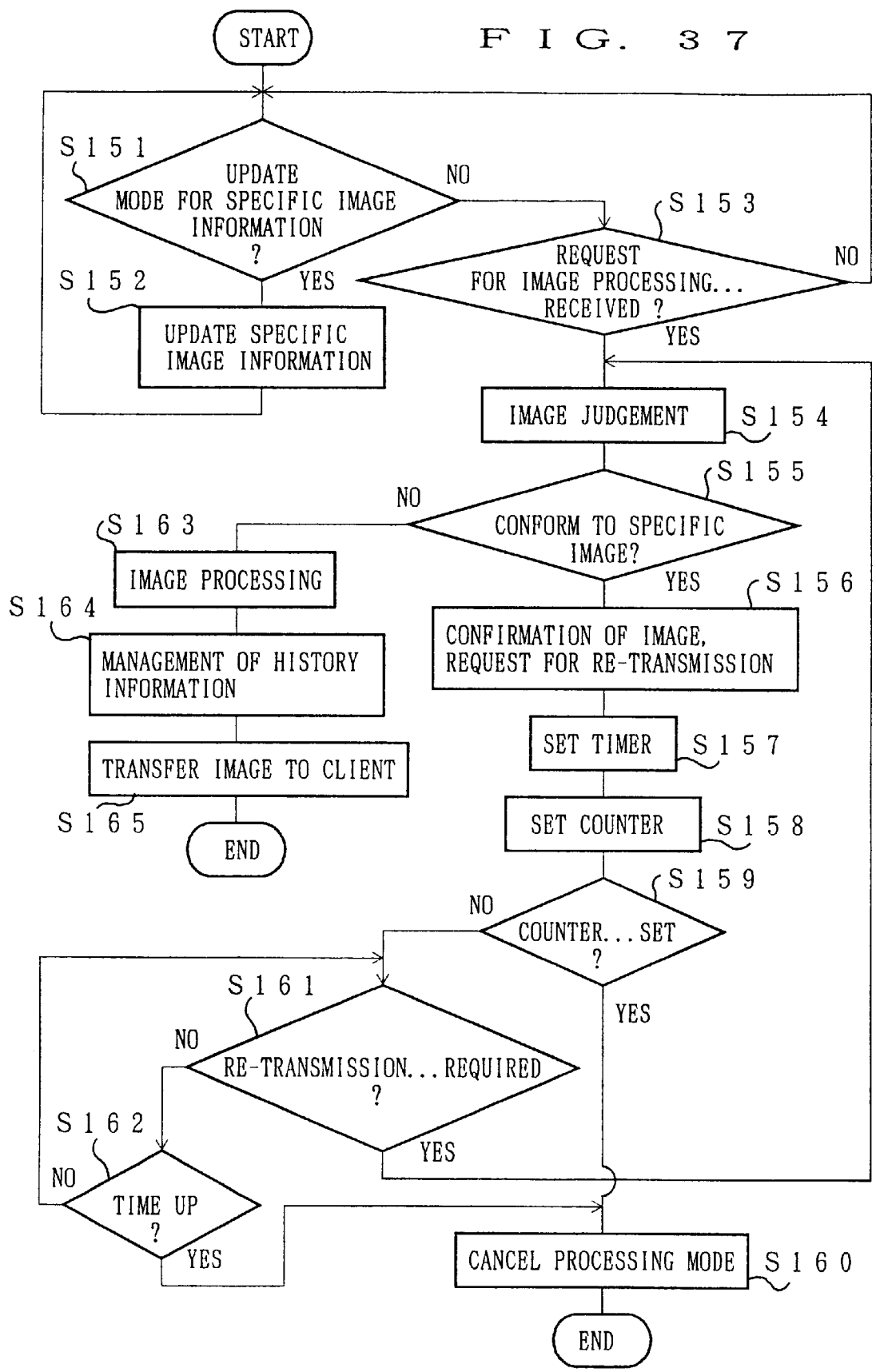
FIG. 37 is a flow chart that shows operations of the host computer which correspond to the operations of the digital copying machine shown in FIG. 36.

Referring to FIGS. 36 and 37, the following description will discuss still another embodiment of the present invention.

The present image-forming system carries out data transmitting and receiving operations between the office side and the service center side by using, for example, an arrangement of FIG. 11. In the same manner as the aforementioned other image-forming systems, the host computer 96 in the service center carries out corresponding processing that has been requested by a digital copying machine 91, 92 or 93 on document image data that has been read by the scanner section 31, for example, shown in FIG. 2, and transferred from the digital copying machine 91, 92 or 93.

In the present image-forming system, when the digital copying machine 91, 92, or 93 requests an image process for a specific image, the host computer 96 stores information about the image and the image-processing in its large-capacity memory as additional information.

In other words, in the present image-forming system, image data for specific images, for example, image data related to copy-prohibited objects, such as securities and paper money, are preliminarily registered in the host computer 96. Then, the host computer 96 compares the image data received from the digital copying machine 91, 92 or 93 for the purpose of image processing, and makes a judgement as to whether or not the received image data is coincident with any of the specific images. This is a function of the image-processing apparatus as a specific-image judging section. As a result of this judgement, if the received image data is not coincident with any of the specific images, the host computer 96 carries out predetermined image processing as it is. This is a function of the host computer 96 as an image-processing section. In contrast, if it is coincident with any of the specific images, the host computer 96 temporarily transmits information for confirmation-requirement related to the document image to the corresponding digital copying machine 91, 92, or 93 on the user side. The objectives of the information for confirmation-requirement includes: to inform that the image transmitted from the digital copying machine 91, 92 or 93 is not suitable for a copying process, to give a warning that the user should confirm the document, and to request the user to retransmit an appropriate document image. The digital copying machines 91, 92 or 93, which has received the information for confirmation-requirement, displays the indications based on the information for confirmation-requirement on the liquid crystal display 1. The host computer 96 stores information related to the image data that has first transmitted, such as the contents of the requested image process, the managing information for identifying the digital copying machine 91, 92 or 93 that has requested the process, and the actual image data, in a collective manner. This is a function of the image-processing apparatus as a history-managing device.

Next, referring to FIGS. 36 and 37, the operation of the image-forming system will be discussed more specifically. Here, in this arrangement, it is supposed that the digital copying machine 92 communicates with the host computer 96, and that the digital copying machine 92 requests the host computer 96 to carry out image processing that it cannot carry out.

As shown in FIG. 36, a desired image-processing mode is set in the digital copying machine 92 (S171), and when the start key 15 is turned on (S172), the digital copying machine 92 starts carrying out a reading operation on a document image by the scanner section 31 (S173). Image data, obtained from the above operation, is temporarily stored in the memory 73. Next, the digital copying machine 92 transmits the read image data to the host computer 96 together with command codes instructing the desired image processing, in order to make a request for the image processing.

Thereafter, the digital copying machine 92 enters the stand-by mode, the image data is received by the host computer 96, and the contents are confirmed. Here, if the request for retransmitting the image data is given from the host computer 96 (S175), the digital copying machine 92 repeats the operations S172 through S174, thereby retransmitting the image data to the host computer 96.

Moreover, if there is no request for retransmitting at S175, and if the image data that has been subjected to the image processing is transmitted from the host computer 96 (S176), the digital copying machine 92 outputs the image data onto a sheet of paper (S177).

In contrast, as shown in FIG. 37, in the case when a mode for updating the aforementioned specific image data is set in the host computer 96 (S151), the specific image data updating operation is carried out (S152).

Moreover, in the case when the host computer 96 is not carrying out the specific image data updating operation, if it receives a request for image processing from the digital copying machine 92 on the user side (S153), the host computer 96 makes a judgement as to whether or not the received image data is any of the specific images that have been registered (S154). As a result of the judgement, if it is coincident with any of the specific images, the host computer 96 transmits the aforementioned information for confirmation-request including the request for transmitting the image data to the digital copying machine 92 (S156), and sets the timer (S157), as well as setting the counter (S158). In this case, the host computer 96 also stores information, such as the contents of the requested image processing related to the image data, the managing information for identifying the digital copying machine 92 that has been requested the image processing, and the actual image data, in its large-capacity memory. The timer regulates the upper limit of waiting time for the retransmission of the image data from the digital copying machine 92, and the counter regulates the upper limit of the number of retransmissions.

Thereafter, if the host computer 96 again receives the image data from the digital copying machine 92 (S161) before the timer has counted up to a predetermined time at S162, the sequence proceeds to S154, and the succeeding steps are repeated in the same manner. Further, when the number of retransmissions of the image data from the digital copying machine 92 has reached a predetermined value (S159), the host computer 96 cancels the image-processing mode based on the request from the digital copying machine 92 (S160), and after informing the digital copying machine 92 of the cancellation, completes the operation.

In contrast, if the image data, received from the digital copying machine 92, is not coincident with any of the specific images at S155, predetermined image processing is carried out on the image data (S163), and the information related to the processing is stored as history information (S164), for example, as shown in FIG. 31. Thereafter, the host computer 96 returns the processed image data to the digital copying machine 92, thereby completing the processing (S165).

As described above, in the present image-forming system, the host computer 96 manages information concerning specific images; therefore, it is not necessary for the digital copying machines 91 through 93 on the user side to control the information. In other words, the digital copying machines 91 through 93 need not have the managing function for specific images and a large-capacity memory; therefore, inexpensive construction is achieved.

Moreover, in the host computer 96, new or necessary specific-image data can be added, or replaced with unnecessary information, in accordance with changes in technical or social demands or other reasons, through the above-mentioned updating operations at S151 and S152. Although the updating operations are only carried out in the host computer 96, it becomes possible to meet various requests from the digital copying machines 91 through 93.

Moreover, in the present image-forming system, when image processing related to, for example, an image of paper money is requested to the host computer 96, the specific image and the digital copying machine that has requested to perform the image processing for the specific image can be identified. Therefore, it is possible to prevent criminal acts, such as counterfeit of paper money or securities.

Further, in the present image-forming system, when the host computer 96 carries out image processing on a specific image, such as paper money or securities, a warning is given to the user of the digital copying machine, and it is possible to prevent the present image-forming system from being misused.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming system which has at least one image-forming apparatus and one image-processing apparatus as well as a transfer device that allows both of the apparatuses to communicate with each other so as to transfer information between them, said image-forming apparatus comprising:

an image-recording section for forming a visible image based on image information;

an input section for inputting an instruction with respect to image processing, and a control section that outputs the image information to the image-processing apparatus in accordance with the instruction from the input section for carrying out the image processing in the image-processing apparatus, as well as supplying the image-recording section with the image information that has been processed in the image-processing apparatus, wherein said image-processing apparatus subjects the image information that has been inputted through the transfer device to predetermined image processing and outputs the resulting image information to the image-forming apparatus through the transfer device.

2. The image-forming system as defined in claim 1, wherein: the image-processing apparatus is capable of outputting information that indicates types of available image processes, and carries out an image process instructed by a control signal that has been released from the image-forming apparatus; said image-forming apparatus has a display section; and said control section of the image-forming apparatus allows the display section to display the types of image processes that are available by the image-processing apparatus, and outputs a control signal for instructing to carry out a type of image processes that has been specified by the input section, together with the image information, to the image-processing apparatus through the transferring device.

3. The image-forming system as defined in claim 2, wherein, upon alternation of the types of available image processes, said image-processing apparatus outputs the contents of the alternation to the image-forming apparatus through the transferring device.

4. The image-forming system as defined in claim 1, wherein: at least said image-processing apparatus has a storage section for storing image information, and said control section of the image-forming device transfers image information to the storage section so as to store it therein.

5. The image-forming system as defined in claim 1, wherein: said image-forming apparatus and image-processing apparatus have respective storage sections for storing image information; and said control section of said image-forming apparatus stores image information in the storage section of the image-forming apparatus, and also, if the storage section has an insufficient storage capacity, transfers the image information to the storage section of the image-processing apparatus through the transferring device, so as to store it therein.

6. The image-forming system as defined in claim 1, wherein: said image-forming apparatus is provided with a display section, and prior to using the image-processing apparatus, said control section of the image-forming apparatus allows the display section to display the fact that it is used, and upon receipt of an instruction to use the image-processing apparatus from the input section, carries out the process by using the image-processing apparatus, while upon no receipt of an instruction to use the image-processing apparatus from the input section, said control section prohibits the process that uses the image-processing apparatus.

7. The image-forming system as defined in claim 1, further comprising: an image-information suitability judging section for making a judgement as to whether or not the image information, inputted through the transferring device, is suitable for the image process based upon the image information, and a control section which, if the judgement of the image-information suitability judging section is deemed unsuitable, requests for the image-forming apparatus to retransmit the image information.

8. The image-forming system as defined in claim 7, wherein the image-information suitability judging section makes a judgement based upon quality of the image information.

9. The image-forming system as defined in claim 7, wherein the image-information suitability judging section makes a judgement based upon the amount of lack of image information.

10. The image-forming system as defined in claim 1, wherein: said image-forming apparatus has an information-confirming section for allowing the user to confirm a state of the processed image information obtained through the image-processing apparatus and for inputting the suitability to the control section of the image-forming apparatus; said control section of the image-forming apparatus supplies the processed image information to the image-recording section upon receipt of an input indicating the suitability of the processed image information from the information-confirming section, while it outputs again to the image-processing apparatus the image information together with information requesting re-image-processing upon receipt of an input indicating the unsuitability of the processed image information from the information-confirming section; and the image-processing apparatus again carries out predetermined image processing on the inputted image information in accordance with the information requesting the re-image-processing.

11. An image-forming system which has at least one image-forming apparatus and one image-processing apparatus as well as a transfer device that allows both of the apparatuses to communicate with each other so as to transfer information between them, said image-forming apparatus comprising:

an image-processing section for carrying out predetermined image processing on the image information;

an image-recording section for forming a visible image based on image information;

an input section for inputting an instruction with respect to image processing, and a control section which, in accordance with a type of image processing that has been specified by the input section, makes a selection as to whether the image processing for the image information is carried out in the image-processing section of the image-forming apparatus or in the image-processing apparatus, and upon selection of the process in the image-forming apparatus, supplies the image information to the image-processing section of the image-forming apparatus, while, upon selection of the process in the image-processing apparatus, it outputs the image information to the image-processing apparatus, as well as supplying the image information processed in the image-processing apparatus to the image-recording section;

wherein said image-processing apparatus subjects the image information that has been inputted through the transfer device to predetermined image processing and outputs the resulting image information to the image-forming apparatus through the transfer device.

12. The image-forming system as defined in claim 11, wherein: the image-processing apparatus is capable of outputting information that indicates types of available image processes, and carries out an image process instructed by a control signal that has been released from the image-forming apparatus; said image-forming apparatus has a display section; and said control section of the image-forming apparatus allows the display section to display the types of image processes that are available by the image-processing apparatus, and outputs a control signal for instructing to carry out a type of image processes that has been specified by the input section, together with the image information, to the image-processing apparatus through the transferring device.

13. The image-forming system as defined in claim 12, wherein, upon alternation of the types of available image processes, said image-processing apparatus outputs the contents of the alternation to the image-forming apparatus through the transferring device.

14. The image-forming system as defined in claim 11, wherein: at least said image-processing apparatus has a storage section for storing image information, and said control section of the image-forming device transfers image information to the storage section so as to store it therein.

15. The image-forming system as defined in claim 11, wherein: said image-forming apparatus and image-processing apparatus have respective storage sections for storing image information; and said control section of said image-forming apparatus stores image information in the storage section of the image-forming apparatus, and also, if the storage section has an insufficient storage capacity, transfers the image information to the storage section of the image-processing apparatus through the transferring device, so as to store it therein.

16. The image-forming system as defined in claim 11, wherein: said image-forming apparatus is provided with a display section, and prior to using the image-processing apparatus, said control section of the image-forming apparatus allows the display section to display the fact that it is used, and upon receipt of an instruction to use the image-processing apparatus from the input section, carries out the process by using the image-processing apparatus, while upon no receipt of an instruction to use the image-processing apparatus from the input section, said control section prohibits the process that uses the image-processing apparatus.

17. The image-forming system as defined in claim 11, further comprising: an image-information suitability judging section for making a judgement as to whether or not the image information, inputted through the transferring device, is suitable for the image process based upon the image information, and a control section which, if the judgement of the image-information suitability judging section is deemed unsuitable, requests for the image-forming apparatus to retransmit the image information.

18. The image-forming system as defined in claim 17, wherein the image-information suitability judging section makes a judgement based upon quality of the image information.

19. The image-forming system as defined in claim 11, wherein: said image-forming apparatus has an information-confirming section for allowing the user to confirm a state of the processed image information obtained through the image-processing apparatus and for inputting the suitability to the control section of the image-forming apparatus; said control section of the image-forming apparatus supplies the processed image information to the image-recording section upon receipt of an input indicating the suitability of the processed image information from the information-confirming section, while it outputs again to the image-processing apparatus the image information together with information requesting re-image-processing upon receipt of an input indicating the unsuitability of the processed image information from the information-confirming section; and the image-processing apparatus again carries out predetermined image processing on the inputted image information in accordance with the information requesting the re-image-processing.

20. An image-forming system which has at least one image-forming apparatus and one image-processing apparatus, a transfer device that allows both of the apparatuses to communicate with each other so as to transfer information between them, and a suitability judging device, said image-forming apparatus comprising:

a display section;

an image-recording section for forming a visible image based on image information;

an input section for inputting an instruction with respect to image processing, and a control section that outputs the image information to the image-processing apparatus in accordance with the instruction from the input section for carrying out the image processing in the image-processing apparatus, as well as supplying the image-recording section with the image information that has been processed in the image-processing apparatus, wherein: said image-processing apparatus subjects the image information that has been inputted through the transfer device to predetermined image processing and outputs the resulting image information to the image-forming apparatus through the transfer device, and said suitability judging device makes a judgement as to whether or not it is suitable to process the processed image information, which has been processed by the image-processing apparatus, in the image-recording section of the image-forming apparatus that originally requested the image-processing apparatus to perform the processing, as well as allowing the display section to display the results of the judgement.

21. The image-forming system as defined in claim 20, wherein: a plurality of said image-forming apparatuses are connected to the single image-processing apparatus, and when the judgement is deemed unsuitable for the image-forming apparatus that originally requested the processing, the suitability judging device searches for an appropriate image-forming apparatus that has an image-recording section suitable for the processing of the processed image information, while performing the judging operation, and if there is an appropriate image-forming apparatus, transfers the processed image information to the appropriate image-forming apparatus so as to process it therein.

22. The image-forming system as defined in claim 20, wherein the suitability judging device makes a judgement as to whether or not it is suitable to process the processed image information in the image-recording section of the image-forming apparatus based on the recording density of the image-recording section.

23. The image-forming system as defined in claim 20, wherein the suitability judging device makes a judgement as to whether or not it is suitable to process the processed image information in the image-recording section of the image-forming apparatus based on the size of paper required for recording the processed image information in the image-recording section and the maximum size of paper that can be used in the image-forming apparatus.

24. The image-forming system as defined in claim 20, wherein the suitability judging device makes a judgement as to whether or not it is suitable to process the processed image information in the image-recording section of the image-forming apparatus based on the size of paper required for recording the processed image information in the image-recording section and the sizes of paper that the image-forming apparatus houses so as to supply them to the image-recording section.

25. The image-forming system as defined in claim 20, wherein the suitability judging device makes a judgement as to whether or not it is suitable to process the processed image information in the image-recording section of the image-forming apparatus based on whether or not the image-forming apparatus allows the image-recording section to carry out a recording operation.

26. An image-forming system which has at least one image-forming apparatus and one image-processing apparatus, a transfer device that allows both of the apparatuses to communicate with each other so as to transfer information between them, and a history-managing device, said image-forming apparatus comprising:

an image-recording section for forming a visible image based on image information;

an input section for inputting an instruction with respect to image processing, and a control section that outputs the image information to the image-processing apparatus in accordance with the instruction from the input section for carrying out the image processing in the image-processing apparatus, as well as supplying the image-recording section with the image information that has been processed in the image-processing apparatus, wherein: said image-processing apparatus subjects the image information that has been inputted through the transfer device to predetermined image processing and outputs through the transfer device the resulting image information to the image-forming apparatus that originally requested the processing, and said history-managing device stores the contents of the image processing that has been carried out by the image-processing apparatus as history information related to the image-forming apparatus that originally requested the processing.

27. The image-forming system as defined in claim 26, wherein said history-managing device has a totalling function of the history information.

28. The image-forming system as defined in claim 27, wherein: the image-forming apparatus has a display section, said history-managing device is installed in the image-processing apparatus, and allowed to transfer the history information to the image-forming apparatus by using the transferring device, and the control section of the image-forming apparatus displays the history information sent from the history-managing device on the display section.

29. The image-forming system as defined in claim 27, wherein: said history-managing device is installed in the image-processing apparatus, and allowed to transfer the history information to the image-forming apparatus by using the transferring device, and the control section of the image-forming apparatus supplies the history information sent from the history-managing device to the image-recording section so as to visualize it therein.

30. The image-forming system as defined in claim 29, wherein the image-recording section of the image-forming apparatus records the history information on a sheet of paper that has the largest size among sheets of paper that the image-forming apparatus houses to supply to the image-recording section.

31. The image-forming system as defined in claim 29, wherein the image-recording section of the image-forming apparatus records the history information on a sheet of paper that has the largest size in the transporting direction thereof among sheets of paper that the image-forming apparatus houses to supply to the image-recording section.

32. The image-forming system as defined in claim 29, wherein the image-recording section of the image-forming apparatus records the history information on a sheet of paper that has the largest size in the width-wise direction orthogonal to the transporting direction among sheets of paper that the image-forming apparatus houses to supply to the image-recording section.

33. The image-forming system as defined in claim 26, wherein: said history-managing device is installed in the image-processing apparatus, and the image-forming apparatus is provided with a request-status managing section which stores the contents of the image processing that was requested for the image-processing apparatus, as history information.

34. An image-forming system which has at least one image-forming apparatus and one image-processing apparatus, a transfer device that allows both of the apparatuses to communicate with each other so as to transfer information between them, and a history-managing device, said image-processing apparatus being designed to carry out predetermined image processing on image information that has inputted thereto from the image-forming apparatus through the transferring device, and to output the resulting image information to the image-forming apparatus that originally requested the processing, through the transferring device, said history-managing device being installed in the image-processing apparatus and designed to store the contents of the image processing that has been carried out by the image-processing apparatus as history information related to the image-forming apparatus that originally requested the processing, and to transfer the history information to the image-forming apparatus through the transferring device, said image-forming apparatus comprising:

an image-recording section for forming a visible image based on image information;

an input section for inputting an instruction with respect to image processing;

a control section that outputs the image information to the image-processing apparatus in accordance with the instruction from the input section for carrying out the image processing in the image-processing apparatus, as well as supplying the image-recording section with the image information that has been processed in the image-processing apparatus;

a request-status managing section for storing the contents of the image processing that has been requested to the image-processing apparatus as history information; and a confirming section for combining the history information stored in the request-status managing section and the history information that has been transferred from the history-managing device into composite information in a comparable manner, and for visualizing the composite information so as to allow the user to confirm it.

35. The image-forming system as defined in claim 34, wherein: said confirming section forms the composite information so that the corresponding image-forming items of both of the pieces of history information are aligned for comparative purposes, and said control section of the image-forming apparatus supplies the composite information, formed in the confirming section, to the image-recording section so as to visualize it therein.

36. An image-forming system which has at least one image-forming apparatus and one image-processing apparatus, a transfer device that allows both of the apparatuses to communicate with each other so as to transfer information between them, and a history-managing device, said image-forming apparatus comprising:

an image-recording section for forming a visible image based on image information;

an input section for inputting an instruction with respect to image processing, and a control section that outputs the image information to the image-processing apparatus in accordance with the instruction from the input section for carrying out the image processing in the image-processing apparatus, as well as supplying the image-recording section with the image information that has been processed in the image-processing apparatus, said image-processing section comprising:

an image-processing section for subjecting the image information that has been inputted through the transfer device to predetermined image processing and for outputting through the transfer device the resulting image information to the image-forming apparatus that originally requested the processing; and a specific-image judging section for making a judgement as to whether or not the image information that has been inputted through the transfer device is coincident with any of pieces of image information of images that have been registered as specific images, wherein said history-managing device stores the contents of the image processing that has been carried out by the image-processing apparatus as history information related to the image-forming apparatus that originally requested the processing, and also stores the image information that has been judged identical to any of the specific images by the specific-image judging section as well as information for identifying the image-forming apparatus that has requested the image processing of the specific image.

37. The image-forming system as defined in claim 36, wherein: when the image information is judged identical to any of the specific images by the specific-image judging section, the image-processing apparatus transmits information requesting confirmation of the image to the image-forming apparatus, and the image-forming apparatus is provided with an informing section for urging the user to confirm the document image in accordance with the information requesting confirmation of the image.

* * * * *